United States Patent
Nakao et al.

(12) 
(10) Patent No.: US 6,587,597 B1
(45) Date of Patent: Jul. 1, 2003

(54) IMAGE INPUT METHOD, IMAGE INPUT APPARATUS, AND RECORDING MEDIUM

(75) Inventors: Toshiyasu Nakao, Tokyo (JP); Atsushi Kashitani, Tokyo (JP)

(73) Assignee: NEC Corporation, Tokyo (JP)

(*) Notice: Subject to any disclaimer, the term of this patent is extended or adjusted under 35 U.S.C. 154(b) by 0 days.

(21) Appl. No.: 09/448,948

(22) Filed: Nov. 24, 1999

(30) Foreign Application Priority Data

Jan. 21, 1999 (JP) .......................................... 11-013569
Jul. 6, 1999 (JP) .......................................... 11-192332

(51) Int. Cl.$^7$ .............................. G06K 9/32; G06K 9/36; H04N 7/18; H04N 13/02
(52) U.S. Cl. ....................... 382/284; 382/294; 382/291; 382/282; 348/139; 348/47
(58) Field of Search .................................. 382/174, 190, 382/195, 206, 216, 269, 282, 284, 287, 288, 289, 291, 293, 294, 296, 297, 302; 348/47, 50, 64, 139; 396/30, 324, 326; 358/450, 453

(56) References Cited

U.S. PATENT DOCUMENTS

| 5,317,405 A | * | 5/1994 | Kuriki et al. ................... 348/20 |
| 5,687,399 A | * | 11/1997 | Kai et al. ....................... 396/55 |
| 5,752,113 A | * | 5/1998 | Borden ........................ 396/428 |
| 5,892,994 A | * | 4/1999 | Inaba ......................... 396/326 |
| 6,038,074 A | * | 3/2000 | Kitaguchi et al. ............. 359/618 |

FOREIGN PATENT DOCUMENTS

| EP | 0 837 428 A2 | 4/1998 |
| JP | 8-116490 | 5/1996 |
| JP | 9-18750 | 1/1997 |
| JP | 10-155109 | 6/1998 |
| JP | 10-178564 | 6/1998 |

* cited by examiner

*Primary Examiner*—Jayanti K. Patel
*Assistant Examiner*—Yosef Kassa
(74) *Attorney, Agent, or Firm*—Sughrue Mion, PLLC

(57) ABSTRACT

When compositing a plurality of acquired partial images, the effects of differences in viewpoint contained in the partial images can be reduced, and a high quality wide-viewfield image is inputted. An image input apparatus for photographing parts of a field to be photographed while altering the photographic direction by rotating a camera, projecting a plurality of partial images of the field to be photographed which are obtained onto a projection surface, and based on the results of this projection, conducting compositing on a composite image surface, and inputting the composite image, wherein is provided an image compositing mechanism 009, which employs the rotational center of the camera as the center of projection during the compositing of the plurality of partial images, and which employs, as the projection point of a pixel of a partial image, the intersection point between the projection surface which is established in space and a straight line, which is parallel to a straight line connecting the viewpoint of the camera and the pixel in the partial image in an image plane formed by the plurality of partial images, and which passes through the rotational center of the camera.

32 Claims, 47 Drawing Sheets

Fig. 40A COMPOSITE IMAGE
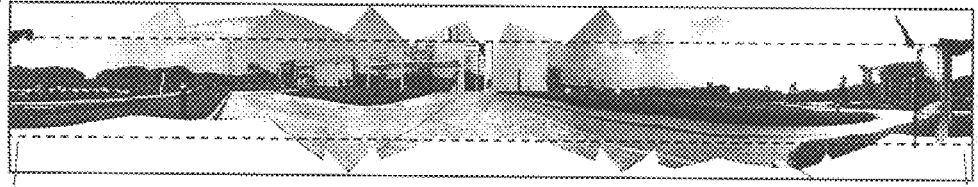
Fig. 40B IMAGE OF EXTRACTED CENTRAL PART

IMAGE INPUT METHOD, IMAGE INPUT APPARATUS, AND RECORDING MEDIUM

BACKGROUND OF THE INVENTION

1. Field of the Invention

The present invention relates to an image input method which obtains an image having a broad range by compositing a plurality of images, to an image input apparatus, and to a recording medium which stores programs for realizing the functions of this image input apparatus and which is computer-readable.

2. Background Art

Image input machines which are commonly employed, such as video cameras or the like, have a limited field of view, so that they are thought to produce images of a small part of the information of the outside world surrounding a user. When image input apparatuses are employed which are capable of obtaining images having a wide field of view in which this limited field of view is expanded, for example in the observation of the interior or exterior of a store, conventionally, a watchman was only able to view images in his immediate vicinity, whereas with these images having a wider field of view, the state of the surroundings may also be assessed quickly, so that the ability to confirm visually the state of the surroundings is dramatically improved. Furthermore, when image input devices having a wide field of view are employed, the range which may be observed by a single device is increased, and this is expected to lead to a general decrease in costs.

The main conventional image acquisition methods involve the scanning of film affixed to the side surface of a cylinder using light projected from slits moving over the opposite side surface (the so-called panorama camera) or the direct acquisition of wide-viewfield images using a fish-eye lens or a wide angle lens. The wide-viewfield images could be used as panorama pictures, or, in the case of fish-eye lenses or the like, could be passed through an optical system conducting a reverse conversion and then projected onto a screen; in order to employ the wide-viewfield images in a computer, the film or prints had to be inputted using a scanner, and this involved time and labor.

As it became possible to directly input images into a computer as a result of advances in hardware, by applying certain conversions or compositing processing to the images inputted into a computer, it became possible to obtain wide-viewfield images. Methods for the acquisition of wide-viewfield images which were precursors to such processing in computers were broadly divided into image compositing types, in which partial images taken using a standard camera were composited to produce a wide-viewfield image, and optical types, in which a wide-viewfield image was directly acquired using a wide angle lens or a mirror.

The image compositing types could be further classified into methods in which a plurality of partial images are acquired using a tripod or universal head which is adjusted so that a camera rotates thereon, and these are then composited to produce a wide-viewfield image, and methods in which partial images obtained using a plurality of cameras are composited. In the former, because a plurality of images acquired using standard cameras are composited, the resulting wide-viewfield image has a high degree of resolution; however, as disclosed in Japanese Patent Application, First Publication No. HEI 9-18750, "Electronic camera and electronic camera system employing this, photographic apparatus, signal processing apparatus", or Japanese Patent Application, First Publication No. HEI 8-116490, "Image processing apparatus", in order to avoid the problem of different points of view which is caused between images as a result of movements in the point of view in the conventional method, a mechanism is necessary for rotating the camera about the principal point of the lens. Furthermore, there were problems with such a method in that the operation by which the partial images were acquired was complex, the camera was heavy and large-sized, and as a result of the characteristics of the signal and power source cables, the camera could not be rotated continuously and at high speed, so that it was difficult to continuously acquire a wide-viewfield image.

In the latter methods, in which partial images obtained using a plurality of cameras were composited, cameras were arranged in a fixed manner, so that once the correct setting had been achieved, it was possible to acquire images in real time with little delay, but as a large number of cameras had to be deployed, the size of the apparatus was large, and furthermore, because the cameras were fixed, it was difficult to alter the degree of resolution or the image acquisition range. Furthermore, when the number of cameras was increased, the mechanism by which the image of each camera was inputted into the computer became elaborate.

In the optical types, a wide-viewfield image was directly acquired using a wide angle lens or mirror, and then the image was reconstituted using certain conversions. Methods have been developed which employ a fish-eye lens and which employ a mirror. In either method, a lens or mirror which is capable of acquiring the wide-viewfield image in a single image acquisition is fixed, and real-time acquisition is possible; however, there is a problem in that the degree of resolution of the wide-viewfield image obtained is low. In particular, in methods which employ fish-eye lenses, large distortions are present at the edges of images, and extremely rough images are obtained even if certain conversions are employed. There are also methods in which wide-viewfield image input apparatuses employing mirrors are combined with cameras which require close observation point images; however, although the close observation point images have a high degree of resolution, this does not solve the problem of the insufficient degree of resolution of the wide-viewfield images themselves. A method which is capable of solving the problems in the conventional wide-viewfield image input methods, and which is capable of acquiring, continuously and at high speed, wide-viewfield images having a high degree of resolution, is a method in which a plurality of partial images acquired by rotating a mirror in front of a camera are composited. If changes in the actual vertical or left-right correspondence with the image, and geometrical distortions, are excluded, then the rotation of the mirror about the optical axis of the camera corresponds to a pan operation, and the rotation of the mirror about an axis perpendicular to the optical axis of the camera corresponds to a tilt operation of the camera, so that using the rotation of this mirror, a plurality of partial images are acquired, and the partial images obtained are subjected to certain conversions, are composited, and a wide-viewfield image is acquired.

However, as pointed out in the specification of Japanese Patent Application, First Publication No. HEI 9-18750 described above, the following problems are present in image input apparatuses which input wide-viewfield images by compositing partial images obtained by causing a conventional mirror to rotate:

1. The mirror which serves to switch the photographic field is large, and
2. Differences in viewpoint are produced when the photographic field is changed by the mirror which is disposed in front of the lens.

In particular, the latter problem is one which is also caused when the camera is rotated at a point other than the principal point of the lens, and this causes problems in that the continuity of the composite image is negatively affected, and the image quality of the wide-viewfield image worsens dramatically.

SUMMARY OF THE INVENTION

The present invention was created in light of the above circumstances; it has as a first object thereof to provide an image input method which, in the case in which a camera is rotated about a point other than the principal point of the lens, and during the compositing of a plurality of partial images obtained by rotating a mirror before the camera, makes it possible to reduce the effects of parallax contained in the partial images and to input a wide-viewfield image having high image quality, as well as to provide an image input apparatus and a computer-readable recording medium for storing programs for executing the functions of the image input apparatus.

Furthermore, it is a second object of the present invention to provide an image input apparatus which, when compositing a plurality of partial images obtained by rotating a mirror in front of a camera, makes it possible to input wide-viewfield images at high speed.

In order to achieve the first object described above, the invention according to the first aspect comprises an image input method for inputting a wide-viewfield composite image by photographing parts of a field to be photographed while changing the photographing direction by rotating a camera which is supported in a rotatable manner, projecting the plurality of partial images of the field to be photographed acquired in this manner onto a projection surface, and based on the results of this projection, conducting compositing on a composite image plane, wherein, during the compositing of the plurality of partial images, the center of rotation of the camera is used as the center of the projection, and the intersection point between the projection surface established in space and a straight line, which is parallel to a straight line connecting the viewpoint of the camera and a pixel in a partial image in an image plane formed by the plurality of partial images, and which passes through the rotational center of the camera, is employed as the projection point of the pixel in the partial image.

In accordance with the invention according to the first aspect, it is possible to obtain a satisfactory wide-viewfield composite image in which the effects of differences in view contained in the partial images are minimized, even when the camera is rotated about a point other than the principal point of the lens.

Furthermore, the invention according to the second aspect comprises an image input method for inputting a wide-viewfield composite image by photographing parts of a field to be photographed while altering the range of photography in the field to be photographed of a camera by rotating a mirror supported in a rotatable manner before the camera, projecting a plurality of partial images of the field to be photographed which were acquired onto a projection surface, and based on the results of this projection, conducting compositing on a composite image surface, wherein the rotational center of the mirror is made the center of projection during the compositing of the plurality of partial images, and the point of intersection between the projection surface which is established in space and a straight line, which is parallel to a reflection straight line indicating the reflected light ray which results when a light ray from the viewpoint of the camera which passes through a pixel of a partial image in an image plane formed by the partial images is reflected by the mirror, and which passes through the rotational center of the mirror, is employed as the projection point of the partial image.

In accordance with the invention according to the second aspect, satisfactory wide-viewfield composite images, in which the effects of differences in viewpoint incorporated in the partial images are limited, may be obtained.

The invention according to the third aspect comprises an image input method for inputting wide-viewfield composite images by photographing parts of a field to be photographed while altering the direction of photography by rotating a camera supported in a rotatable manner, and compositing the plurality of partial images of the field to be photographed which are acquired, wherein a pixel on a composite image surface corresponding to a point on a projection surface is determined from an intersection point between an image plane formed by the plurality of partial images acquired and a straight line, which is parallel to a straight line connecting the point on the image plane established in space at the time of the compositing of the plurality of partial images and the rotational center of the camera, and which passes through the viewpoint of the camera.

In accordance with the invention according to the third aspect, in addition to the effects achieved by the invention according to the first aspect, an effect is achieved whereby, when determining pixel values in the composite image by means of, for example, arithmetic processing such as linear interpolation or the like, blank pixels, which are a product of rounding errors in the coordinate values indicating the positions of the pixels, are not produced in the composite image.

The invention according to the fourth aspect comprises an image input method for inputting a wide-viewfield composite image by photographing parts of a field to be photographed while altering the photographic range in the field to be photographed of a camera by rotating a mirror which is supported in a rotatable manner before the camera, and compositing a plurality of partial images of the field to be photographed which are obtained, wherein a pixel on a composite image surface corresponding to a point in a projection surface is determined from an intersection point between an image plane formed by the partial images and a straight line, which is parallel to a straight line indicating a reflected light beam resulting from a reflection by the mirror of a straight line connecting a point on the projection surface which is established in space at the time of the compositing of the plurality of partial images and the rotational center of the mirror, and which passes through the viewpoint of the camera.

In accordance with the invention according to the fourth aspect, in addition to the effects of the invention according to the second aspect, when the pixel values in the composite image are determined by means of, for example, arithmetic processing such as linear interpolation or the like, blank pixels, which are a product of rounding errors in the coordinate values indicating the position of the pixels, are not produced in the composite image.

The invention according to the fifth aspect comprises an image input method for inputting wide-viewfield composite images by photographing parts of a field to be photographed while altering the photographic direction by rotating a camera which is supported in a rotatable manner, projecting a plurality of partial images of the field to be photographed which are obtained onto a projection surface, and based on the results of this projection, conducting compositing on a composite image surface, wherein is provided an image compositing mechanism, which employs the rotational center of the camera as the center of projection during the compositing of the plurality of partial images, and which employs, as the projection point of a pixel of a partial image, the intersection point between the projection surface which is established in space and a straight line, which is parallel to a straight line connecting the viewpoint of the camera and the pixel in the partial image in an image plane formed by the plurality of partial images, and which passes through the rotational center of the camera.

Furthermore, the invention according to the sixth aspect comprises an image input apparatus for inputting wide-viewfield composite images by photographing parts of a field to be photographed while altering the photographic direction by rotating a camera mounted in a rotatable manner, projecting a plurality of partial images of the field to be photographed obtained into a projection surface, and based on the results of this projection, conducting compositing on a composite image surface, wherein are provided: a camera movement mechanism for changing the photographic direction of the camera; a posture control mechanism for directing the camera movement mechanism so as to change the photographic direction of the camera and for transmitting camera posture data to all parts; a first storage mechanism for storing partial images and composite images produced by compositing the partial images; a second storage mechanism for storing attribute data related to partial images and composite images and camera posture data from partial image acquisition; a partial image acquisition mechanism for incorporating images photographed by the camera and acquiring partial images from these incorporated images, and storing the partial images in the first storage mechanism, and for storing posture data from the acquisition of the partial images of the camera received from the posture control mechanism, and attribute data relating to the partial images and composite images, in the second storage mechanism; and an image compositing mechanism for setting the rotational center of the camera as a center of projection, determining a projection point so that an intersection point between a projection surface established in space and a straight line, which is parallel with a straight line connecting the viewpoint of the camera and a pixel in a partial image in an image plane formed by the plurality of partial images, and which passes through the rotational center of the camera, is employed as the projection point of the pixel in the partial image, compositing the partial images with reference to the contents of the first and second storage mechanisms, and storing a composite image in the first storage mechanism.

In accordance with the invention according to the fifth and sixth aspects, it is possible to obtain a satisfactory wide-viewfield composite image, in which the effects of differences in viewpoint contained in the partial images are reduced, even when the camera is rotated about a point other than the principal point of the lens.

Furthermore, the invention according to the seventh aspect comprises an image input apparatus for inputting wide-viewfield composite images by photographing parts of a field to be photographed while altering the photographic direction by rotating a camera mounted in a rotatable manner, projecting a plurality of partial images of the field to be photographed obtained into a projection surface, and based on the results of this projection, conducting compositing on a composite image surface, wherein are provided: a camera movement mechanism for changing the photographic direction of the camera; a posture control mechanism for directing the camera movement mechanism so as to change the photographic direction of the camera and for transmitting camera posture data to all parts; a first storage mechanism for storing partial images and composite images produced by compositing the partial images; a second storage mechanism for storing attribute data related to partial images and composite images and camera posture data from partial image acquisition; a partial image acquisition mechanism for incorporating images photographed by the camera and acquiring partial images from these incorporated images, and storing the partial images in the first storage mechanism, and for storing posture data from the acquisition of the partial images of the camera received from the posture control mechanism, and attribute data relating to the partial images and composite images, in the second storage mechanism; a positioning mechanism for determining positional relationships between partial images stored in the first storage mechanism, determining positional correction amounts of the composited positions of the partial images stored in the second storage mechanism based on the positional relationships obtained, and storing these in the second storage mechanism; and an image compositing mechanism for determining compositing positions of the partial images using the camera posture data from the time at which the partial images were obtained, and the positional correction amounts of the compositing positions obtained by the positioning mechanism, and in accordance with the compositing positions obtained, setting the rotational center of the camera as a center of projection, determining a projection point so that an intersection point between a projection surface established in space and a straight line, which is parallel with a straight line connecting the viewpoint of the camera and a pixel in a partial image in an image plane formed by the plurality of partial images, and which passes through the rotational center of the camera, is employed as the projection point of the pixel in the partial image, compositing the partial images with reference to the contents of the first and second storage mechanisms, and storing a composite image in the first storage mechanism.

In accordance with the invention according to the seventh aspect, it is possible to obtain a satisfactory wide-viewfield composite image, in which the effects of differences in viewpoint contained in the partial images are reduced, even when the camera is rotated about a point other than the principal point of the lens, and it is possible to produce a high-precision composite image in which errors in the angle detection mechanism of the camera which comprises the camera movement mechanism are reduced.

By means of appropriately setting the existing range of camera orientation during the acquisition of partial images, it is possible to omit the angle detection mechanism of the camera which comprises the camera movement mechanism in the structure of the image input apparatus.

The invention according to the eighth aspect comprises an image input apparatus for inputting a wide-viewfield composite image by photographing parts of a field to be photographed while changing the range of photography in the field to be photographed of a camera by rotating a mirror which is supported in a rotatable manner before the camera, projecting a plurality of partial images of the field to be photographed which are obtained onto a projection surface, and based on the results of this projection, conducting compositing on a composite image surface, wherein an image compositing mechanism is provided which uses the rotational center of the mirror as the center of projection during the compositing of the plurality of partial images, and which employs the intersection point between the projection surface which is established in space and a straight line, which is parallel to a reflection straight line indicating a reflected beam of light resulting from the reflection by the mirror of a light beam from the viewpoint of the camera which passes through a pixel of a partial image in an image plane formed by the partial images, and which passes through the rotational center of the mirror, as the projection point of the partial image.

The invention according to the ninth aspect comprises an image input apparatus for inputting a wide-viewfield composite image by photographing parts of a field to be photographed while changing the range of photography in the field to be photographed of a camera by rotating a mirror which is supported in a rotatable manner before the camera, projecting a plurality of partial images of the field to be photographed which are obtained onto a projection surface, and based on the results of this projection, conducting compositing on a composite image surface, wherein are provided: a mirror movement mechanism for altering the direction of the mirror so as to change the photographic direction of the camera; a mirror control mechanism for directing the mirror movement mechanism so as to change the orientation of the mirror and for transmitting posture data of the mirror to all parts; a first storage mechanism for storing partial images and composite images produced by compositing the partial images; a second storage mechanism for storing attribute data related to partial images and composite images and the mirror posture data from partial image acquisition; a partial image acquisition mechanism for incorporating images photographed by the camera and acquiring partial images from these incorporated images, and storing the partial images in the first storage mechanism, and for storing posture data from the acquisition of the partial images of the mirror received from the mirror control mechanism, and attribute data relating to the partial images and composite images, in the second storage mechanism; and an image compositing mechanism which uses the rotational center of the mirror as the center of projection during the compositing of the plurality of partial images, and which determines a projection point such that the intersection point between the projection surface which is established in space and a straight line, which is parallel to a reflection straight line indicating a reflected beam of light resulting from the reflection by the mirror of a light beam from the viewpoint of the camera which passes through a pixel of a partial image in an image plane formed by the partial images, and which passes through the rotational center of the mirror, is employed as the projection point of the pixel of the partial image, and which composites the partial images with reference to the contents of the first and second storage mechanisms, and stores a composite image in the first storage mechanism.

In accordance with the invention according to the eighth and ninth aspects, it is possible to obtain satisfactory wide-viewfield composite images in which the effects of differences in viewpoint contained in the partial images are reduced.

The invention according to the tenth aspect comprises an image input apparatus for inputting a wide-viewfield composite image of a field to be photographed while changing the range of photography in the field to be photographed of a camera by rotating a mirror which is supported in a rotatable manner before the camera, projecting a plurality of partial images of the field to be photographed which are obtained onto a projection surface, and based on the results of this projection, conducting compositing on a composite image surface, wherein are provided: a mirror movement mechanism for altering the direction of the mirror so as to change the photographic direction of the camera; a mirror control mechanism for directing the mirror movement mechanism so as to change the orientation of the mirror and for transmitting posture data of the mirror to all parts; a first storage mechanism for storing partial images and composite images produced by compositing the partial images; a second storage mechanism for storing attribute data related to partial images and composite images and the mirror posture data from partial image acquisition; a partial image acquisition mechanism for incorporating images photographed by the camera and acquiring partial images from these incorporated images, and storing the partial images in the first storage mechanism, and for storing posture data from the acquisition of the partial images of the mirror received from the mirror control mechanism, and attribute data relating to the partial images and composite images, in the second storage mechanism; a positioning mechanism for determining positional relationships between partial images stored in the first storage mechanism, determining positional correction amounts of the composited positions of the partial images stored in the second storage mechanism based on the positional relationships obtained, and storing these in the second storage mechanism; and an image compositing mechanism for determining compositing positions of the partial images using the camera posture data from the time at which the partial images were obtained, and the positional correction amounts of the compositing positions obtained by the positioning mechanism, and in accordance with the compositing positions obtained, setting the rotational center of the mirror as the center of projection during the compositing of the plurality of partial images, determining a projection point such that the intersection point between the projection surface which is established in space and a straight line, which is parallel to a reflection straight line indicating a reflected beam of light resulting from the reflection by the mirror of a light beam from the viewpoint of the camera which passes through a pixel of a partial image in an image plane formed by the partial images, and which passes through the rotational center of the mirror, is employed as the projection point of the pixel of the partial image, compositing the partial images with reference to the contents of the first and second storage mechanisms, and storing a composite image in the first storage mechanism.

In accordance with the invention according to the tenth aspect, it is possible to obtain satisfactory wide-viewfield composite images in which the effects of differences in viewpoint contained in the partial images are reduced, and it is possible to produce highly precise composite images in which errors in the angle detection mechanism of the mirror which constitutes the mirror movement mechanism are reduced.

Furthermore, by means of appropriately setting the existing range of mirror orientation during the acquisition of partial images, it is possible to omit the angle detection mechanism of the mirror which comprises the mirror movement mechanism in the structure of the image input apparatus.

The invention according to the eleventh aspect comprises an image input apparatus for inputting wide-viewfield composite images by photographing parts of a field to be photographed while altering the direction of photography by rotating a camera supported in a rotatable manner, and compositing the plurality of partial images of the field to be photographed which are acquired, wherein is provided an image compositing mechanism for determining a pixel on a composite image surface corresponding to a point on a projection surface from an intersection point between an image plane formed by the plurality of partial images acquired and a straight line, which is parallel to a straight line connecting the point on the image plane established in space at the time of the compositing of the plurality of partial images and the rotational center of the camera, and which passes through the viewpoint of the camera.

The invention according to the twelfth aspect comprises an image input apparatus for inputting wide-viewfield composite images by photographing parts of a field to be photographed while altering the direction of photography by rotating a camera supported in a rotatable manner, and compositing the plurality of partial images of the field to be photographed which are acquired, wherein are provided: a camera movement mechanism for changing the photographic direction of the camera; a posture control mechanism for directing the camera movement mechanism so as to change the photographic direction of the camera and for transmitting camera posture data to all parts; a first storage mechanism for storing partial images and composite images produced by compositing the partial images; a second storage mechanism for storing attribute data related to partial images and composite images and camera posture data from partial image acquisition; a partial image acquisition mechanism for incorporating images photographed by the camera and acquiring partial images from these incorporated images, and storing the partial images in the first storage mechanism, and for storing posture data from the acquisition of the partial images of the camera received from the posture control mechanism, and attribute data relating to the partial images and composite images, in the second storage mechanism; and an image compositing mechanism for determining a pixel on a composite image surface corresponding to a point on the projection surface from the intersection point between an image plane formed by the plurality of partial images obtained and a straight line, which is parallel to a straight line connecting a point in the projection surface established in space at the time of the compositing of the plurality of partial images with the rotational center of the camera, and which passes through the viewpoint of the camera, compositing the partial images with reference to the contents of the first and second storage mechanisms, and storing the composite image in the first storage mechanism.

In accordance with the invention according to the eleventh and twelfth aspects, even when the camera is rotated about a point other than the principal point of the lens, it is possible to obtain a satisfactory wide-viewfield composite image in which the effects of differences in viewpoint contained in the partial images are reduced, and an effect is achieved whereby, when determining the pixel values in the composite image by means of arithmetic processing such as linear interpolation or the like, blank pixels, which are a product of rounding errors in the coordinate values indicating the positions of the pixels, are not produced in the composite image.

The invention according to the thirteenth aspect comprises an image input apparatus for inputting wide-viewfield composite images by photographing parts of a field to be photographed while altering the direction of photography by rotating a camera supported in a rotatable manner, and compositing the plurality of partial images of the field to be photographed which are acquired, wherein are provided: a camera movement mechanism for changing the photographic direction of the camera; a posture control mechanism for directing the camera movement mechanism so as to change the photographic direction of the camera and for transmitting camera posture data to all parts; a first storage mechanism for storing partial images and composite images produced by compositing the partial images; a second storage mechanism for storing attribute data related to partial images and composite images and camera posture data from partial image acquisition; a partial image acquisition mechanism for incorporating images photographed by the camera and acquiring partial images from these incorporated images, and storing the partial images in the first storage mechanism, and for storing posture data from the acquisition of the partial images of the camera received from the posture control mechanism, and attribute data relating to the partial images and composite images, in the second storage mechanism; a positioning mechanism for determining positional relationships between partial images stored in the first storage mechanism, determining positional correction amounts of the composited positions of the partial images stored in the second storage mechanism based on the positional relationships obtained, and storing these in the second storage mechanism; and an image compositing mechanism for determining compositing positions of the partial images using the camera posture data from the time at which the partial images were obtained, and the positional correction amounts of the compositing positions obtained by the positioning mechanism, and in accordance with the compositing positions obtained, determining a pixel on a composite image surface corresponding to a point on the projection surface from the intersection point between an image plane formed by the plurality of partial images obtained and a straight line, which is parallel to a straight line connecting a point in the projection surface established in space with the rotational center of the camera, and which passes through the viewpoint of the camera, compositing the partial images with reference to the contents of the first and second storage mechanisms, and storing the composite image in the first storage mechanism.

In accordance with the invention according to the thirteenth aspect, even when the camera is rotated about a point other than the principal point of the lens, it is possible to obtain a satisfactory wide-viewfield composite image in which the effects of differences in viewpoint contained in the partial images are reduced, and an effect is achieved whereby, when determining the pixel values in the composite image by means of arithmetic processing such as linear interpolation or the like, blank pixels, which are a product of rounding errors in the coordinate values indicating the positions of the pixels, are not produced in the composite image.

Furthermore, it is possible to reduce the errors of the angle detection mechanism of the camera which constitutes the camera movement mechanism, and to produce highly accurate composite images.

Additionally, by appropriately setting the existing range of orientation of the camera during the acquisition of the partial images, it is possible to omit the angle detection mechanism of the camera, which comprises the camera movement mechanism in the structure of the image input apparatus.

The invention according to the fourteenth aspect comprises an image input apparatus for inputting a wide-viewfield composite image by photographing parts of a field to be photographed while altering the photographic range in the field to be photographed of a camera by rotating a mirror which is supported in a rotatable manner before the camera, and compositing a plurality of partial images of the field to be photographed which are obtained, wherein is provided an image compositing mechanism for determining a pixel on a composite image surface corresponding to a point in a projection surface from an intersection point between an image plane formed by the partial images and a straight line, which is parallel to a straight line indicating a reflected light beam resulting from a reflection by the mirror of a straight line connecting a point on the projection surface which is established in space at the time of the compositing of the plurality of partial images and the rotational center of the mirror, and which passes through the viewpoint of the camera.

The invention according to the fifteenth aspect comprises an image input apparatus for inputting a wide-viewfield composite image by photographing parts of a field to be photographed while altering the photographic range in the field to be photographed of a camera by rotating a mirror which is supported in a rotatable manner before the camera, and compositing a plurality of partial images of the field to be photographed which are obtained, wherein are provided: a mirror movement mechanism for altering the direction of the mirror so as to change the photographic direction of the camera; a mirror control mechanism for directing the mirror movement mechanism so as to change the orientation of the mirror and for transmitting posture data of the mirror to all parts; a first storage mechanism for storing partial images and composite images produced by compositing the partial images; a second storage mechanism for storing attribute data related to partial images and composite images and the mirror posture data from partial image acquisition; a partial image acquisition mechanism for incorporating images photographed by the camera and acquiring partial images from these incorporated images, and storing the partial images in the first storage mechanism, and for storing posture data from the acquisition of the partial images of the mirror received from the mirror control mechanism, and attribute data relating to the partial images and composite images, in the second storage mechanism; and an image compositing mechanism for determining a pixel on a composite image surface corresponding to a point in a projection surface from an intersection point between an image plane formed by the partial images and a straight line, which is parallel to a straight line indicating a reflected light beam resulting from a reflection by the mirror of a straight line connecting a point on the projection surface which is established in space at the time of the compositing of the plurality of partial images and the rotational center of the mirror, and which passes through the viewpoint of the camera, compositing the partial images with reference to the contents of the first and second storage mechanisms, and storing the composite image in the first storage mechanism.

In accordance with the invention according to the fourteenth and fifteenth aspects, it is possible to obtain a satisfactory wide-viewfield composite image in which the effects of differences in viewpoint contained in the partial images are reduced, and an effect is achieved whereby, when determining the pixel values in the composite image by means of arithmetic processing such as linear interpolation or the like, blank pixels, which are a product of rounding errors in the coordinate values indicating the positions of the pixels, are not produced in the composite image.

The invention according to the sixteenth aspect comprises an image input apparatus for inputting a wide-viewfield composite image by photographing parts of a field to be photographed while altering the photographic range in the field to be photographed of a camera by rotating a mirror which is supported in a rotatable manner before the camera, and compositing a plurality of partial images of the field to be photographed which are obtained, wherein are provided: a mirror movement mechanism for altering the direction of the mirror so as to change the photographic direction of the camera; a mirror control mechanism for directing the mirror movement mechanism so as to change the orientation of the mirror and for transmitting posture data of the mirror to all parts; a first storage mechanism for storing partial images and composite images produced by compositing the partial images; a second storage mechanism for storing attribute data related to partial images and composite images and the mirror posture data from partial image acquisition; a partial image acquisition mechanism for incorporating images photographed by the camera and acquiring partial images from these incorporated images, and storing the partial images in the first storage mechanism, and for storing posture data from the acquisition of the partial images of the mirror received from the mirror control mechanism, and attribute data relating to the partial images and composite images, in the second storage mechanism; a positioning mechanism for determining positional relationships between partial images stored in the first storage mechanism, determining positional correction amounts of the composited positions of the partial images stored in the second storage mechanism based on the positional relationships obtained, and storing these in the second storage mechanism; and an image compositing mechanism for determining compositing positions of the partial images using the posture data of the camera at the time of acquisition of the partial images stored in the second storage mechanism and the positional correction amounts of the compositing positions obtained from the positioning mechanism, and, in accordance with the compositing positions obtained, determining a pixel on a composite image surface corresponding to a point in the projection surface from the intersection point between an image plane formed by the partial images and a straight line, which is parallel to a straight line showing a reflected light beam resulting from the reflection by the mirror of a straight line connecting a point in the projection surface established in space and the rotational center of the mirror, and which passes through the viewpoint of the camera, compositing the partial images with reference to the contents of the first and second storage mechanisms, and storing the composite image in the first storage mechanism.

In accordance with the invention according to the sixteenth aspect, it is possible to obtain a satisfactory wide-viewfield composite image in which the effects of differences in viewpoint contained in the partial images are reduced, and an effect is achieved whereby, when determining the pixel values in the composite image by means of arithmetic processing such as linear interpolation or the like, blank pixels, which are a product of rounding errors in the coordinate values indicating the positions of the pixels, are not produced in the composite image. Furthermore, it is possible to reduce the errors of the angle detection mechanism of the mirror which constitutes the mirror movement mechanism, and to produce highly accurate composite images.

Additionally, by appropriately setting the existing range of orientation of the mirror during the acquisition of the partial images, it is possible to omit the angle detection mechanism of the mirror, which comprises the mirror movement mechanism in the structure of the image input apparatus.

The invention according to the seventeenth aspect has as the gist thereof a computer-readable recording medium storing a program for executing the functions of an image input apparatus for inputting wide-viewfield composite images by photographing parts of a field to be photographed while altering the photographic direction by rotating a camera which is supported in a rotatable manner, projecting a plurality of partial images of the field to be photographed which are obtained onto a projection surface, and based on the results of this projection, conducting compositing on a composite image surface, wherein is provided an image compositing mechanism, which employs the rotational center of the camera as the center of projection during the compositing of the plurality of partial images, and which employs, as the projection point of a pixel of a partial image, the intersection point between the projection surface which is established in space and a straight line, which is parallel to a straight line connecting the viewpoint of the camera and the pixel in the partial image in an image plane formed by the plurality of partial images, and which passes through the rotational center of the camera.

In accordance with the invention according to the seventeenth aspect, by reading a program recorded in the recording medium into a computer system and executing this, it is possible to obtain a satisfactory wide-viewfield composite image in which the effects of differences in viewpoint contained in the partial images are reduced, even in the case in which the camera is rotated about a point other than the principal point of the lens.

The invention according to the eighteenth aspect has as the gist thereof a computer-readable recording medium storing a program for executing the functions of an image input apparatus for inputting wide-viewfield composite images by photographing parts of a field to be photographed while altering the photographic direction by rotating a camera which is supported in a rotatable manner, projecting a plurality of partial images of the field to be photographed which are obtained onto a projection surface, and based on the results of this projection, conducting compositing on a composite image surface, wherein are provided: a camera movement mechanism for changing the photographic direction of the camera; a posture control mechanism for directing the camera movement mechanism so as to change the photographic direction of the camera and for transmitting camera posture data to all parts; a first storage mechanism for storing partial images and composite images produced by compositing the partial images; a second storage mechanism for storing attribute data related to partial images and composite images and camera posture data from partial image acquisition; a partial image acquisition mechanism for incorporating images photographed by the camera and acquiring partial images from these incorporated images, and storing the partial images in the first storage mechanism, and for storing posture data from the acquisition of the partial images of the camera received from the posture control mechanism, and attribute data relating to the partial images and composite images, in the second storage mechanism; and an image compositing mechanism for setting the rotational center of the camera as a center of projection, determining a projection point so that an intersection point between a projection surface established in space and a straight line, which is parallel with a straight line connecting the viewpoint of the camera and a pixel in a partial image in an image plane formed by the plurality of partial images, and which passes through the rotational center of the camera, is employed as the projection point of the pixel in the partial image, compositing the partial images with reference to the contents of the first and second storage mechanisms, and storing a composite image in the first storage mechanism.

In accordance with the invention according to the eighteenth aspect, by reading a program recorded in the recording medium into a computer system and executing this, it is possible to obtain a satisfactory wide-viewfield composite image in which the effects of differences in viewpoint contained in the partial images are reduced, even in the case in which the camera is rotated about a point other than the principal point of the lens.

The invention according to the nineteenth aspect has as the gist thereof a computer-readable recording medium storing a program for executing the functions of an image input apparatus for inputting wide-viewfield composite images by photographing parts of a field to be photographed while altering the photographic direction by rotating a camera which is supported in a rotatable manner, projecting a plurality of partial images of the field to be photographed which are obtained onto a projection surface, and based on the results of this projection, conducting compositing on a composite image surface, wherein are provided: a camera movement mechanism for changing the photographic direction of the camera; a posture control mechanism for directing the camera movement mechanism so as to change the photographic direction of the camera and for transmitting camera posture data to all parts; a first storage mechanism for storing partial images and composite images produced by compositing the partial images; a second storage mechanism for storing attribute data related to partial images and composite images and camera posture data from partial image acquisition; a partial image acquisition mechanism for incorporating images photographed by the camera and acquiring partial images from these incorporated images, and storing the partial images in the first storage mechanism, and for storing posture data from the acquisition of the partial images of the camera received from the posture control mechanism, and attribute data relating to the partial images and composite images, in the second storage mechanism; a positioning mechanism for determining positional relationships between partial images stored in the first storage mechanism, determining positional correction amounts of the composited positions of the partial images stored in the second storage mechanism based on the positional relationships obtained, and storing these in the second storage mechanism; and an image compositing mechanism for determining partial image compositing positions using the camera posture data obtained at the time of acquisition of the partial images stored in the second storage mechanism and the positional correction amounts determined by the positioning mechanism, and in accordance with the compositing positions determined, setting the center of projection to the center of rotation of the camera, and determining the projection point such that the projection point of a pixel in a partial image is set to the intersection point between the projection surface established in space and a straight line, which is parallel to a straight line connecting the viewpoint of the camera and the pixel in the partial image in an image plane formed by the plurality of partial images, and which passes through the rotational center of the camera, and composites the partial images with reference to the contents of the first and second storage mechanisms, and stores a resulting composite image in the first storage mechanism.

In accordance with the invention according to the nineteenth aspect, by reading a program recorded in the recording medium into a computer system and executing this, it is possible to obtain a satisfactory wide-viewfield composite image in which the effects of differences in viewpoint contained in the partial images are reduced, even in the case in which the camera is rotated about a point other than the principal point of the lens, and furthermore, it is possible to reduce the errors of the angle detection mechanism of the camera which constitutes the camera movement mechanism, and to produce highly accurate composite images.

Additionally, by appropriately setting the existing range of orientation of the camera during the acquisition of the partial images, it is possible to omit the angle detection mechanism of the camera, which comprises the camera movement mechanism in the structure of the image input apparatus.

Furthermore, the gist of the invention according to the 20th aspect relates to a computer-readable recording medium which stores a program for executing the functions of an image input apparatus for inputting a wide-viewfield composite image by photographing parts of a field to be photographed while altering the photographic range of a camera in the field to be photographed by rotating a mirror supported in a rotatable manner before the camera, projecting a plurality of partial images of the field to be photographed obtained onto a projection surface, and based on the results of this projection, conducting compositing on a composite image plane, wherein is provided an image compositing mechanism for setting the rotational center of the mirror during the compositing of the plurality of partial images to the center of projection, and setting the intersection point between the projection surface which is established in space and a straight line, which is parallel to a reflection straight line indicating the reflected light beam resulting when a light beam from the viewpoint of the camera and which passes through a pixel of a partial image in an image plane formed by partial images is reflected by the mirror, and which passes through the rotational center of the mirror, as the projection point of the partial image.

Furthermore, in accordance with the invention according to the 20th aspect, a computer-readable recording medium stores a program for executing the functions of an image input apparatus for inputting a wide-viewfield composite image by photographing parts of a field to be photographed while altering the photographic range of a camera in the field to be photographed by rotating a mirror supported in a rotatable manner before the camera, projecting a plurality of partial images of the field to be photographed obtained onto a projection surface, and based on the results of this projection, conducting compositing on a composite image plane, wherein is provided an image compositing mechanism for setting the rotational center of the mirror during the compositing of the plurality of partial images to the center of projection, and setting the intersection point between the projection surface which is established in space and a straight line, which is parallel to a reflection straight line indicating the reflected light beam resulting when a light beam from the viewpoint of the camera and which passes through a pixel of a partial image in an image plane formed by partial images is reflected by the mirror, and which passes through the rotational center of the mirror, as the projection point of the partial image, so that by reading a program recorded in the recording medium into a computer system and executing this, it is possible to obtain a satisfactory wide-viewfield composite image in which the effects of differences in viewpoint contained in the partial images are reduced.

Furthermore, the gist of the invention according to the 21st aspect relates to a computer-readable recording medium which stores a program for executing the functions of an image input apparatus for inputting a wide-viewfield composite image by photographing parts of a field to be photographed while altering the photographic range of a camera in the field to be photographed by rotating a mirror supported in a rotatable manner before the camera, projecting a plurality of partial images of the field to be photographed obtained onto a projection surface, and based on the results of this projection, conducting compositing on a composite image plane, wherein are provided: a mirror movement mechanism for altering the direction of the mirror so as to change the photographic direction of the camera; a mirror control mechanism for directing the mirror movement mechanism so as to change the orientation of the mirror and for transmitting posture data of the mirror to all parts; a first storage mechanism for storing partial images and composite images produced by compositing the partial images; a second storage mechanism for storing attribute data related to partial images and composite images and the mirror posture data from partial image acquisition; a partial image acquisition mechanism for incorporating images photographed by the camera and acquiring partial images from these incorporated images, and storing the partial images in the first storage mechanism, and for storing posture data from the acquisition of the partial images of the mirror received from the mirror control mechanism, and attribute data relating to the partial images and composite images, in the second storage mechanism; and an image compositing mechanism which uses the rotational center of the mirror as the center of projection during the compositing of the plurality of partial images, and which determines a projection point such that the intersection point between the projection surface which is established in space and a straight line, which is parallel to a reflection straight line indicating a reflected beam of light resulting from the reflection by the mirror of a light beam from the viewpoint of the camera which passes through a pixel of a partial image in an image plane formed by the partial images, and which passes through the rotational center of the mirror, is employed as the projection point of the pixel of the partial image, and which composites the partial images with reference to the contents of the first and second storage mechanisms, and stores a composite image in the first storage mechanism.

In accordance with the invention according to the 21st aspect, by reading a program recorded in the recording medium into a computer system and executing this, it is possible to obtain a satisfactory wide-viewfield composite image in which the effects of differences in viewpoint contained in the partial images are reduced.

Furthermore, the gist of the invention according to the 22nd aspect relates to a computer-readable recording medium which stores a program for executing the functions of an image input apparatus for inputting a wide-viewfield composite image by photographing parts of a field to be photographed while altering the photographic range of a camera in the field to be photographed by rotating a mirror supported in a rotatable manner before the camera, projecting a plurality of partial images of the field to be photographed obtained onto a projection surface, and based on the results of this projection, conducting compositing on a composite image plane, wherein are provided: a mirror movement mechanism for altering the direction of the mirror so as to change the photographic direction of the camera; a mirror control mechanism for directing the mirror movement mechanism so as to change the orientation of the mirror and for transmitting posture data of the mirror to all parts; a first storage mechanism for storing partial images and composite images produced by compositing the partial images; a second storage mechanism for storing attribute data related to partial images and composite images and the mirror posture data from partial image acquisition; a partial image acquisition mechanism for incorporating images photographed by the camera and acquiring partial images from these incorporated images, and storing the partial images in the first storage mechanism, and for storing posture data from the acquisition of the partial images of the mirror received from the mirror control mechanism, and attribute data relating to the partial images and composite images, in the second storage mechanism; a positioning mechanism for determining positional relationships between partial images stored in the first storage mechanism, determining positional correction amounts of the composited positions of the partial images stored in the second storage mechanism based on the positional relationships obtained, and storing these in the second storage mechanism; and an image compositing mechanism for determining compositing positions of the partial images using the posture data of the camera at the time of acquisition of the partial images stored in the second storage mechanism and the positional correction amounts of the compositing positions obtained from the positioning mechanism, and, in accordance with the compositing positions obtained, setting the rotational center of the mirror as the center of projection during the compositing of the plurality of partial images, determining a projection point such that the intersection point between the projection surface which is established in space and a straight line, which is parallel to a reflection straight line indicating a reflected beam of light resulting from the reflection by the mirror of a light beam from the viewpoint of the camera which passes through a pixel of a partial image in an image plane formed by the partial images, and which passes through the rotational center of the mirror, is employed as the projection point of the pixel of the partial image, compositing the partial images with reference to the contents of the first and second storage mechanisms, and storing a composite image in the first storage mechanism.

In accordance with the invention according to the 22nd aspect, by reading a program recorded in the recording medium into a computer system and executing this, it is possible to obtain a satisfactory wide-viewfield composite image in which the effects of differences in viewpoint contained in the partial images are reduced, and furthermore, it is possible to reduce the errors of the angle detection mechanism of the mirror which constitutes the mirror movement mechanism, and to produce highly accurate composite images.

Additionally, by appropriately setting the existing range of orientation of the mirror during the acquisition of the partial images, it is possible to omit the angle detection mechanism of the mirror, which comprises the mirror movement mechanism in the structure of the image input apparatus.

Furthermore, the gist of the invention according to the 23rd aspect relates to a computer-readable recording medium for storing a program for executing the functions of an image input apparatus for inputting a wide-viewfield composite image by photographing parts of a field to be photographed while altering the photographic direction by rotating a camera supported in a rotatable manner, and compositing a plurality of partial images of the field to be photographed which are obtained, wherein is provided an image compositing mechanism which determines a pixel on a composite image surface corresponding to a point in a projection surface from the intersection point between an image plane formed by the plurality of partial images and a straight line, which is parallel to a straight line connecting the point in the projection surface established in space during the compositing of the plurality of partial images and the rotational center of the camera, and which passes through the viewpoint of the camera.

In accordance with the invention as disclosed in the 23rd aspect, by reading a program recorded in the recording medium into a computer system and executing this, it is possible to obtain a satisfactory wide-viewfield composite image in which the effects of differences in viewpoint contained in the partial images are reduced, even in the case in which the camera is rotated about a point other than the principal point of the lens, and furthermore, an effect is achieved whereby, when determining the pixel values in the composite image by means of arithmetic processing such as linear interpolation or the like, blank pixels, which are a product of rounding errors in the coordinate values indicating the positions of the pixels, are not produced in the composite image.

Furthermore, the gist of the invention according to the 24th aspect relates to a computer-readable recording medium for storing a program for executing the functions of an image input apparatus for inputting a wide-viewfield composite image by photographing parts of a field to be photographed while altering the photographic direction by rotating a camera supported in a rotatable manner, and compositing a plurality of partial images of the field to be photographed which are obtained, wherein are provided: a camera movement mechanism for changing the photographic direction of the camera; a posture control mechanism for directing the camera movement mechanism so as to change the photographic direction of the camera and for transmitting camera posture data to all parts; a first storage mechanism for storing partial images and composite images produced by compositing the partial images; a second storage mechanism for storing attribute data related to partial images and composite images and camera posture data from partial image acquisition; a partial image acquisition mechanism for incorporating images photographed by the camera and acquiring partial images from these incorporated images, and storing the partial images in the first storage mechanism, and for storing posture data from the acquisition of the partial images of the camera received from the posture control mechanism, and attribute data relating to the partial images and composite images, in the second storage mechanism; and an image compositing mechanism for determining a pixel on a composite image surface corresponding to a point on the projection surface from the intersection point between an image plane formed by the plurality of partial images obtained and a straight line, which is parallel to a straight line connecting a point in the projection surface established in space at the time of the compositing of the plurality of partial images with the rotational center of the camera, and which passes through the viewpoint of the camera, compositing the partial images with reference to the contents of the first and second storage mechanisms, and storing the composite image in the first storage mechanism.

In accordance with the invention according to the 24th aspect, by reading a program recorded in the recording medium into a computer system and executing this, it is possible to obtain a satisfactory wide-viewfield composite image in which the effects of differences in viewpoint contained in the partial images are reduced, even in the case in which the camera is rotated about a point other than the principal point of the lens, and furthermore, an effect is achieved whereby, when determining the pixel values in the composite image by means of arithmetic processing such as linear interpolation or the like, blank pixels, which are a product of rounding errors in the coordinate values indicating the positions of the pixels, are not produced in the composite image.

Furthermore, the gist of the invention according to the 25th aspect relates to a computer-readable recording medium for storing a program for executing the functions of an image input apparatus for inputting a wide-viewfield composite image by photographing parts of a field to be photographed while altering the photographic direction by rotating a camera supported in a rotatable manner, and compositing a plurality of partial images of the field to be photographed which are obtained, wherein are provided: a camera movement mechanism for changing the photographic direction of the camera; a posture control mechanism for directing the camera movement mechanism so as to change the photographic direction of the camera and for transmitting camera posture data to all parts; a first storage mechanism for storing partial images and composite images produced by compositing the partial images; a second storage mechanism for storing attribute data related to partial images and composite images and camera posture data from partial image acquisition; a partial image acquisition mechanism for incorporating images photographed by the camera and acquiring partial images from these incorporated images, and storing the partial images in the first storage mechanism, and for storing posture data from the acquisition of the partial images of the camera received from the posture control mechanism, and attribute data relating to the partial images and composite images, in the second storage mechanism; a positioning mechanism for determining positional relationships between partial images stored in the first storage mechanism, determining positional correction amounts of the composited positions of the partial images stored in the second storage mechanism based on the positional relationships obtained, and storing these in the second storage mechanism; and an image compositing mechanism for determining compositing positions of the partial images using the posture data of the camera at the time of acquisition of the partial images stored in the second storage mechanism and the positional correction amounts of the compositing positions obtained from the positioning mechanism, and, in accordance with the compositing positions obtained, determining a pixel on a composite image surface corresponding to a point on the projection surface from the intersection point between an image plane formed by the plurality of partial images obtained and a straight line, which is parallel to a straight line connecting a point in the projection surface established in space with the rotational center of the camera, and which passes through the viewpoint of the camera, compositing the partial images with reference to the contents of the first and second storage mechanisms, and storing the composite image in the first storage mechanism.

In accordance with the invention according to the 25th aspect, by reading a program recorded in the recording medium into a computer system and executing this, it is possible to obtain a satisfactory wide-viewfield composite image in which the effects of differences in viewpoint contained in the partial images are reduced, even in the case in which the camera is rotated about a point other than the principal point of the lens, and furthermore, an effect is achieved whereby, when determining the pixel values in the composite image by means of arithmetic processing such as linear interpolation or the like, blank pixels, which are a product of rounding errors in the coordinate values indicating the positions of the pixels, are not produced in the composite image.

Furthermore, it is possible to reduce the errors of the angle detection mechanism of the camera which constitutes the camera movement mechanism, and to produce highly accurate composite images.

Additionally, by appropriately setting the existing range of orientation of the camera during the acquisition of the partial images, it is possible to omit the angle detection mechanism of the camera, which comprises the camera movement mechanism in the structure of the image input apparatus.

Furthermore, the gist of the invention according to the 26th aspect relates to a computer-readable recording medium which stores a program for realizing the functions of an image input apparatus for inputting a wide-viewfield composite image by photographing parts of a field to be photographed while altering the photographic range of a camera in the field to be photographed by rotating a mirror supported in a rotatable manner before the camera, and compositing a plurality of partial images of the field to be photographed which are obtained, wherein is provided an image compositing mechanism for determining a pixel on a composite image surface corresponding to a point in a projection surface from the intersection point between an image plane formed by the partial images and a straight line, which is parallel to a straight line indicating the reflected light beam resulting from the reflection of a straight line connecting the point in the projection surface which is established in space during the compositing of the plurality of partial images and the rotational center of the mirror, and passes through the viewpoint of the camera.

In accordance with the invention according to the 26th aspect, by reading a program recorded in the recording medium into a computer system and executing this, it is possible to obtain a satisfactory wide-viewfield composite image in which the effects of differences in viewpoint contained in the partial images are reduced, and furthermore, an effect is achieved whereby, when determining the pixel values in the composite image by means of arithmetic processing such as linear interpolation or the like, blank pixels, which are a product of rounding errors in the coordinate values indicating the positions of the pixels, are not produced in the composite image.

Furthermore, the gist of the invention according to the 27th aspect relates to a computer-readable recording medium which stores a program for realizing the functions of an image input apparatus for inputting a wide-viewfield composite image by photographing parts of a field to be photographed while altering the photographic range of a camera in the field to be photographed by rotating a mirror supported in a rotatable manner before the camera, and compositing a plurality of partial images of the field to be photographed which are obtained, wherein are provided: a mirror movement mechanism for altering the direction of the mirror so as to change the photographic direction of the camera; a mirror control mechanism for directing the mirror movement mechanism so as to change the orientation of the mirror and for transmitting posture data of the mirror to all parts; a first storage mechanism for storing partial images and composite images produced by compositing the partial images; a second storage mechanism for storing attribute data related to partial images and composite images and the mirror posture data from partial image acquisition; a partial image acquisition mechanism for incorporating images photographed by the camera and acquiring partial images from these incorporated images, and storing the partial images in the first storage mechanism, and for storing posture data from the acquisition of the partial images of the mirror received from the mirror control mechanism, and attribute data relating to the partial images and composite images, in the second storage mechanism; and an image compositing mechanism for determining a pixel on a composite image surface corresponding to a point in a projection surface from an intersection point between an image plane formed by the partial images and a straight line, which is parallel to a straight line indicating a reflected light beam resulting from a reflection by the mirror of a straight line connecting a point on the projection surface which is established in space at the time of the compositing of the plurality of partial images and the rotational center of the mirror, and which passes through the viewpoint of the camera, compositing the partial images with reference to the contents of the first and second storage mechanisms, and storing the composite image in the first storage mechanism.

In accordance with the invention according to the 27th aspect, by reading a program recorded in the recording medium into a computer system and executing this, it is possible to obtain a satisfactory wide-viewfield composite image in which the effects of differences in viewpoint contained in the partial images are reduced, and furthermore, an effect is achieved whereby, when determining the pixel values in the composite image by means of arithmetic processing such as linear interpolation or the like, blank pixels, which are a product of rounding errors in the coordinate values indicating the positions of the pixels, are not produced in the composite image.

Furthermore, the gist of the invention according to the 28th aspect relates to a computer-readable recording medium which stores a program for realizing the functions of an image input apparatus for inputting a wide-viewfield composite image by photographing parts of a field to be photographed while altering the photographic range of a camera in the field to be photographed by rotating a mirror supported in a rotatable manner before the camera, and compositing a plurality of partial images of the field to be photographed which are obtained, wherein are provided: a mirror movement mechanism for altering the direction of the mirror so as to change the photographic direction of the camera; a mirror control mechanism for directing the mirror movement mechanism so as to change the orientation of the mirror and for transmitting posture data of the mirror to all parts; a first storage mechanism for storing partial images and composite images produced by compositing the partial images; a second storage mechanism for storing attribute data related to partial images and composite images and the mirror posture data from partial image acquisition; a partial image acquisition mechanism for incorporating images photographed by the camera and acquiring partial images from these incorporated images, and storing the partial images in the first storage mechanism, and for storing posture data from the acquisition of the partial images of the mirror received from the mirror control mechanism, and attribute data relating to the partial images and composite images, in the second storage mechanism; a positioning mechanism for determining positional relationships between partial images stored in the first storage mechanism, determining positional correction amounts of the composited positions of the partial images stored in the second storage mechanism based on the positional relationships obtained, and storing these in the second storage mechanism; and an image compositing mechanism for determining compositing positions of the partial images using the posture data of the camera at the time of acquisition of the partial images stored in the second storage mechanism and the positional correction amounts of the compositing positions obtained from the positioning mechanism, and, in accordance with the compositing positions obtained, determining a pixel on a composite image surface corresponding to a point in a projection surface from an intersection point between an image plane formed by the partial images and a straight line, which is parallel to a straight line indicating a reflected light beam resulting from a reflection by the mirror of a straight line connecting a point on the projection surface which is established in space at the time of the compositing of the plurality of partial images and the rotational center of the mirror, and which passes through the viewpoint of the camera, compositing the partial images with reference to the contents of the first and second storage mechanisms, and storing the composite image in the first storage mechanism.

In accordance with the invention according to the 28th aspect, by reading a program recorded in the recording medium into a computer system and executing this, it is possible to obtain a satisfactory wide-viewfield composite image in which the effects of differences in viewpoint contained in the partial images are reduced, and furthermore, an effect is achieved whereby, when determining the pixel values in the composite image by means of arithmetic processing such as linear interpolation or the like, blank pixels, which are a product of rounding errors in the coordinate values indicating the positions of the pixels, are not produced in the composite image.

Furthermore, it is possible to reduce the errors of the angle detection mechanism of the mirror which constitutes the mirror movement mechanism, and to produce highly accurate composite images.

Additionally, by appropriately setting the existing range of orientation of the mirror during the acquisition of the partial images, it is possible to omit the angle detection mechanism of the mirror, which comprises the mirror movement mechanism in the structure of the image input apparatus.

In order to achieve the second object described above, the invention according to the 29th aspect comprises an image input apparatus which is provided with a camera which photographs a field to be photographed, a mirror which is disposed in front of the camera in order to alter the optical path of the reflected light from the field to be photographed in the direction of the camera lens of the camera, a mirror rotation mechanism for rotating the mirror about the optical axis of the camera, and a processing mechanism for compositing a plurality of images inputted from the camera in accordance with the rotation of the mirror and producing a wide view angle image, wherein the mirror is a triangular columnar mirror in which two of the side surfaces are reflective surfaces, the camera takes photographs using reflected light from the objects to be photographed, the optical path of which is changed by the two reflective surfaces of the mirror, and the processing mechanism separates a plurality of images photographed by the camera in accordance with the reflective surfaces of the mirror and conducts independent image composition.

Furthermore, the invention according to the 30th aspect comprises the image input apparatus as disclosed in the 29th aspect, wherein the processing mechanism is provided with: an image acquisition mechanism which acquires images photographed by the camera and digitizes these, an image separation mechanism which separates the images acquired and digitized by the image acquisition mechanism and separates these according to the two reflective surfaces of the mirror, a first image compositing mechanism which composites the images separated by the image separation mechanism in accordance with a first reflective surface among the two reflective surfaces of the mirror, a second image compositing mechanism, which composites images separated by the image separation mechanism in accordance with a second reflective surface among the two reflective surfaces of the mirror, and an image updating mechanism, which conducts updating by overwriting images composited by the first and second image compositing mechanisms onto a wide-viewfield image.

In accordance with the invention according to the 29th and 30th aspects, it is possible to simultaneously photograph images in two directions and to conduct composition and updating, and for that reason, it becomes possible to input wide-viewfield images at high speed when compositing a plurality of partial images acquired by rotating a mirror in front of a camera.

The invention according to the 31st aspect is provided with: first and second cameras which are disposed so that the optical axes of the camera lens thereof are in agreement and they are in mutual opposition and which photograph a field to be photographed, a double-sided mirror, which is disposed between the first and second cameras and which alters the optical path of light reflected from the field to be photographed in the direction of the camera lens of the first and second camera, a mirror rotation mechanism for rotating the double-sided mirror about the optical axes of the first and second cameras, and a processing mechanism for compositing a plurality of images inputted from the first and second cameras in accordance with the rotation of the mirror and producing a wide view angle image.

Furthermore, the invention according to the 32nd aspect comprises the image input apparatus as disclosed in claim 31, wherein the processing mechanism comprises: a first image acquisition mechanism for acquiring images photographed by the first camera which photographs reflected light from a first reflective surface of the double-sided mirror, and digitizes these images, a second image acquisition mechanism for acquiring images photographed by the second camera which photographs light reflected from a second reflective surface of the double-sided mirror and digitizes these images, a first image compositing mechanism for compositing images digitized by the first image acquisition mechanism, a second image compositing mechanism for compositing images digitized by the second image acquisition mechanism, and an image updating mechanism for conducting updating by overwriting images composited by the first and second image compositing mechanisms onto a wide-viewfield image.

In accordance with the invention according to the 31st and 32nd aspects, it is possible to input wide-viewfield images at high speed when compositing a plurality of partial images acquired by rotating a mirror before cameras, and it is possible to produce wide-viewfield images having higher resolution than that of wide-viewfield images obtained by the image input apparatus in accordance with the invention according to the 29th and 30th aspects.

BRIEF DESCRIPTION OF THE DRAWINGS

FIGS. 40A and 40B show an example of a composite image obtained from points in a partial image corresponding to pixel values in a composite image, in accordance with the image input apparatus in accordance with the fourth embodiment of the present invention.

DETAILED DESCRIPTION OF THE PREFERRED EMBODIMENTS

Hereinbelow, embodiments of the present invention will be explained in detail with reference to the figures.

Figure 1:
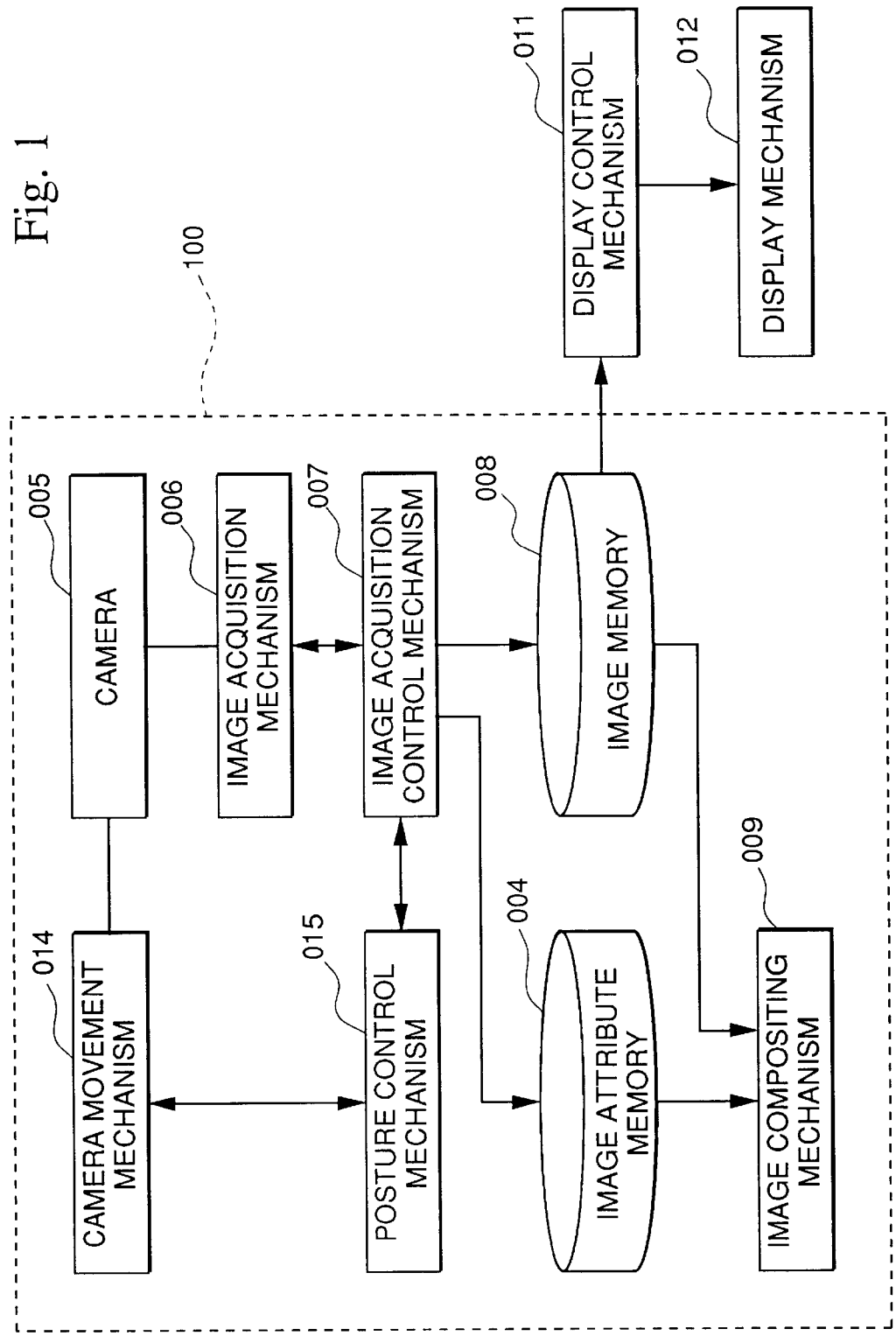
FIG. 1 is a block diagram showing the structure of an image input apparatus in accordance with a first embodiment of the present invention.

FIG. 1 serves to explain a first embodiment of the present invention.

In FIG. 1, image input apparatus 100 in accordance with the present invention comprises a camera movement mechanism 014 for altering the photographic direction of camera 005, or in other words, altering the orientation thereof, a posture control mechanism 015, which sends directives to camera movement mechanism 014 so as to change the orientation of camera 005, and transmits posture data of camera 005 to all parts; a camera 005, which acquires images of the external field; an image acquisition mechanism 006, which incorporates images taken by camera 005 into the apparatus; an image acquisition control mechanism 007, which controls image acquisition mechanism 006 and stores partial images in image memory 008, and which stores attribute data of the composite image and the partial images and the orientation of camera 005 during the acquisition of the partial images in image attribute memory 004; an image memory 008, which stores partial images stored by image acquisition control mechanism 007 and stores composite images produced by compositing the partial images obtained; an image attribute memory 004, which stores attribute data of the partial images and data related to the orientation of camera 005 during the acquisition of the partial images; and an image compositing mechanism 009, which reduces the effects of differences in viewpoint contained in the partial images by making the center of rotation of the camera the center of projection and employing an infinite point along a straight line in space corresponding to a pixel in each partial image and determining the projection point, and which composites the partial images with reference to the image attribute memory 004 and the image memory 008, and stores the composite image in image memory 008. Here, image acquisition mechanism 006 and image acquisition control mechanism 007 correspond to the partial image acquisition mechanism of the present invention, while image memory 008 corresponds to the first storage mechanism of the present invention, and image attribute memory 004 corresponds to the second storage mechanism of the present invention.

The outlines of the operation of a first embodiment of an image input apparatus 100 in accordance with the present invention are as given below.

The orientation of camera 005 can be changed by camera movement mechanism 014. Camera movement mechanism 014 alters the orientation of camera 005 in accordance with directives from posture control mechanism 015.

Camera 005 is capable of acquiring images of the state of the external field, and the range photographed by camera 005 is changed in accordance with the orientation thereof. Posture control mechanism 015 sends directives to camera movement mechanism 014 so as to alter the orientation of camera 005, and camera movement mechanism 014 receives the directives from posture control mechanism 015, and moves the orientation of camera 005.

Next, image acquisition control mechanism 007 sends directives to image acquisition mechanism 006 so as to acquire partial images.

Furthermore, when image acquisition mechanism 006 receives directives from image acquisition control mechanism 007, then partial images are acquired by camera 005, the orientation of which has been altered by directives from posture control mechanism 015, and these are incorporated into the apparatus.

Image acquisition control mechanism 007 stores the images incorporated by image acquisition mechanism 006 in image memory 008, and stores data relating to the orientation of camera 005 during image acquisition in image attribute memory 004.

Image compositing mechanism 009 determines the compositing positions of the partial images using the posture data of camera 005 from the acquisition of the partial images stored in image attribute memory 004 by image acquisition control mechanism 007. In accordance with the compositing positions thus determined, the image compositing mechanism 009 uses the center of rotation of the camera as the center of projection, and employs an infinite point along a straight line in space corresponding to a pixel in each partial image and determines the projection point, or in other words, uses the center of rotation of the camera as the center of projection, and employs the point of intersection between a projection surface established in space and a straight line, which is parallel to a straight line connecting the viewpoint of the camera and a pixel in a partial image in a partial image plane formed by the plurality of partial images, and which passes through the rotational center of the camera, as the projection point of the pixel in the partial image, and thereby, composites the partial images stored in image memory 008 on the composite image stored in image memory 008 and thus updates the composite image.

By repeating the processing described above, the image input apparatus 100 of the present invention is capable of acquiring a wide-viewfield composite image.

After the partial images or composite images obtained by this image apparatus 100 are selected, for example, by display control mechanism 011, they may be displayed by display mechanism 012, and presented to a user.

Next, a second embodiment of the present invention will be explained in detail with reference to the figures.

Figure 2:
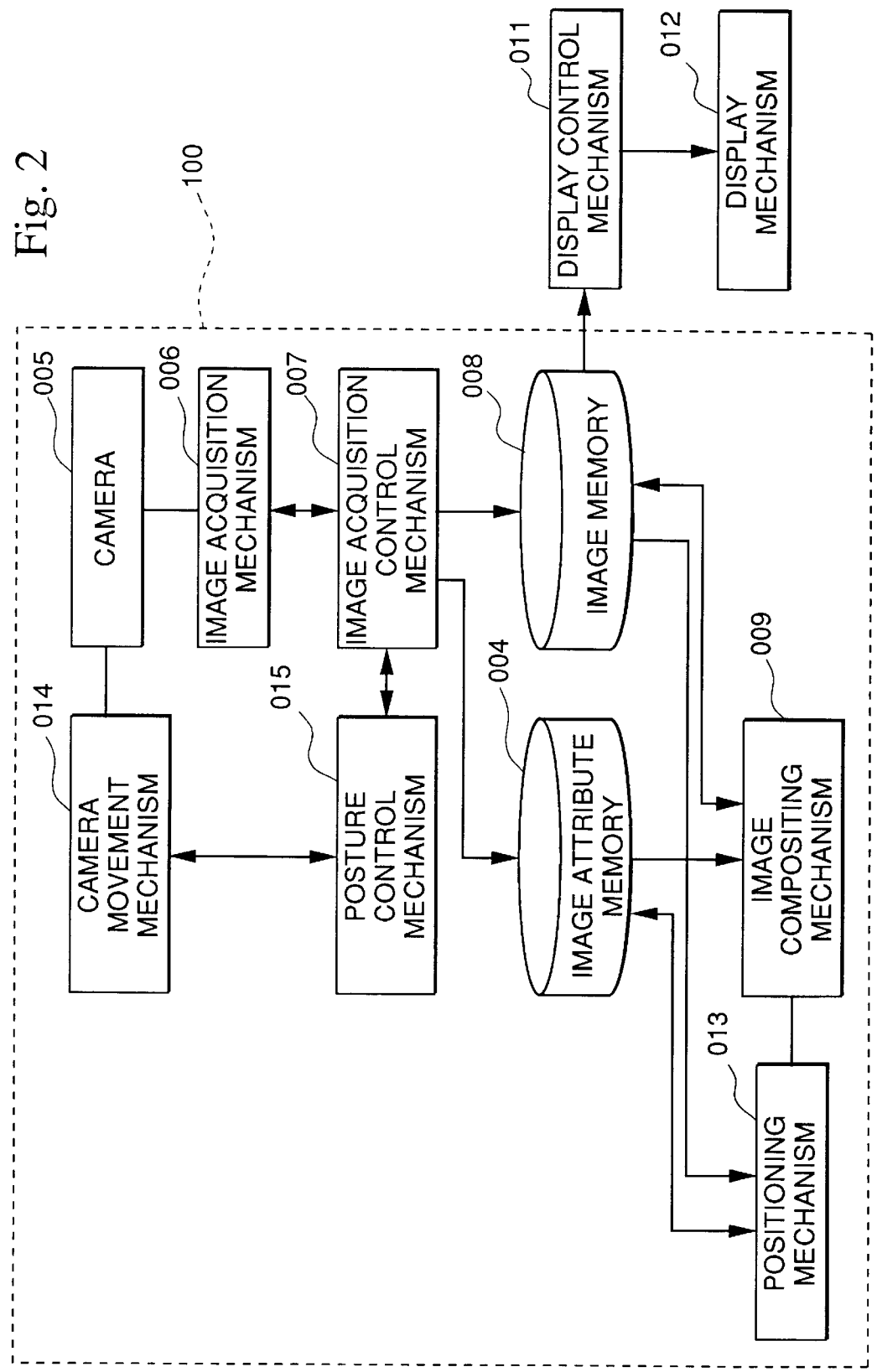
FIG. 2 is a block diagram showing the structure of an image input apparatus in accordance with a second embodiment of the present invention.

FIG. 2 serves to explain the structure of the second embodiment of the present invention.

Those structural elements having the same names as in the first embodiment perform essentially the same function. Hereinbelow, an explanation will be given with respect to the differences between this embodiment and the first embodiment.

In the second embodiment, in contrast to the first embodiment, a positioning mechanism 013 is added which applies positioning processing between partial images stored within image memory 008 and determines the positional relationships between partial images, and based on these results, determines positional correction amounts for the acquisition positions of each partial image stored in image attribute memory 004, and stores these in image attribute memory 004.

Furthermore, among the structural elements of the second embodiment, the image attribute memory 004 stores the orientation data of camera 005 at the time of acquisition of the partial images stored by image acquisition control mechanism 007 using camera 005 and image acquisition mechanism 006, and attribute data relating to the partial images and the composite images, as well as positional correction amounts of the composited positions of each partial image determined by positioning mechanism 013; furthermore, image compositing mechanism 009 determines the compositing positions of the partial images using the orientation data of camera 005 at the time of acquisition of the partial images stored in image attribute memory 004 by image acquisition control mechanism 007, and the positional correction amounts of the composited positions determined by positioning mechanism 013, and in accordance with the composited positions determined, employs the center of rotation of the camera as a center of rotation of the projection, and determines a projection point using an infinite point along a straight line in space corresponding to a pixel in each partial image, or in other words, employs the center of rotation of the camera as the center of projection, and sets, as the projection point of the pixel in a partial image, the intersection point between a projection surface established in space and a straight line, which is parallel to a straight line connecting the viewpoint of the camera and the pixel of the partial image in an image plane formed by the plurality of partial images, and which passes through the center of rotation of the camera, and thereby composites the partial images stored in image memory 008 on the composite image stored in image memory 008 while reducing the effects of differences in viewpoint contained in the partial images, and thus updates the composite image.

The outlines of the operation of the second embodiment will now be explained.

The orientation of camera 005 can be changed by camera movement mechanism 014. Camera movement mechanism 014 alters the orientation of camera 005 in accordance with directives from posture control mechanism 015.

Camera 005 is capable of acquiring images of the state of the external field, and the range photographed by camera 005 is changed in accordance with the orientation thereof.

Posture control mechanism 015 sends directives to camera movement mechanism 014 so as to alter the orientation of camera 005, and camera movement mechanism 014 receives the directives from posture control mechanism 015, and moves the orientation of camera 005.

Next, image acquisition control mechanism 007 sends directives to image acquisition mechanism 006 so as to acquire partial images.

Furthermore, when image acquisition mechanism 006 receives directives from image acquisition control mechanism 007, then partial images are acquired by camera 005, the orientation of which has been altered by directives from posture control mechanism 015, and these are incorporated into the apparatus.

Image acquisition control mechanism 007 stores the partial images incorporated by image acquisition mechanism 006 in image memory 008, and stores data relating to the orientation of camera 005 during image acquisition in image attribute memory 004.

Positioning mechanism 013 determines the positional relationships between the partial images by applying positioning processing between the partial images in image memory 008, and based on the results, determines positional correction amounts of each partial image in image attribute memory 004, and stores these in image attribute memory 004.

Image compositing mechanism 009 determines compositing positions of the partial images using the orientation data of camera 005 at the time of acquisition of the partial images stored in image attribute memory 004 by image acquisition control mechanism 007, and the positional correction amounts determined by positioning mechanism 013, and in accordance with the compositing positions determined, uses the center of rotation of the camera as the center of projection, and employs an infinite point along a straight line in space corresponding to a pixel in each partial image and determines the projection point, or in other words, uses the center of rotation of the camera as the center of projection, and employs the point of intersection between a projection surface established in space and a straight line, which is parallel to a straight line connecting the viewpoint of the camera and a pixel in a partial image in a partial image plane formed by the plurality of partial images, and which passes through the rotational center of the camera, as the projection point of the pixel in the partial image, and thereby, composites the partial images stored in image memory 008 on the composite image stored in the same image memory 008, and thus updates the composite image.

By repeating the processing described above, the image input apparatus 100 of the present invention is capable of acquiring a wide-viewfield composite image.

After the partial images or composite images obtained by this image apparatus 100 are selected, for example, by display control mechanism 011, they may be displayed by display mechanism 012, and presented to a user.

Figure 3:
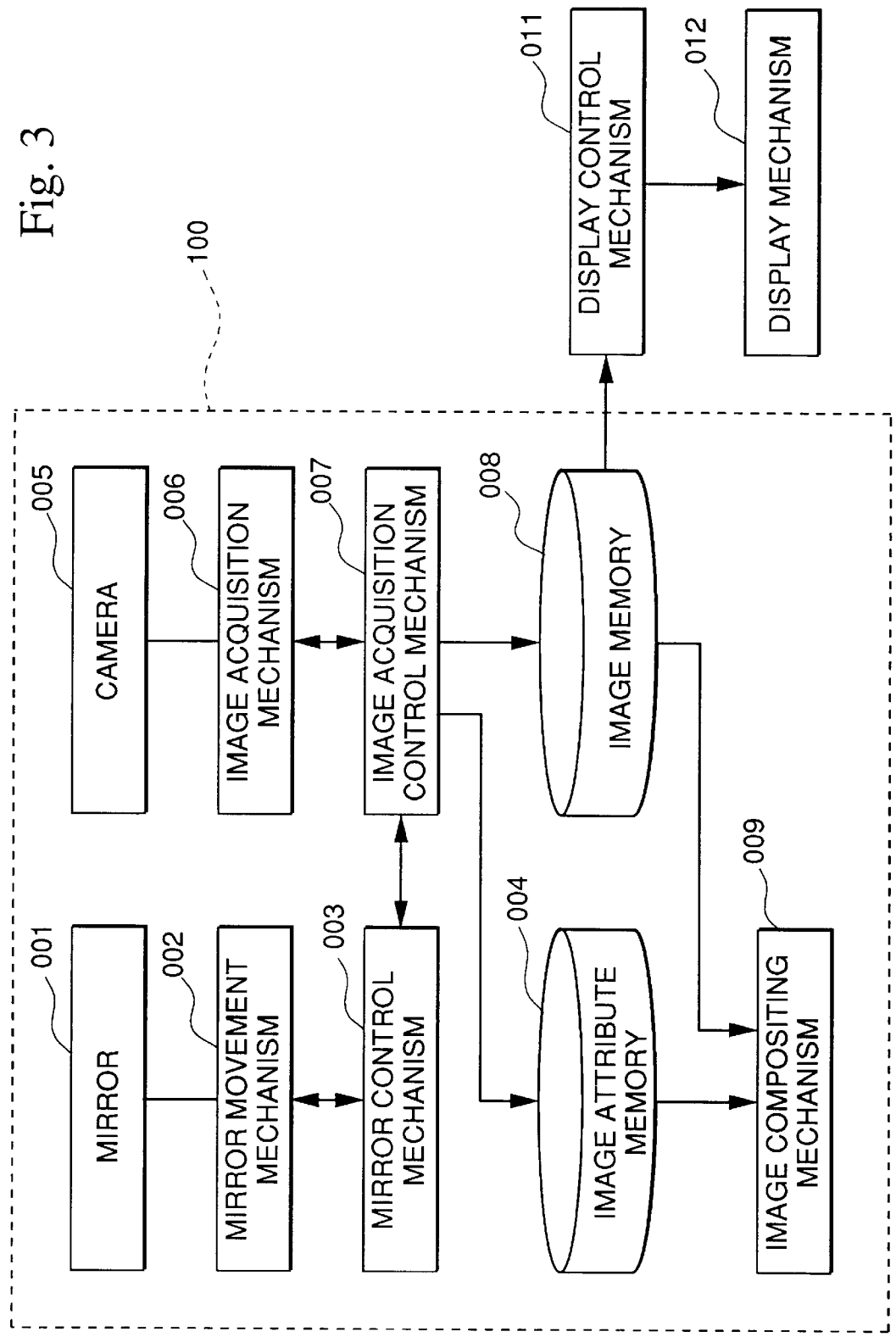
FIG. 3 is a block diagram showing the structure of an image input apparatus in accordance with a third embodiment of the present invention.

FIG. 3 serves to explain the structure of the third embodiment of the present invention.

Those structural elements having the same names as in the first and second embodiments perform essentially the same function. Hereinbelow, an explanation will be given with respect to the differences between this embodiment and the first embodiment.

In the third embodiment, in contrast to the first embodiment, the camera movement mechanism 014 and the posture control mechanism 015 are omitted, and a mirror 001 which is supported in front of the lens of camera 005 and the orientation of which may be changed by a mirror movement mechanism 002, a mirror movement mechanism 002 for altering the orientation of mirror 001, and a mirror control mechanism 003 for sending directives to mirror movement mechanism 002 so as to change the orientation of mirror 001, are added.

Furthermore, the various structural elements in embodiment 1 are changed as follows: camera 005 is capable of photographing the state of an external field via mirror 001, and the field photographed by camera 005 changes based on the orientation of mirror 001; image acquisition control mechanism 007 sends a directive to image acquisition mechanism 006 so as to acquire partial images, and stores the images incorporated by image acquisition mechanism 006 in image memory 008, and stores the orientation data of mirror 001 at the time of image acquisition in image position memory 004; image positioning memory 004 stores the orientation data of the mirror at the time of the acquisition of the partial images acquired by the image acquisition control mechanism 007 using camera 005 and image acquisition mechanism 006; and image compositing mechanism 009 determines compositing positions of the partial images using the orientation data of mirror 001 at the time of the acquisition of the partial images stored in image positioning memory 004 by image acquisition control mechanism 007, and uses the rotational center of the mirror as the center of projection, and determines the projection point using an infinite point along a straight line in space corresponding to a pixel in each partial image, or in other words, uses the center of rotation of the mirror as the center of projection, and sets, as the projection point of a partial image, an intersection point between a projection surface established in space and a straight line, which is parallel to a reflection straight line indicating a reflected light beam resulting from the reflection, at the mirror, of a light beam traveling from the viewpoint of the camera and passing through a pixel of the partial image in an image plane formed by the partial images, and which passes through the center of rotation of the mirror, and thereby, composites the partial images while reducing the effects of differences in viewpoint contained in the partial images.

The outlines of the operation of the third embodiment of the image input apparatus 100 in accordance with the present invention are as given below.

Mirror 001 is supported in front of camera 005, and the orientation thereof can be altered by mirror movement mechanism 002. Mirror movement mechanism 002 alters the orientation of mirror 001 in accordance with directives from mirror control mechanism 003.

Camera 005 is capable of photographing the state of an outside field via mirror 001, and the range photographed by camera 005 changes in accordance with the orientation of mirror 001.

Mirror control mechanism 003 sends a directive to mirror movement mechanism 002 so as to alter the orientation of mirror 001, and mirror movement mechanism 002 receives the directive from mirror control mechanism 003 and moves the orientation of mirror 001.

Next, image acquisition mechanism 007 sends a directive to image mechanism 006 so as to acquire partial images.

Next, image acquisition mechanism 006 receives the directive from image acquisition control mechanism 007, and camera 005 acquires partial images via the mirror 001, the orientation of which was altered in accordance with the directive from mirror control mechanism 003, and these images are incorporated into the apparatus.

Image acquisition control mechanism 007 stores the images incorporated by image acquisition mechanism 006 in image memory 008, and stores the orientation data of the mirror at the time of image acquisition and the attribute data of the partial images in image attribute memory 004.

Image compositing mechanism 009 determines compositing positions of the partial images using the orientation data of mirror 001 at the time of the acquisition of the partial images stored in image positioning memory 004 by image acquisition control mechanism 007. In accordance with the compositing positions obtained, it uses the rotational center of the mirror as the center of projection, and determines the projection point using an infinite point along a straight line in space corresponding to a pixel in each partial image, or in other words, uses the center of rotation of the mirror as the center of projection, and sets, as the projection point of a partial image, an intersection point between a projection surface established in space and a straight line, which is parallel to a reflection straight line indicating a reflected light beam resulting from the reflection, at the mirror, of a light beam traveling from the viewpoint of the camera and passing through a pixel of the partial image in an image plane formed by the partial images, and which passes through the center of rotation of the mirror, and thereby, composites the partial images stored in image memory 008 on the composite image stored in image memory 008, while reducing the effects of differences in viewpoint contained in the partial images.

By repeating the processing described above, the image input apparatus 100 of the present invention is capable of acquiring a wide-viewfield composite image.

After the partial images or composite images obtained by this image apparatus 100 are selected, for example, by display control mechanism 011, they may be displayed by display mechanism 012, and presented to a user.

Next, a fourth embodiment of the present invention will be explained in detail with reference to the figures.

Figure 4:
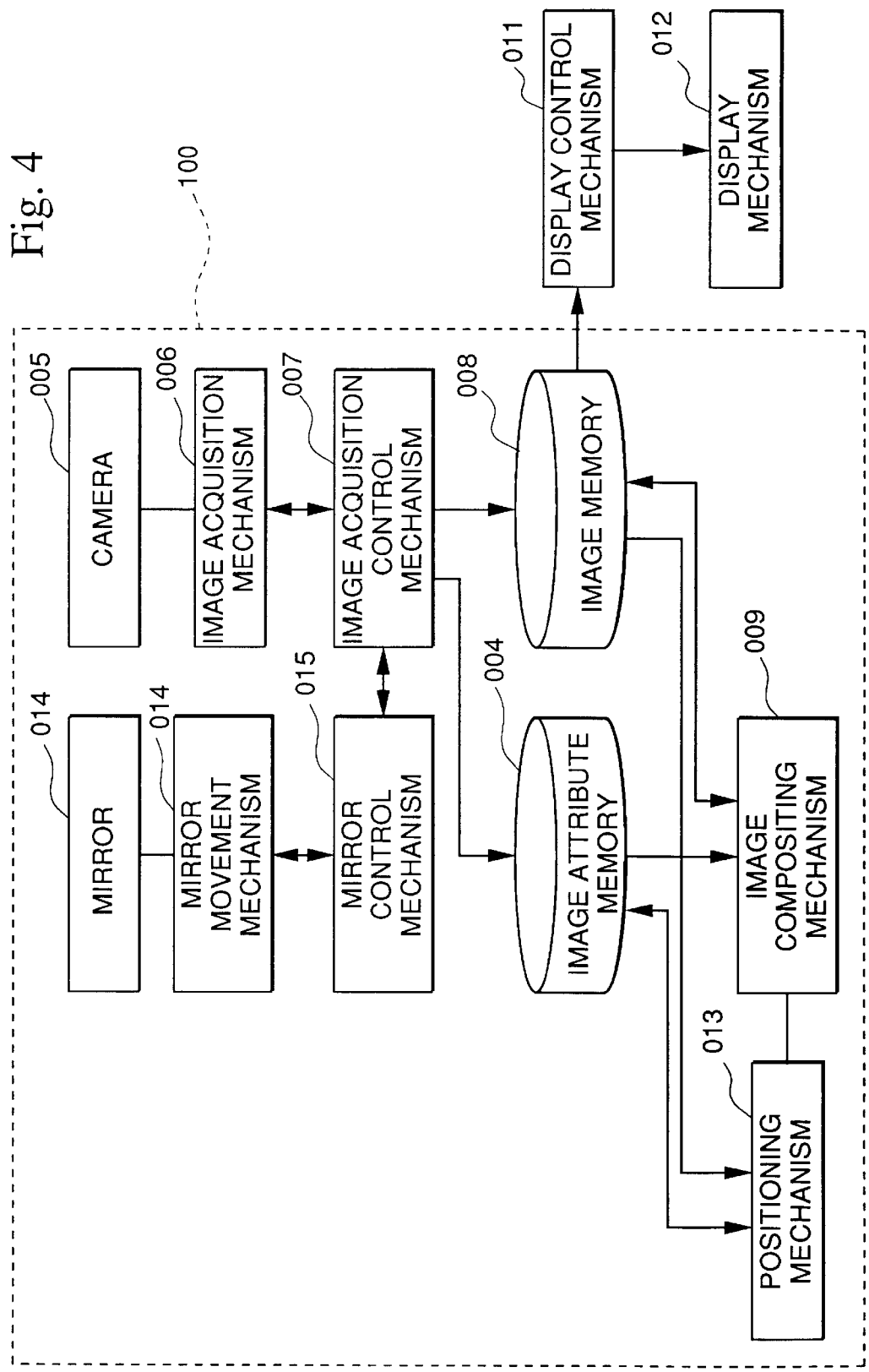
FIG. 4 is a block diagram showing the structure of an image input apparatus in accordance with a fourth embodiment of the present invention.

FIG. 4 serves to explain the structure of the fourth embodiment of the present invention.

Those structural elements having the same names as in the third embodiment perform essentially the same function. Hereinbelow, an explanation will be given with respect to the differences between this embodiment and the third embodiment.

In the fourth embodiment, in contrast to the third embodiment, a positioning mechanism 013 is added which applies positioning processing between partial images stored within image memory 008 and determines the positional relationships between partial images, and based on these results, determines compositing positional correction amounts of each partial image stored in image attribute memory 004, and stores these in image attribute memory 004.

Furthermore, among the structural elements of the second embodiment, the following elements are altered as follows: the image attribute memory 004 stores the orientation data of the mirror at the time of acquisition of the partial images stored by image acquisition control mechanism 007 using camera 005 and image acquisition mechanism 006, and attribute data relating to the partial images and the composite images, as well as positional correction amounts of the composited positions of each partial image determined by positioning mechanism 013; furthermore, image compositing mechanism 009 determines the compositing positions of the partial images using the orientation data of mirror 001 at the time of acquisition of the partial images stored in image attribute memory 004 by image acquisition control mechanism 007, and the positional correction amounts of the composited positions determined by positioning mechanism 013, and in accordance with the composited positions determined, uses the rotational center of the mirror as the center of projection, and determines the projection point using an infinite point along a straight line in space corresponding to a pixel in each partial image, or in other words, uses the center of rotation of the mirror as the center of projection, and sets, as the projection point of a partial image, an intersection point between a projection surface established in space and a straight line, which is parallel to a reflection straight line indicating a reflected light beam resulting from the reflection, at the mirror, of a light beam traveling from the viewpoint of the camera and passing through a pixel of the partial image in an image plane formed by the partial images, and which passes through the center of rotation of the mirror, and thereby, composites the partial images stored in image memory 008 on the composite image stored in image memory 008, while reducing the effects of differences in viewpoint contained in the partial images.

The outlines of the operation of the fourth embodiment are as given below.

Mirror 001 is supported in front of camera 005, and the orientation thereof can be altered by mirror movement mechanism 002. Mirror movement mechanism 002 alters the orientation of mirror 001 in accordance with directives from mirror control mechanism 003.

Camera 005 is capable of photographing the state of an outside field via mirror 001, and the viewfield of camera 005 changes in accordance with the orientation of mirror 001.

Mirror control mechanism 003 sends a directive to mirror movement mechanism 002 so as to alter the orientation of mirror 001, and mirror movement mechanism 002 receives the directive from mirror control mechanism 003 and moves the orientation of mirror 001.

Next, image acquisition mechanism 007 sends a directive to image mechanism 006 so as to acquire partial images.

Next, image acquisition mechanism 006 receives the directive from image acquisition control mechanism 007, and camera 005 acquires partial images via the mirror 001, the orientation of which was altered in accordance with the directive from mirror control mechanism 003, and these images are incorporated into the apparatus.

Image acquisition control mechanism 007 stores the images incorporated by image acquisition mechanism 006 in image memory 008, and stores the orientation data of the mirror at the time of image acquisition and the attribute data of the partial images in image attribute memory 004.

Positioning mechanism 013 determines the positional relationships between the partial images by applying positioning processing between the partial images in image memory 008, and based on the results, determines positional correction amounts of the composite image of each partial image in image attribute memory 004, and stores these in image attribute memory 004.

Image compositing mechanism 009 determines compositing positions of the partial images using the orientation data of mirror 001 at the time of acquisition of the partial images stored in image attribute memory 004 by image acquisition control mechanism 007, and the positional correction amounts of the composite image determined by positioning mechanism 013, and in accordance with the compositing positions determined, uses the rotational center of the mirror as the center of projection, and determines the projection point using an infinite point along a straight line in space corresponding to a pixel in each partial image, or in other words, uses the center of rotation of the mirror as the center of projection, and sets, as the projection point of a partial image, an intersection point between a projection surface established in space and a straight line, which is parallel to a reflection straight line indicating a reflected light beam resulting from the reflection, at the mirror, of a light beam traveling from the viewpoint of the camera and passing through a pixel of the partial image in an image plane formed by the partial images, and which passes through the center of rotation of the mirror, and thereby, composites the partial images stored in image memory 008 on the composite image stored in image memory 008, while reducing the effects of differences in viewpoint contained in the partial images.

By repeating the processing described above, the image input apparatus 100 of the present invention is capable of acquiring a wide-viewfield composite image.

After the partial images or composite images obtained by this image apparatus 100 are selected, for example, by display control mechanism 011, they may be displayed by display mechanism 012, and presented to a user.

Next, the image input apparatus in accordance with the first embodiment of the image input apparatus 100 in the present invention will be explained in detail with reference to figures showing the content of the processing of the various structures, using concrete examples.

Figure 25:
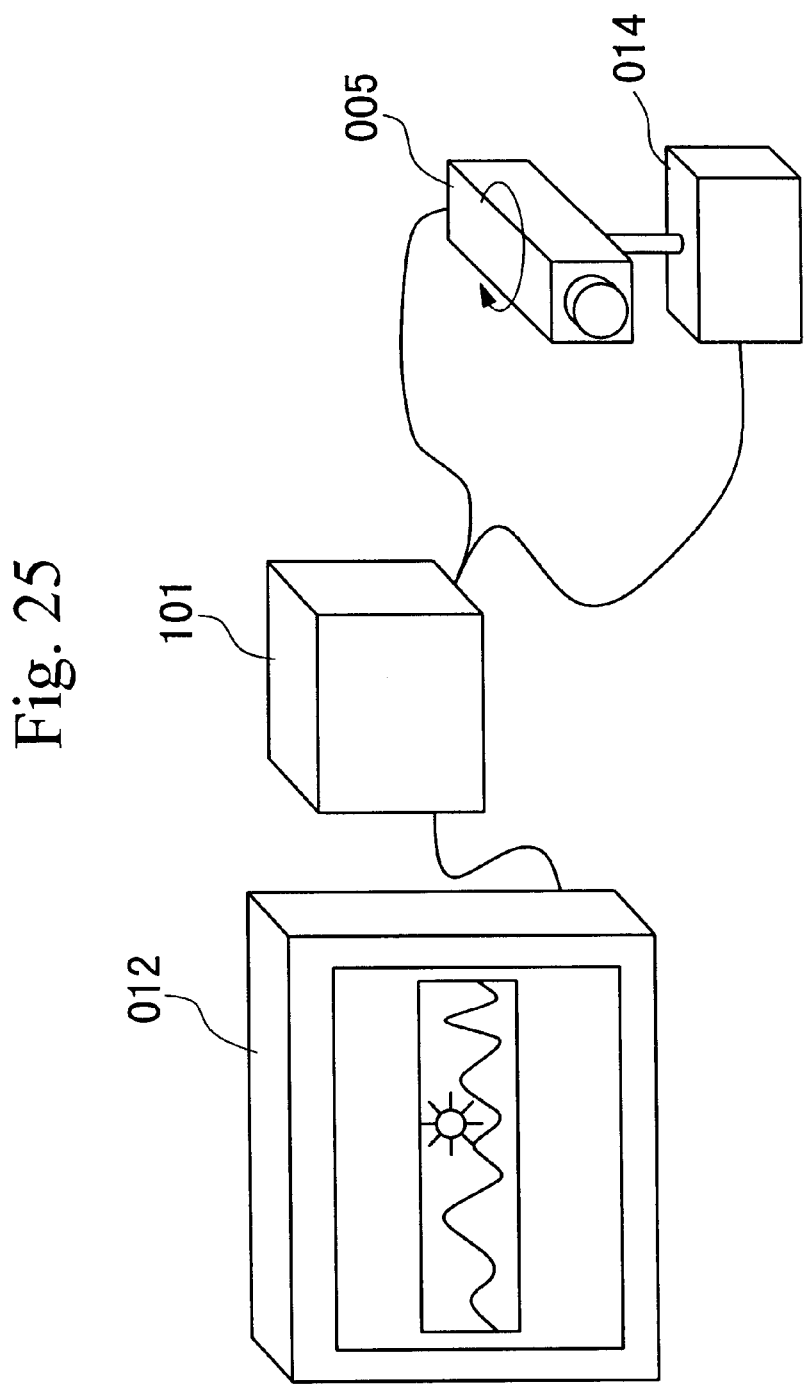
FIG. 25 is an explanatory diagram showing an example of the outer appearance of an image input apparatus in accordance with the first and second embodiments of the present invention.

FIG. 25 serves to explain the structure of the present example; using this figure, various structures will be explained for the inputting of images.

In FIG. 25, box 101 holds the posture control apparatus 015, the image attribute memory 004, the image acquisition mechanism 006, the image acquisition control mechanism 007, the image memory 008, the image compositing mechanism 009, and the display control mechanism 011 of the embodiment described above, and the other structural elements are connected by means of cables.

Camera 005 is supported by camera movement mechanism 014 and is rotatable in a horizontal direction. Camera movement mechanism 014 employs a stepping motor, an origin detector, gears, and a camera supporting jig, and realizes the horizontal rotation of camera 005 connected to the jig by extracting the rotational output of the stepping motor as a rotation of the supporting jig by appropriately reducing that output via gears. The origin detector detects the amount of rotation of the camera in the horizontal direction using a reference point which is seen as 0, so that for example, a structure may be employed in which a Hall element and a magnet attached to the gear are combined, and one pulse is emitted per one horizontal rotation of the camera. Such origin detectors are frequently employed together with stepping motors, so that a detailed explanation thereof will be omitted here.

In the case of a camera movement mechanism 014 having the structure described above, the orientation of camera 005, that is to say, the angle thereof in the horizontal direction, is determined as a standard for the output of the origin detector from the number of output pulses to the stepping motor and the rotational amount per pulse and the gear deceleration ratio. Clearly, the camera movement mechanism 014 may have a structure other than that described above, so that for example, a structure may be employed in which a DC motor, deceleration gears, a camera attachment jig, and a rotary encoder are employed, and a variety of other methods are possible.

Posture control mechanism 015 sends a pulse to the camera control mechanism 014, calculates and stores the sent pulse count, and conducts the origin detection by means of the origin detector, and is the same type of mechanism as is commonly used in the control of stepping motors, so that the details thereof will be omitted here. This may be easily achieved by combining a personal computer and a mechanism for converting the output thereof to a form appropriate to the stepping motor.

In the present embodiment, the amount of rotation per pulse of the stepping motor is 18°, and the gear deceleration ratio is 1:18. At this time, the camera 005 rotates by 1° in the horizontal direction in response to one output pulse to the stepping motor. This is set in this manner simply in order to facilitate the explanation, and this should not be interpreted as a limitation on the present invention. Clearly, it is also possible to use stepping motors having other amounts of rotation, or other deceleration ratios.

Furthermore, in the present example, camera 005 is set so as to rotate only in the horizontal direction, and the center of rotation was thus on the optical axis; however, this was done to facilitate the explanation, and the present invention is not limited in this manner. By changing the mechanism of camera movement mechanism 014, it is also possible to enable rotation in the horizontal and vertical directions of camera 005, or to place the center of rotation at a point other than on the optical axis.

Display mechanism 012 is a commonly employed TV monitor, and displays the images produced by a display control mechanism 011 to a user.

Figure 26:
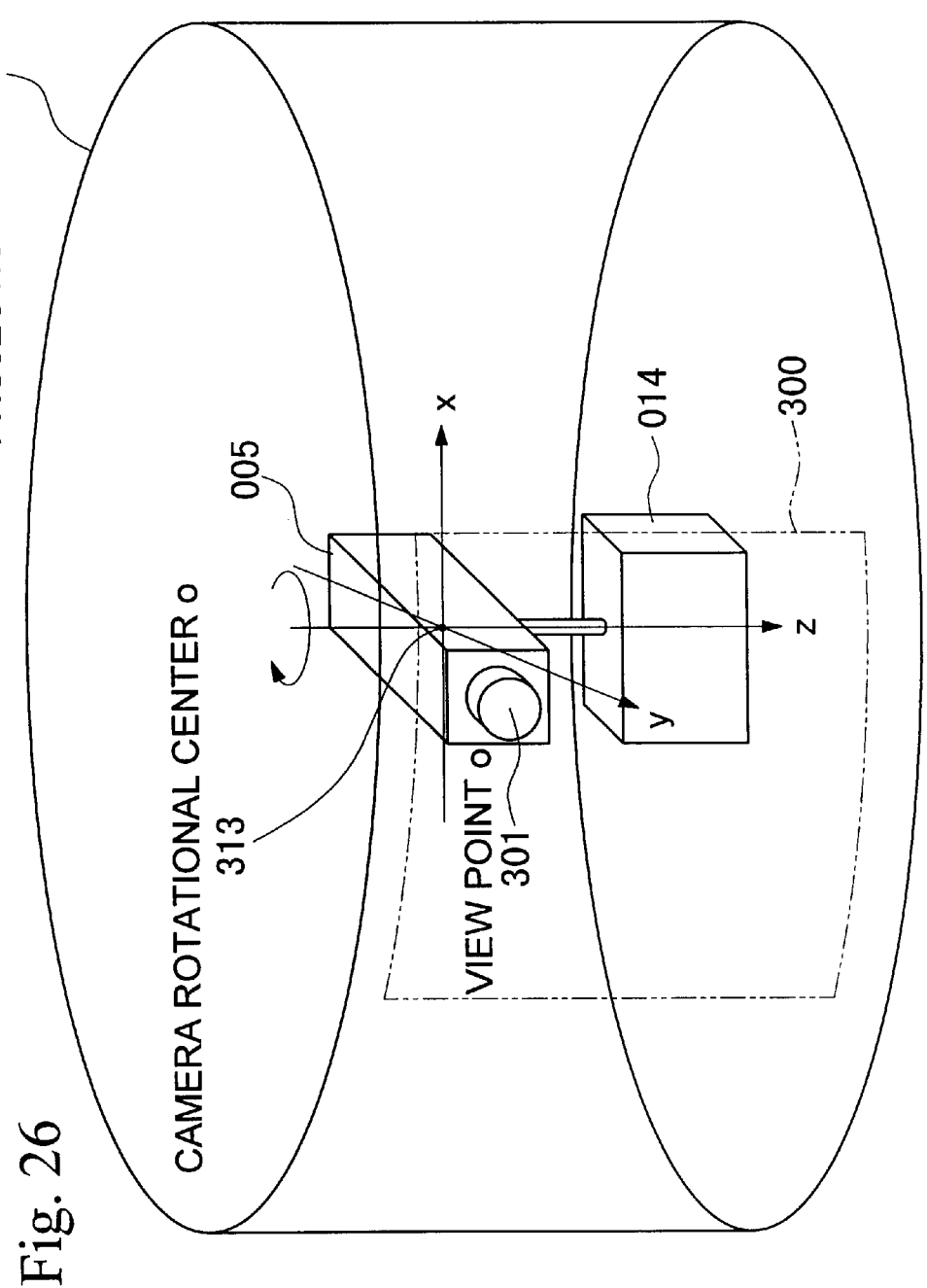
FIG. 26 is an explanatory diagram showing the relationship between the projection surface and the image input apparatus in accordance with the first and second embodiments of the present invention.

FIG. 26 is an image diagram which serves to explain the production of a composite image by compositing partial images obtained by camera 005; it shows the relationships between the camera 005, the camera movement mechanism 014, the projection surface 306, and the coordinate system. As is shown in FIG. 26, in the present embodiment, the partial image 300 obtained by camera 005 is projected onto a cylindrical projection surface 306 which is coaxial with the axis of rotation of camera 005, and is composited with other partial images. Here, a cylindrical surface was employed as the projection surface 306 in the present embodiment; however, a spherical surface having the center of rotation of camera 005 as the center thereof is also possible. This projection surface 306 results in a composite image when opened to form a plane.

Furthermore, when the rotational range of camera 005 is less than 180°, a planar surface is possible instead of a cylindrical surface or a spherical surface. In such a case, processing to open the projection surface 306 is unnecessary.

Figure 27:
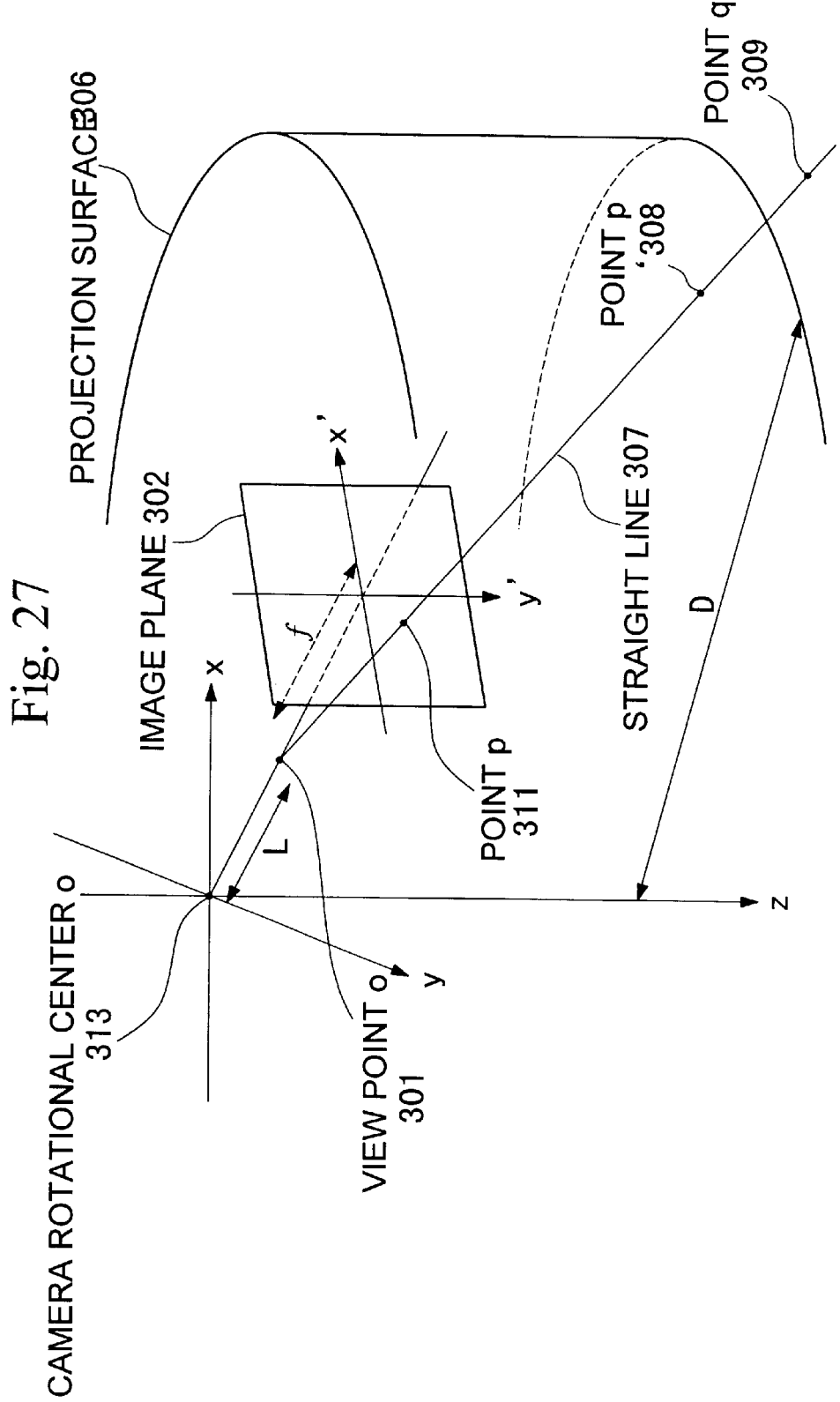
FIG. 27 is a model diagram which serves to explain the projection method applied to an image input apparatus in accordance with the first and second embodiments of the present invention.

FIG. 27 serves to explain the compositing processing employing projection; it shows the relationship between the image plane 302 and the projection surface 306 of camera 005.

In FIG. 27, X, Y, and Z axes are established using the rotational center c313 of the camera as the origin. Camera 005 is realized using a pin hole camera model which employs a viewpoint o301 which is separated from the center of rotation c313 of the camera by a distance L, and an image plane 302 which corresponds to the partial image acquired. The partial image coordinate system is established on image plane 302, and the axes thereof are designated X' and Y'. If the focal length of 005 is represented by f, then image plane 302 is present at a positioning on a straight line connecting the center of rotation c313 of the camera and the viewpoint o301 at a distance of f from the viewpoint o301. The projection surface 306 is a cylindrical surface having the Z axis as the axis thereof and the radius thereof is represented by D.

The posture of camera 005 is expressed using rotational amounts φ, ρ, and θ about the X, Y, and Z axes, using as a standard a state in which the XY plane and the image plane 302 are parallel, that is to say, the viewing direction of the camera and the Z axis are the same, and the X' axis and the X axis, and the Y' axis and the Y axis, are parallel.

In the present example, because solely rotation in the horizontal direction is considered, θ, which corresponds to the amount of rotation in the vertical direction, is fixed, and ρ, which to corresponds to the amount of rotation about the optical axis, can be viewed as ρ=0. The value observed by camera movement mechanism 014 is used as the amount of rotation in the horizontal direction, that is to say, the amount of rotation θ about the Z axis.

Figure 5:
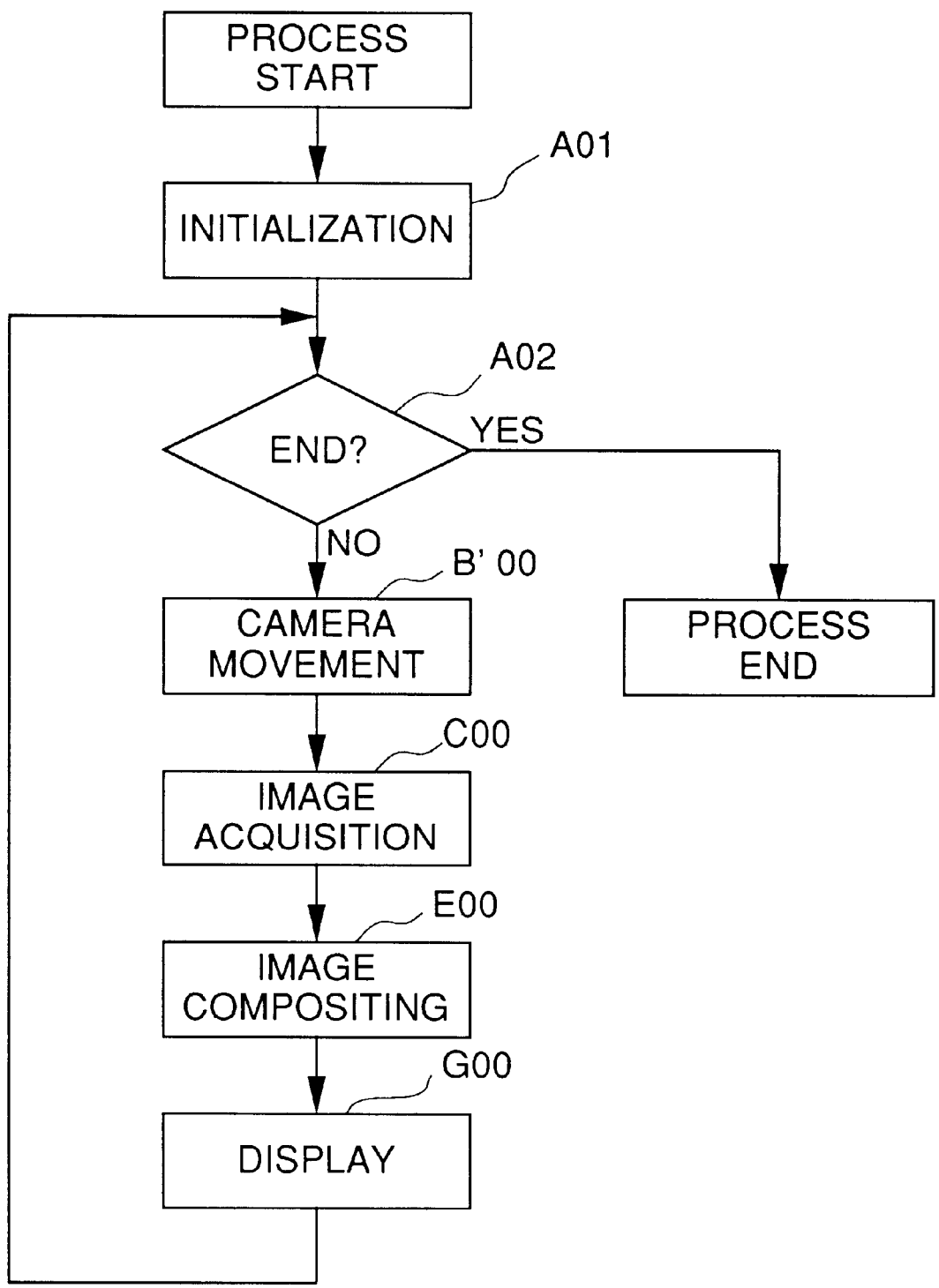
FIG. 5 is a flowchart showing the contents of the image input processing of an image input apparatus in accordance with a first example of the first embodiment of the present invention.

FIG. 5 serves to explain the flow of the processing in this example. Hereinbelow, based on FIG. 5, the flow of the processing in the present example will be explained in detail.

In the present example, the image input apparatus 100 first conducts the necessary initialization of all structural elements, such as the initialization of the number of images constituting a single wide-viewfield image, the positions at which each partial image is to be acquired, the movement of camera movement mechanism 014 to the origin, and the initialization of the counter which calculates the number of output pulses within the posture control mechanism 015 (step A01). In the present example, these values are stored in advance in the apparatus. For example, using a video camera having a focal distance of 5.5 mm, a horizontal field angle of 50°, and a vertical field angle of 38°, when a wide-viewfield image having a circumference of 360° is to be acquired, 15 partial images should be acquired, and at this time the acquisition interval of each partial image is approximately 24°. Clearly, this may be realized by a number of methods, such as a structure in which such values are inputted externally by a user, or by a structure in which either the number of images or the acquisition of positions are inputted, and the other is calculated.

In the explanation below, the number of partial images required to constitute a single wide-viewfield image is represented by N, and each partial image is expressed by an number i (where $0 \leq i \leq N-1$), and during the initialization processing of step A01, i is initialized to a value of 0. The partial images are all assumed to have the same size, and the sizes thereof in the X' direction and the Y' direction are represented by, respectively, Sx and Sy. Each image is a concentrated image expressed in terms of 256 levels, and as the pixel value increases, it becomes lighter. Furthermore, the orientation of camera 005, which acquires a partial image i, is expressed as an angle θi in the horizontal direction. These settings are conducted in this manner to facilitate the explanation and the present invention should not be understood to be limited in any way thereto, and other methods of expression may also be employed. The present invention may also be applied to color images or binary images or the like, and furthermore, cases in which rotation of camera 005 other than rotation in the horizontal direction, that is to say about the Z axis, is possible may be established by expressing the orientation of acquisition by including the amount of rotation about each axis.

Furthermore, the partial image memory 008 is of a size sufficient to store the composite image and a number N of partial images, and various attribute data relating to the size of the partial images, the posture of the camera at the time of partial image acquisition, the positions in the partial image memory, the size of the composite image, and the positioning in the image memory, are stored in image attribute memory 004. By employing these data, it becomes possible to avoid referring to the pixel values of each partial image or the composite image. Such a partial image memory 008 and image attribute memory 004 may easily be realized by combining memory elements or by diverting a storage apparatus installed in the computer.

After the completion of initialization, the image input apparatus 100 of the present invention repeats the processing steps B'00–G00 until the completion of image acquisition processing (step A02). The conditions under which processing is terminated can be established by a directive from the user, or by termination after the elapsing of a predetermined period of time, or by various other methods; details thereof are omitted, as this does not relate to the essence of the present invention.

Posture control mechanism 015 employs camera movement mechanism 014 and moves the orientation of camera 005 to the acquisition position θi of partial image i (step B'00).

Figure 6:
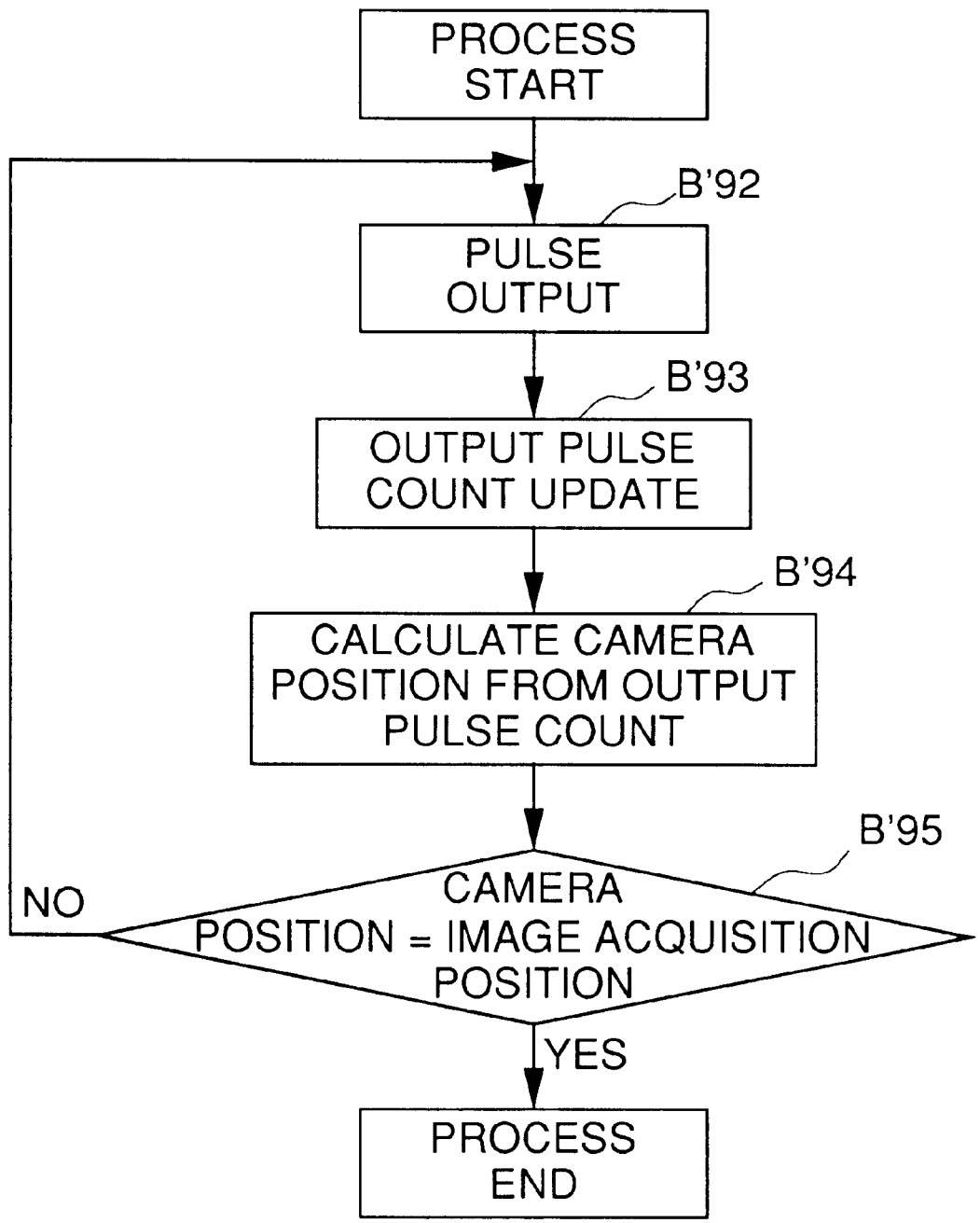
FIG. 6 is a flowchart showing the contents of the camera movement processing of an image input apparatus in accordance with this example of the first embodiment of the present invention.

FIG. 6 serves to explain the processing flow in the camera movement processing.

In FIG. 6, posture control mechanism 015 sends a directive to camera movement mechanism 014 and initiates the movement of camera 005. In other words, camera movement mechanism 014 outputs a pulse to the stepping motor and moves the orientation of camera 005 (step B'92), and refreshes the outputted pulse count (step B'93). Then, the orientation θ of camera 005 is determined from the output pulse count (step B'94). Here, in step B'92, one pulse is outputted, and in step B'94, the counter value which indicates the output pulse count is increased by one. However, this is only provisionally set in this manner, so that for example, in the case of finer gradations in the rotation in the horizontal direction of the camera, it would be possible to output two pulses at the same time, and use values differing from those in the example described above.

In response to the outputted single pulse to the stepping motor, a rotation of 1° in the horizontal direction is accomplished, so that the orientation θ in the horizontal direction of the camera is determined as follows:

$$\theta \leftarrow \text{output pulse count} \times 1 \text{ (degree/pulse) MOD } 360.$$

Here, MOD represents an operator which determines the residue.

After this, posture control mechanism 015 compares the θ which was obtained with the θi indicating the positioning at which partial image i is to be acquired, and thereby confirms whether or not camera 005 has moved to the target orientation (step B'02), and when the camera has moved to the target orientation, this mechanism terminates the movement of camera 005. When the camera has not reached the target positioning, control then returns to step B'92, and the processing after the pulse output is repeated.

Next, the image acquisition control mechanism 007 incorporates the image acquired by camera 005 into the apparatus (step C00). That is to say, image acquisition control mechanism 007 incorporates the image of the external field taken by camera 005 into the apparatus as partial image i by means of the image acquisition mechanism 006 and stores the orientation of camera 005 at the time of acquisition of the partial image, that is to say, θi, in image attribute memory 004, and stores partial image i in image memory 008. It is possible to use an apparatus which first conducts an AD conversion of the video signal and then stores it in memory, or an apparatus which combines a personal computer and a video capture board as image acquisition mechanism 006.

Next, image compositing mechanism 009 projects the partial image obtained onto projection surface 306 so as to reduce the effects of differences in viewpoint, and opens the projection surface 306 and updates the composite image (step E00).

Figure 7:
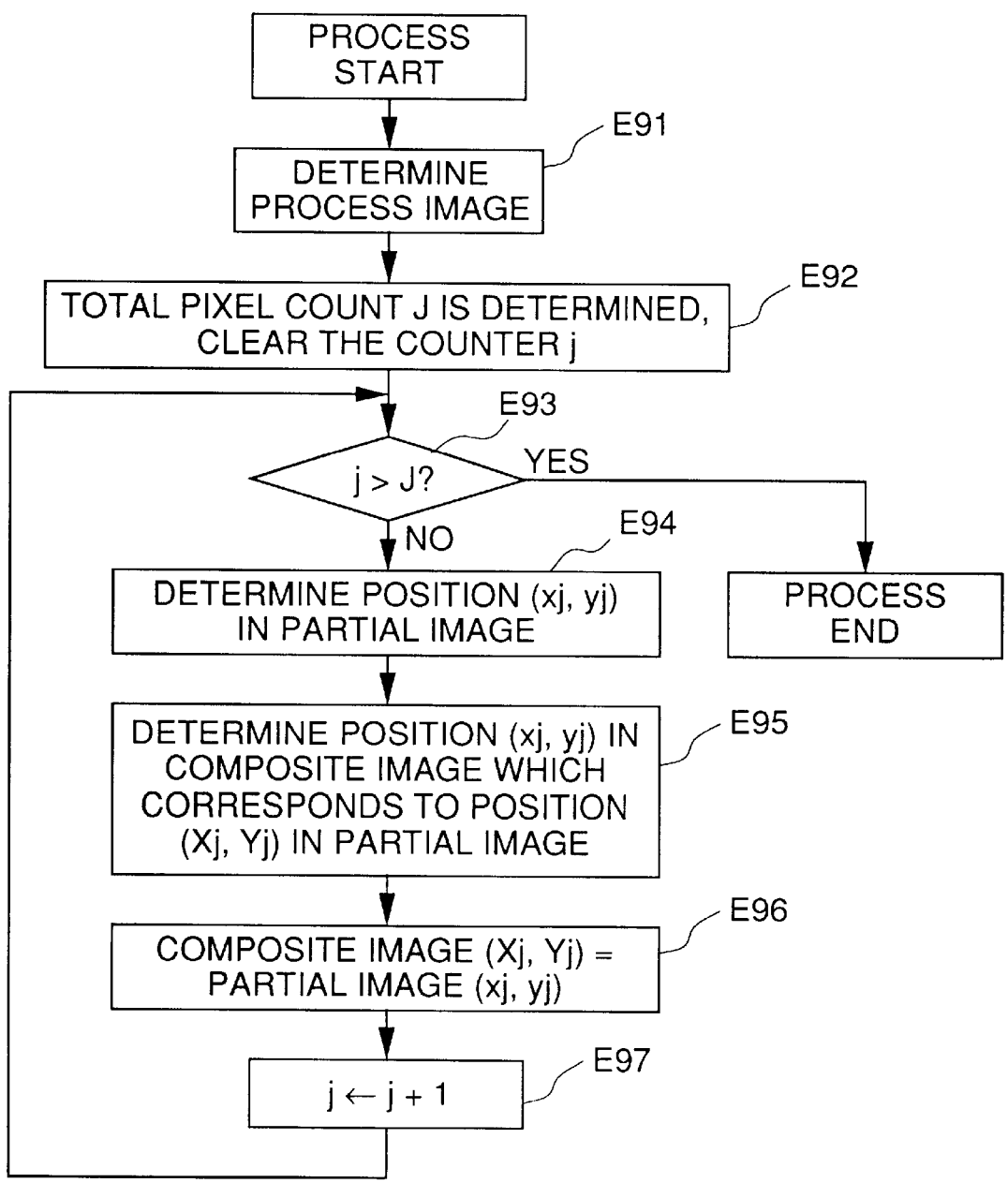
FIG. 7 is a flowchart showing the contents of the image compositing processing of an image input apparatus in accordance with this example of the first embodiment of the present invention.

FIG. 7 serves to explain the flow of the processing of the compositing process.

In FIG. 7, image compositing mechanism 009 first obtains partial image i from image memory 008 and obtains the acquisition position θi from image attribute memory 004 in order to project the partial image onto the composite image immediately after acquisition (step E91). In the present example, numbers j (where $0 \leq j \leq J$) are assigned to each pixel from 0 in such a way that there is no overlapping among the pixels contained in partial image i, and by indicating these numbers j, the positions of the pixels in partial image i are determined. This is only provisionally done in order to facilitate the explanation; insofar as the method is one by which pixels may be selected in order and without overlap, any method may be employed. For example, if a method commonly employed in raster scanning, in which the values are changed along the X' axis and the Y' axis, is employed, there is no effect on the essence of the present invention. For this reason, first, the variable j which defines the pixels in the partial image is initialized and J, which indicates the total number of pixels, is determined (step E92). Concretely, the following is carried out:

$$j \leftarrow 0$$

$$J \leftarrow Sx \times Sy.$$

The processing from step E94 on is applied to all pixels (step E93).

First, the position (xj,yj) in the partial image corresponding to the number J is determined in the following manner:

$$xj \leftarrow (j \ MOD \ Sx) - Sx/2$$

$$yj \leftarrow (j \ DIV \ Sx) - Sy/2$$

Here, MOD indicates an integer operator which determines the remainder when j is divided by Sx, and DIV indicates an integer operator which determines the quotient when j is divided by Sx. As shown in FIG. 27, (xj, yj) is expressed in a coordinate system having the center of both images as the origin.

Next, the position (Xj, Yj) in the composite image corresponding to the position (xj, yj) in the partial image obtained is determined (step E95).

Hereinbelow, the projection processing of the pixels in the partial image onto the projection surface 306 in steps E95 and E96 will be explained in detail with reference to the figures.

First, taking a point p311 in the partial image i, if the coordinates in the partial image coordinate thereof are taken to be (xj, yj), then the coordinates (x, y, z) in three-dimensional space are determined by formula 1, using rotational amounts φ, ρ, and θ about the X, Y, and Z axis, respectively.

Here, as described above, φ is fixed, ρ is set equal to 0, and θ is set equal to θi, so that formula 2 results.

In the same way, the viewpoint o301 is given by formula 3, with respect to φ, ρ, and θ, and in the present example, formula 4 results.

Here, in the formulas, each linear vector in three-dimensional space is represented by a bold character, and particularly bold characters indicate a matrix. Furthermore, the superscripted t indicates a transposition operation.

A straight line from the viewpoint o301 which passes through the point p311 can be expressed in the three-dimensional coordinate system, using the parameter s, as formula 5.

Figure 29:
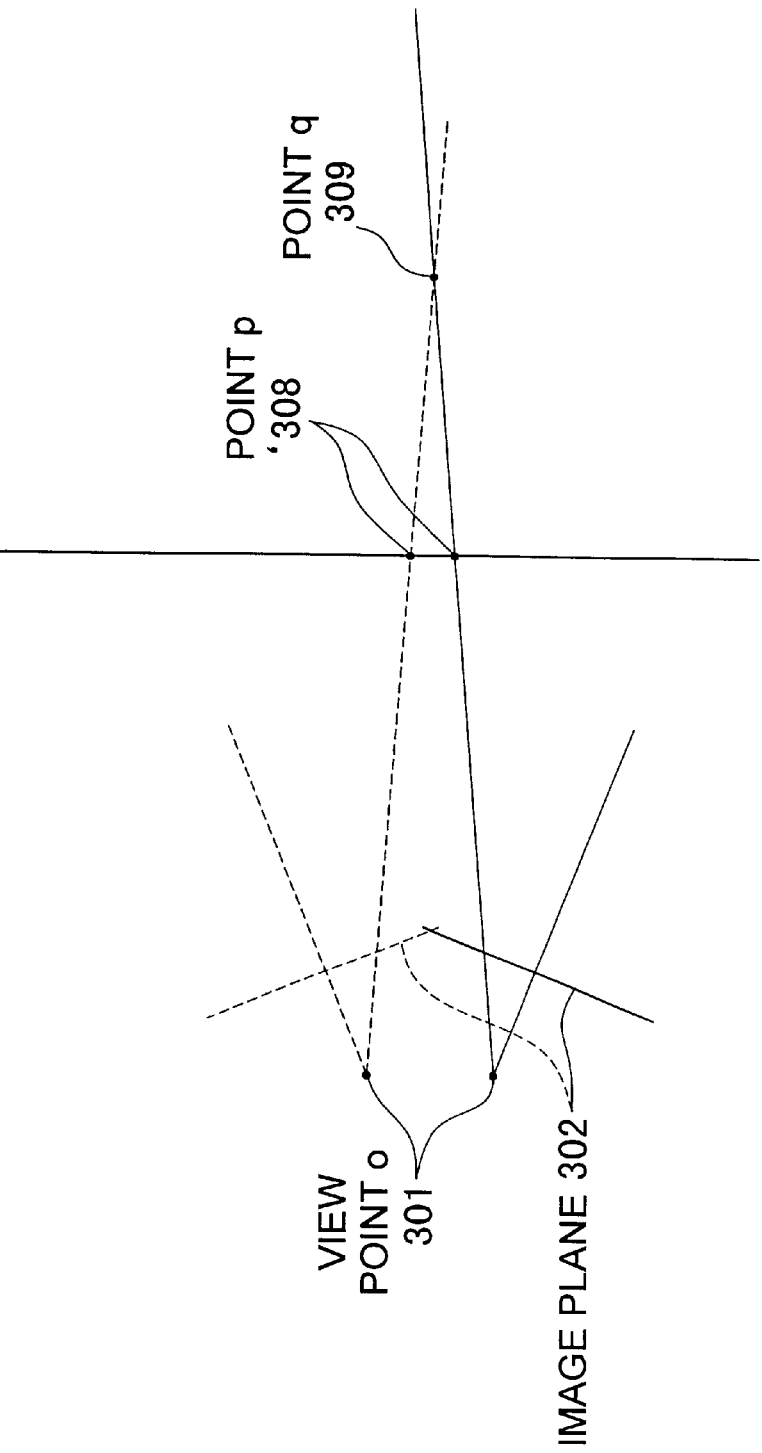
FIG. 29 is a model diagram for explaining the state in which a parallax is produced as a result of the movement of the camera viewpoint in the image input apparatus.

The point p'308, which is defined as the intersection point between the projection surface 306 and a straight line 307 from the viewpoint o301 which passes through the point p311, represents the projection onto the projection surface 306 of the point p311 using the viewpoint o301 as the center of the projection. However, if this projection point p'308 is used in an unchanged fashion, since the viewpoint o301 moves with the orientation of the camera 005, the same point in three-dimensional space will be projected to differing points depending on the orientation of camera 005, and there are cases in which discontinuities are generated in the shape or positioning of the composite image. FIG. 29 serves to explain the problem of differences in viewpoint. It shows that a point q309 in space is projected to two differing points p'308 on the projection surface when the camera 005 has differing orientations, as shown by the dashed line and the solid line. These differences in viewpoint arise in the movements of the viewpoint o301, which is the center of the projection onto the projection surface 306.

In order to solve this problem, in the image input apparatus in the present invention, it is an important characteristic feature that each partial image is projected onto the projection surface 306 using as the center of the projection the center of rotation c313 of the camera in the image input processing in the image compositing mechanism.

Figure 28:
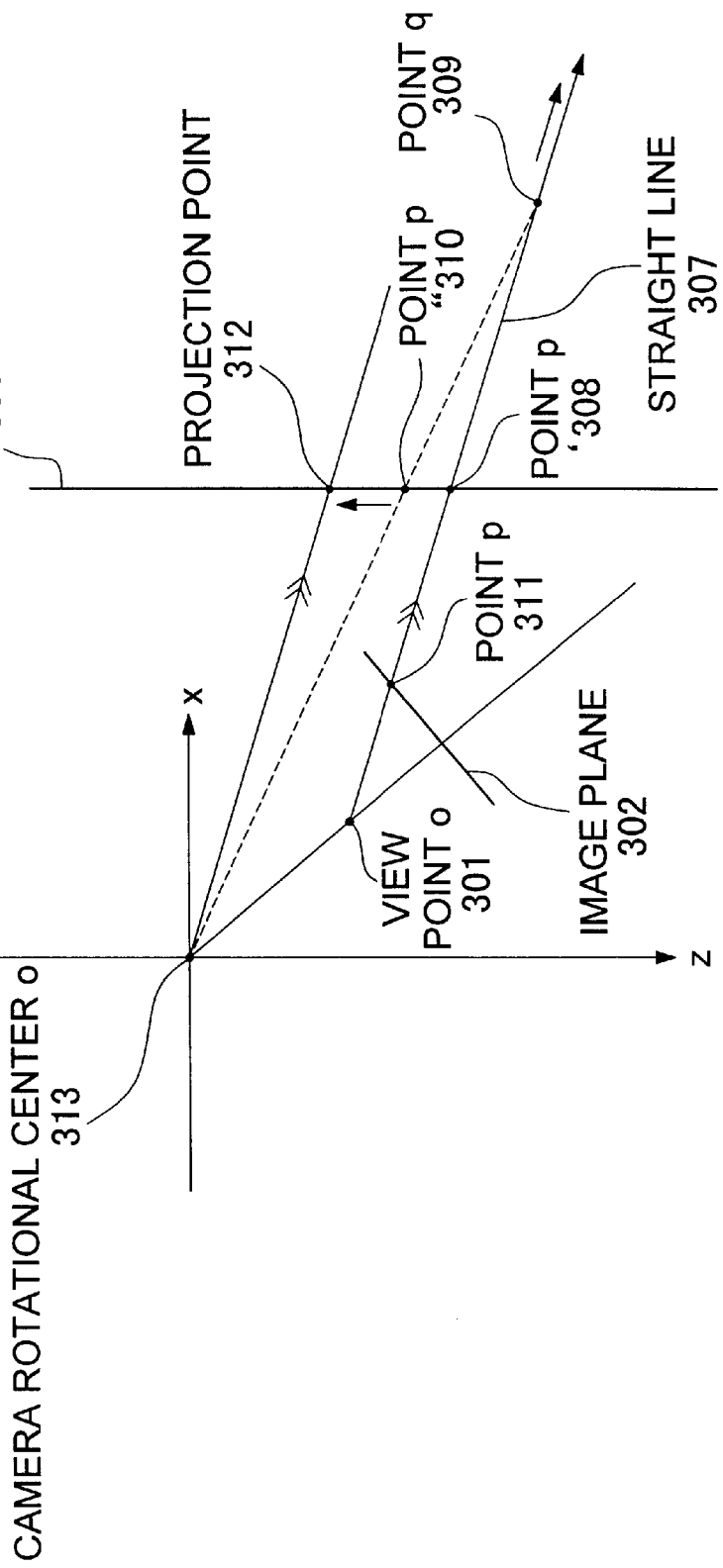
FIG. 28 is a model diagram which serves to explain a projection method, in which the camera rotational center is employed as the center of projection, applied to an image input apparatus in accordance with the first and second embodiments of the present invention.

FIG. 28 serves to explain the projection method which employs the center of rotation c313 of the camera as the center of projection.

If the point of intersection p"310 between the projection surface 306 and a straight line connecting a point q309 on the straight line 307 depicted in formula 5 and the center of rotation c313 of the camera is considered, then since the parameter s, which determines the positioning in space of the point q309, is included in formula 5, when the center of rotation c313 of the camera is employed as the center of the projection, as shown in FIG. 28, in correspondence with the value of parameter s, that is to say, with the distance of point q309 from the viewpoint o301, the positioning of the point p"310 changes.

However, when the case is considered in which the point q309 in space becomes distant, or in other words, the value of parameter s becomes large, then the directional vector of the straight line connecting the rotational center c313 of the camera and the point q309 gradually approaches the directional vector of the straight line 307, and ultimately, converges in a parallel direction. In other words, when a point on the straight line 307 as viewed from the center of rotation c313 of the camera is projected onto the projection surface 306, the intersection point p'310 converges on the intersection point between the projection surface 306 and the straight line which is parallel to straight line 307 and which passes through the center of rotation c313 of the camera. This indicates that almost all points in space which lie on the straight line connecting the viewpoint o301 and a point p311 in the image plane 302 are projected at that intersection point. From this, it is possible to greatly reduce the problem of differences in viewpoint described above by employing this convergence point as the projection point 312, and it is thus possible to dramatically increase the quality of the composite images obtained.

In step E95, the positional vector of the intersection point between the cylindrical surface having a radius D comprising the projection surface 306 and a straight line which passes through the center of rotation c313 of the camera and has a directional vector identical to that of the straight line 307 depicted in formula 5, that is to say, the three-dimensional positioning (X, Y, Z) of a point 312 on projection surface 306 corresponding to the point p311 in partial image i, may be obtained as formula 6 from the points (xj, yj) in partial image i.

Figure 30:
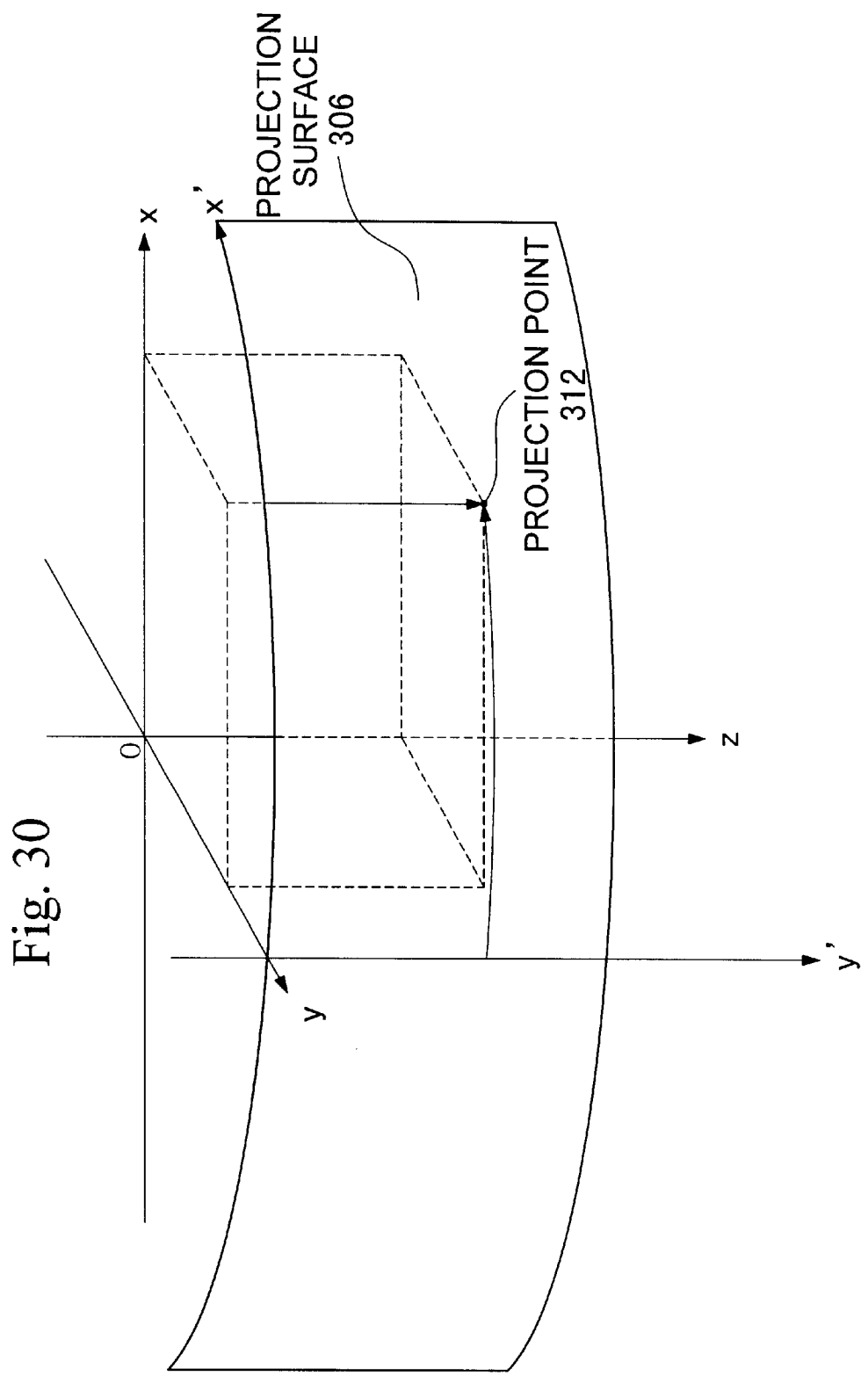
FIG. 30 is an explanatory diagram showing a method for opening the cylindrical surface into a flat plane in an image input apparatus in accordance with the embodiments of the present invention.

Here, the appended letters in formula 6 indicate the components of the linear vector. Furthermore, projection point 312 is converted to a coordinate system such as that shown in FIG. 30, in which the X' axis follows the circumference of the projection surface 306 and the Y' axis is in the Z axis direction, and thereby, the position in a composite image in which the projection surface 306 is opened into a flat plane is determined. The conversion from the X, Y, and Z components of projection point 312 to the position (Xj, Yj) in the composite image is accomplished as formula 7.

The pixel values of the position (Xj, Yj) in the composite image determined in this manner are replaced by the pixel values at the position (xj, yj) in partial image i, and thereby, a point in partial image i is projected onto the composite image (step E96). In the case in which (Xj, Yj) does not represent integer values, rounding may be carried out.

The size of the composite image may be appropriately updated where necessary during the projection of each pixel in the partial image; in the case in which the acquisition positions of each partial image are determined, as in the present example, it is possible to make the structure such that the size of the composite image is determined in advance from the size of each partial image and the acquisition position in the initialization processing of step A01. In other words, in the initialization processing of step A01, with respect to all partial images, using the partial image acquisition position θi, the positioning in the composite image of all included pixels is calculated, and the size of the composite image is determined from the minimum and maximum values of the positions in the X direction and Y direction obtained, and the results thereof are stored in the image memory. By referring to the values indicating the size of the composite image, it becomes unnecessary to conduct the size updating processing and the like of the composite image, and the image compositing processing can be realized at higher speed.

After the projection of the point (xj, yj) in the partial image i onto the composite image has been completed, the value of variable j is increased so that the following point is processed, and control returns to step E93 (step E97).

A determination as to whether the projection processing of all pixels in a partial image i onto the composite image has been completed or not is made by a comparison between J, which indicates the total number of pixels, and the variable j, and when processing of all pixels has been completed, the image compositing processing is terminated (step E93).

After the projection processing onto the composite image of the partial image i in the compositing processing (step E00) has been completed, then display control mechanism 011 reads out the updated composite image from image memory 008, and displays this in display mechanism 012 (step G00). In the present example, the entirety of the composite image was displayed; however, it is also possible to selectively display only a part of the composite image in response to a directive of the user.

Figure 18:
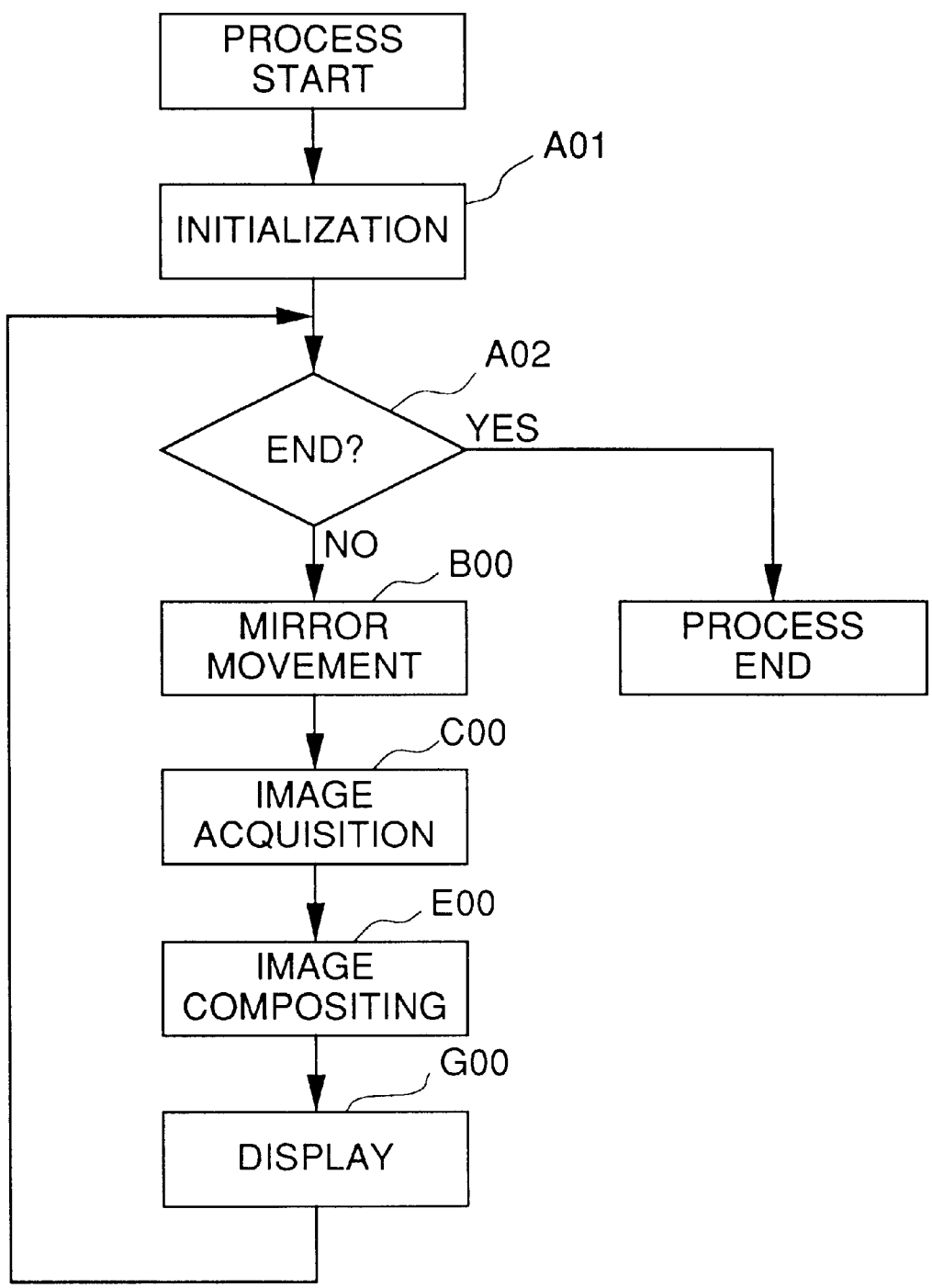
FIG. 18 is a flowchart showing the contents of the image input processing in an image input apparatus in accordance with a first example of the third embodiment of the present invention.

Once the display of the updated composite image has been terminated, in order that the next partial image may be acquired, the value of i is increased by 1 and the processing after step A02 in FIG. 18 is repeated. When the value of i exceeds N−1, then it is initialized to 0, and thereby, the acquisition of a number of partial images N and the updating of the composite image can be continuously carried out.

Figure 31:
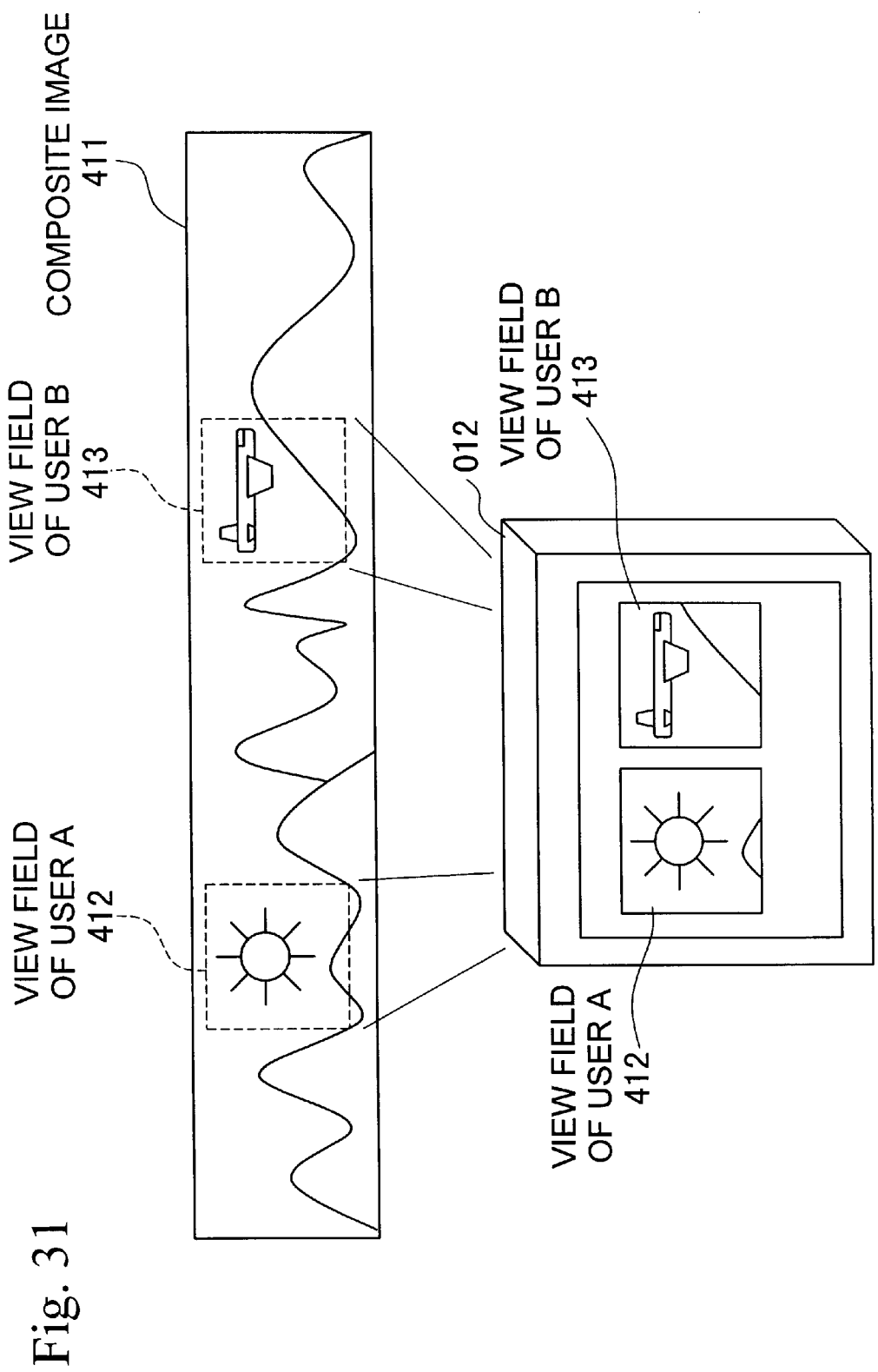
FIG. 31 is an explanatory diagram showing an example of a function employing the image input apparatus in accordance with the present invention.

FIG. 31 serves to explain an example of a function employing a continuously updated composite image; it depicts an example in which different spots may be extracted from a single composite image and displayed to a plurality of users in a display mechanism 012. As the composite image is updated, the region of the image selected by each user is also updated, and each user can thus receive the latest information.

In this manner, it is also possible to present a simulated plurality of different viewpoints using an apparatus having a single camera, and this is an important feature of the image input apparatus of the present invention.

In the explanation given above, the camera movement, image acquisition, image compositing, and display processing were conducted in order; however, these may also be conducted in parallel.

Hereinbelow, as a second example, the case will be explained in detail in which the various processes are conducted in parallel; a comparison with the first example will be made while referring to the figures.

In the second example, as well, the parts other than those relating to the processing flow, such as the outward appearance, the structure of each mechanism, the projection surface, and the setting of the coordinate system and the like, are identical to those in the first example.

Figure 8:
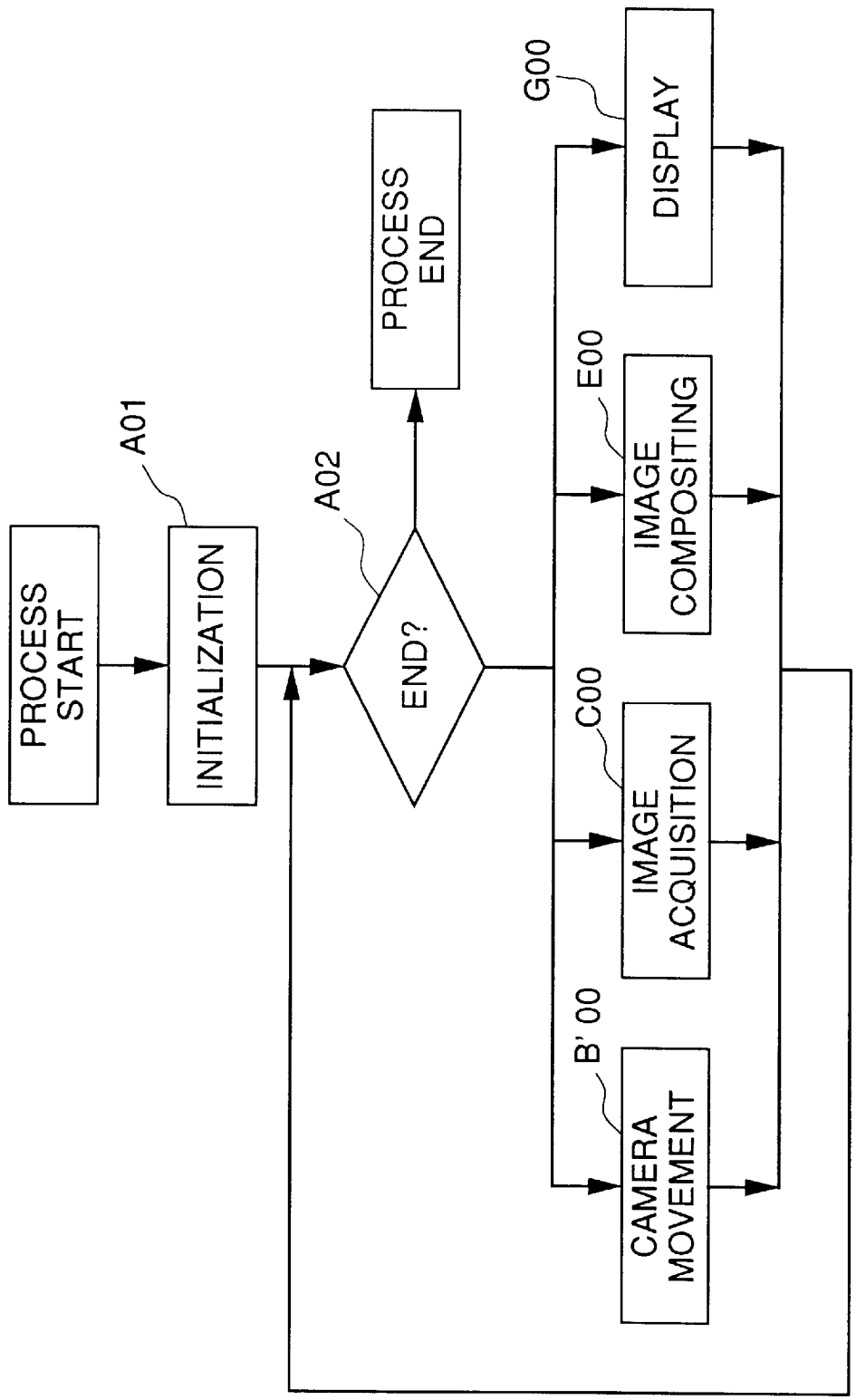
FIG. 8 is a flowchart showing the processing contents of an image input apparatus in accordance with a second example of the first embodiment of the present invention.

FIG. 8 serves to explain the flow of all the processing in the case in which the processing is conducted in parallel.

In comparison with the flow of the processes in the first example shown in FIG. 18, the processing shown in FIG. 8 is executed in parallel while synchronizing each process: the camera movement (step B'00), the image acquisition (step C00) the image compositing (step E00), and the display (step G00).

After an initializing process (step A01) and a confirmation of termination process (step A02) identical to those of the first example have been conducted, each process begins operation.

Figure 9:
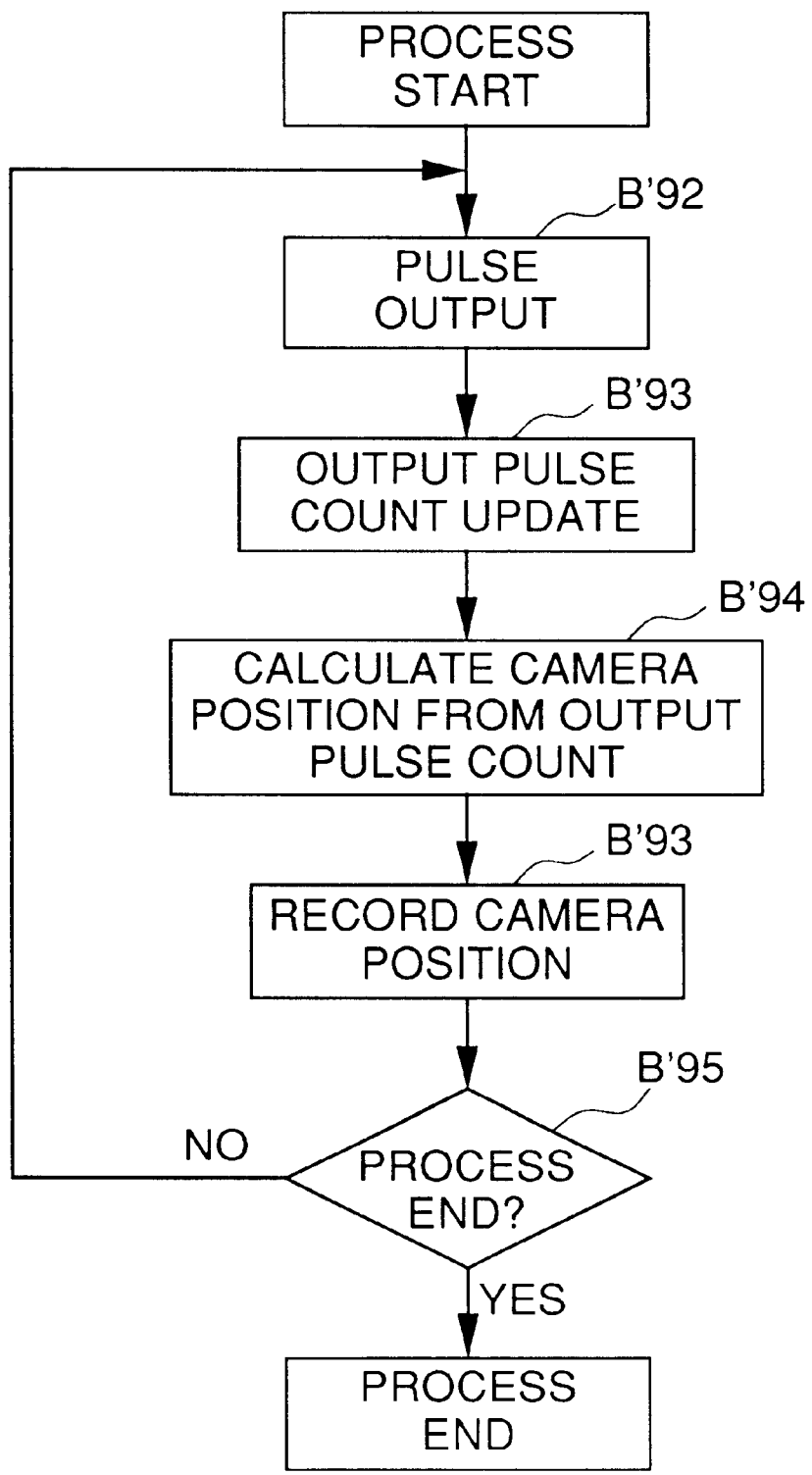
FIG. 9 is a flowchart showing the contents of the camera movement processing in an image input apparatus in accordance with a second example of the first embodiment of the present invention.

FIG. 9 serves to explain the flow of the processing of the camera movement mechanism (step B'00) in the second example.

In comparison with the first example, the camera movement processing in the second example does not move the camera 005 to individual image acquisition positions, but rather, continuously moves the camera 005 while recording the orientation thereof.

In other words, in the camera movement process, the processing from pulse output (step B'92) to camera positioning calculation (step B'94) is continuously conducted until there is a directive from the termination confirmation process (step A02) in FIG. 8, and the camera positions obtained are recorded in posture control mechanism 015 (step B'96); this processing is repeated.

The image acquisition process (step C00) conducts processing while referring to the camera positions. Here, angles in the horizontal direction are transmitted as camera positions; however, any other methods are possible which allow the confirmation of the orientation of the camera in the image acquisition processing, such as the direct transmission of output pulse counts or the like. Furthermore, it is also possible to transmit rotational amounts not merely in the horizontal direction, but about all axes.

Each process from the pulse output (step B'92) to the camera positioning calculation (step B'94) which has the same designation as that in FIG. 6, which is the figure which serves to explain the flow of the processing in the first example, is an identical process.

When there has been a directive (step B'97) from the termination confirmation process (step A02) in FIG. 8, in the same manner as in the first example, the movement of camera 005 is halted, and processing terminates.

Figure 10:
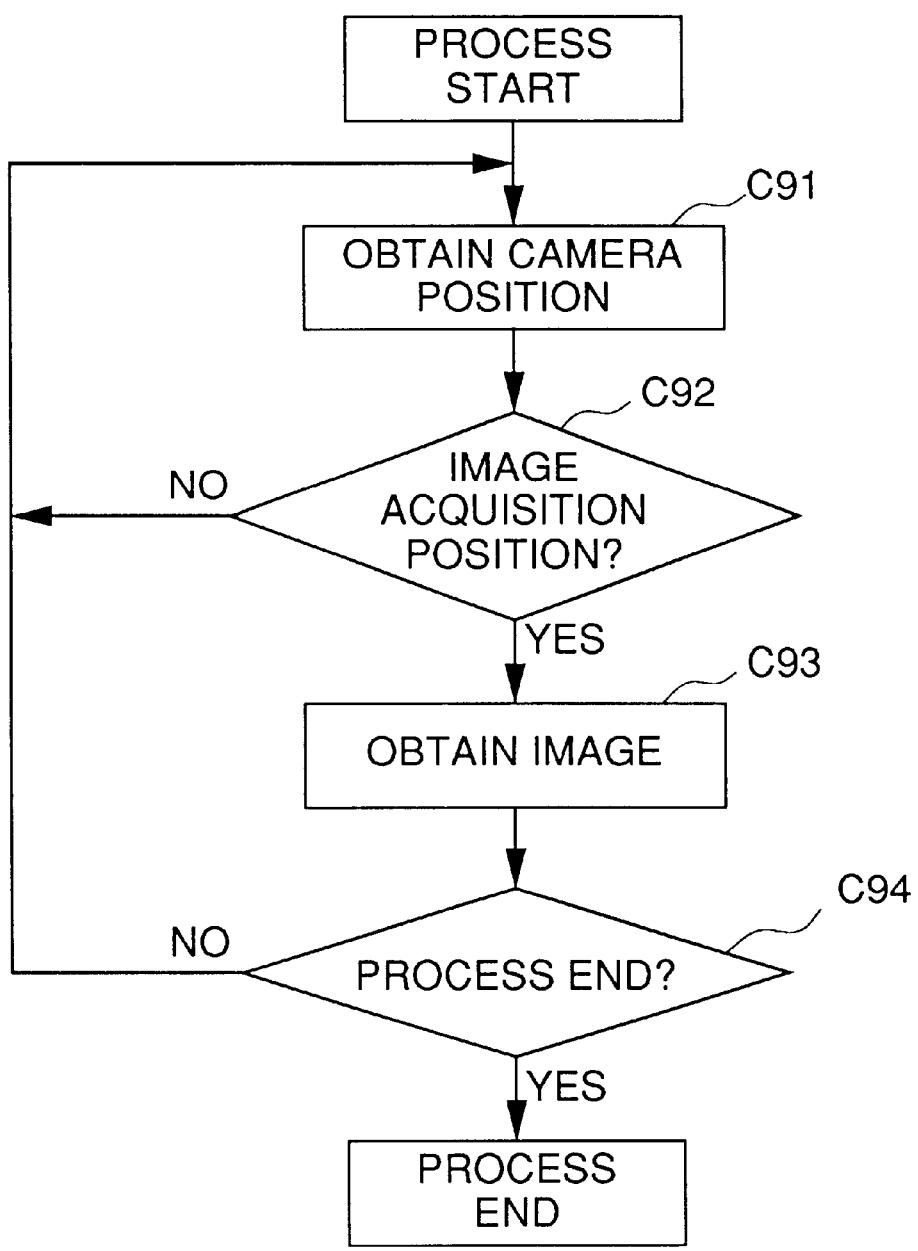
FIG. 10 is a flowchart showing the contents of the image acquisition processing in an image input apparatus in accordance with a second example of the first embodiment of the present invention.

FIG. 10 serves to explain in a detailed fashion the flow of the processing in the image acquisition process (step C00) in the second example.

In comparison with the first example, the image acquisition process in the second example itself determines the timing of partial image acquisition from the data relating to the orientation of the camera 005 in the horizontal direction which are transmitted by the camera movement process, and from the data relating to the acquisition position of the partial images, and continuously conducts image acquisition.

In other words, first, reference is made to the horizontal angle of the camera which is stored in posture control mechanism 015 (step C91), and the data obtained are compared with the acquisition position of partial image i which is next to be acquired (steps C92), and if this position is the acquisition position of partial image i, then, as in the case of the first example, the partial image i is acquired, and this partial image is stored in image memory 008, while the positioning at the time of acquisition and the attribute data are stored in the image attribute memory 004, and a projection process flag is set with respect to the newly acquired partial image which indicates that the image compositing process is necessary (step C93).

A projection process flag is easily realizable by adding a partial image attribute in the image attribute memory 004 in the manner of flags which are commonly employed in computer processing, and these may all be canceled during initialization in step A01. The projection process flags which are set are canceled when the image compositing processing of the acquired partial image is completed. The projection process flag is simply one example; it is possible to employ any sort of method insofar as it is capable of confirming the acquisition of a partial image and the application of compositing processing.

In step C92, when the orientation of camera 005 differs from the subsequent acquisition position, steps C91–C92 are repeated, and thereby, a standby state is entered until the orientation of camera 005 reaches the acquisition position.

When there has been a directive (step C94) from the termination confirmation process (step A02) in FIG. 8, then in the same manner as in the first example, the image acquisition process is terminated. Where there has been no such directive, the value of i is increased by 1 in order to acquire the next partial image, and the processing of step C91–C93 in FIG. 10 is repeated. When the value of i exceeds N−1, then it is initialized to 0, and thereby, the acquisition of a number N of partial images and the updating of the composite image is continuously conducted.

Figure 11:
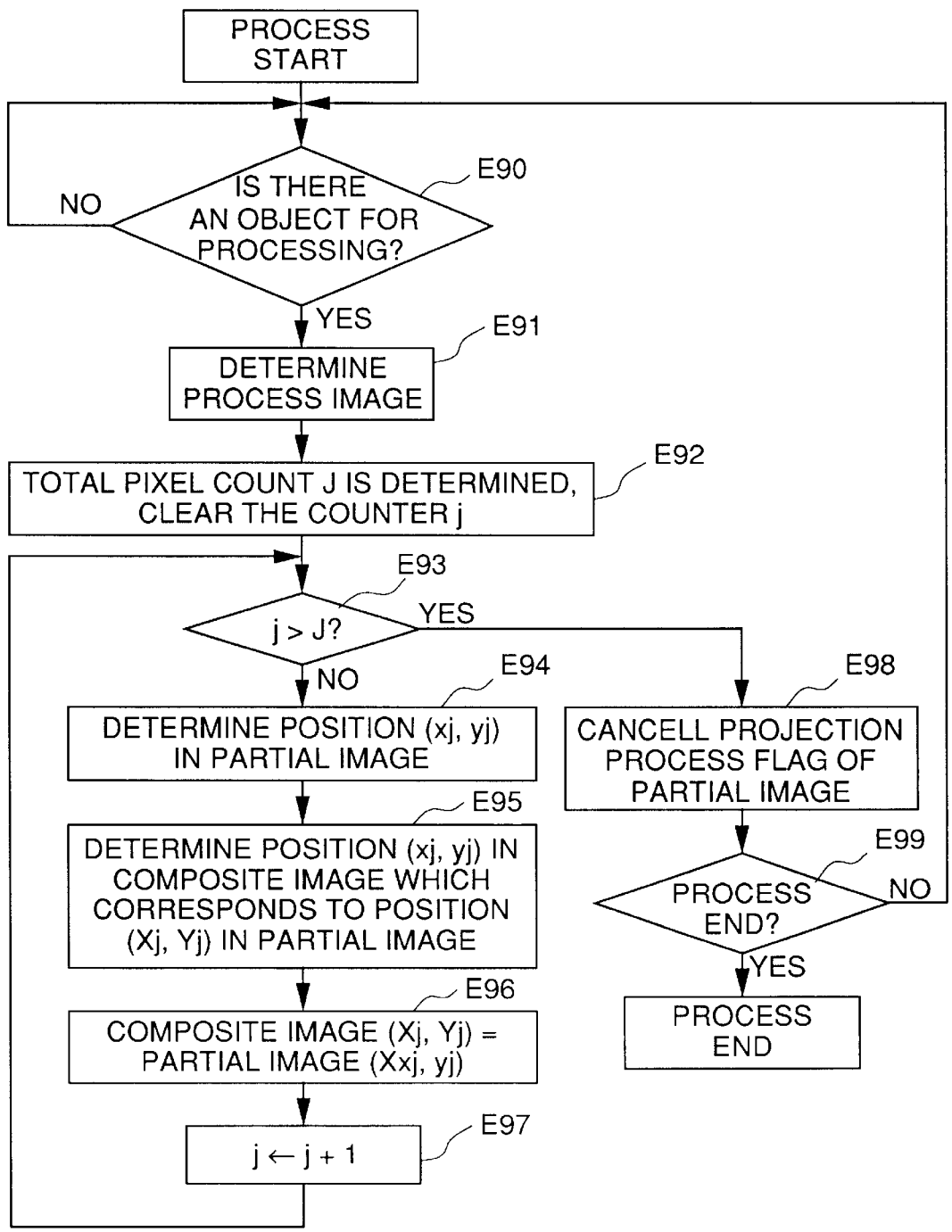
FIG. 11 is a flowchart showing the contents of the image compositing processing in an image input apparatus in accordance with a second example of the first embodiment of the present invention.

FIG. 11 serves to explain in detail the flow of the processing of the compositing process (step E00) in the second example. In comparison with the first example, the compositing example in the second example observes the projection process flag of partial image i of the image attribute memory 004, and thereby, makes a determination whether the partial image which is to be processed has been obtained, and continuously conducts the projection processing of the partial image onto the composite image from the partial image and the acquisition position thereof.

In other words, first, in FIG. 11, a determination is made as to whether or not the projection process flag of the partial image i which is to be processed and which is stored in image attribute memory 004 has been set, and if the flag has been set, in the same manner as in the processes having the same designations in FIG. 7, which serves to explain the flow of the processing in the first example, the processes of steps E91–E97 are applied, and the partial image is projected onto the composite image. When the projection processing of the partial image i has been completed, then by canceling the projection process flag, the fact that the processing with respect to the partial image i has been completed is recorded (step E98).

Then, when there has been a directive (step E99) from the termination confirmation process (step A02) in FIG. 8, the compositing process is terminated. Where there has been no such directive, the processes after step E90 are repeated.

In the display process, the display control mechanism 011 reads out the composite image continuously from image memory 008, and displays this in display mechanism 012 (step G00). Because it is continuously read out and displayed, the updated composite image is immediately displayed in display mechanism 012. A portion of the composite image may be selectively displayed in accordance with the directive of a user, or a plurality of users may extract differing parts of the composite image and display them in display mechanism 012; this is the same as in the case of the first example.

By making the processing parallel in nature, in comparison with the first example, in a single flow of processing from image acquisition to the compositing of the image, an advantage is gained in that there is no problem with a delay in a single process having an effect on other processes, thus reducing the operational speed overall.

Next, an example of the second embodiment of the image input apparatus in accordance with the present invention will be explained in detail with reference to the figures.

In the first embodiment, the structure was such that there were no differences generated between the positioning at which the acquisition of the partial image was to be carried out and the orientation of the camera when the partial image was actually acquired. However, when the accuracy of detection of the orientation of the camera movement mechanism 014 was low, and further, when the delay from the image acquisition directive to the actual acquisition of the partial image was great, there was a high probability that large errors would be included in the acquisition position of the partial image, particularly when camera 005 was moved continuously, and this caused a problem in that the accuracy of the composite image worsened dramatically.

The second embodiment of the present invention was created in order to solve these problems; in comparison with the first embodiment, it is capable of eliminating errors incorporated in the acquisition positions of each partial image and acquiring a highly precise composite image, by adding a positioning mechanism which applies positioning between partial images.

The present example has an outward appearance identical to that shown in FIG. 25, which serves to explain the structure of an example of the first embodiment; however, in addition to posture control mechanism 015, image attribute memory 004, image acquisition mechanism 006, image acquisition control mechanism 007, image memory 008, image compositing mechanism 009, and display control mechanism 011, box 101 also contains a positioning mechanism 013, and is connected to the other structural elements by means of cables. In comparison with the first example of the first embodiment, structural elements having the same designations provide the same functions; however, image attribute memory 004 stores data relating to the orientation of camera 005 during the acquisition of the partial images as well as positional correction amounts of the compositing positions of each partial image which are determined by the positioning mechanism 013. Furthermore, image compositing mechanism 009 uses the acquisition positions of the partial images within image attribute memory 004, as well as the positional correction amounts of the partial images obtained by positioning mechanism 013, and determines the compositing positions.

Figure 12:
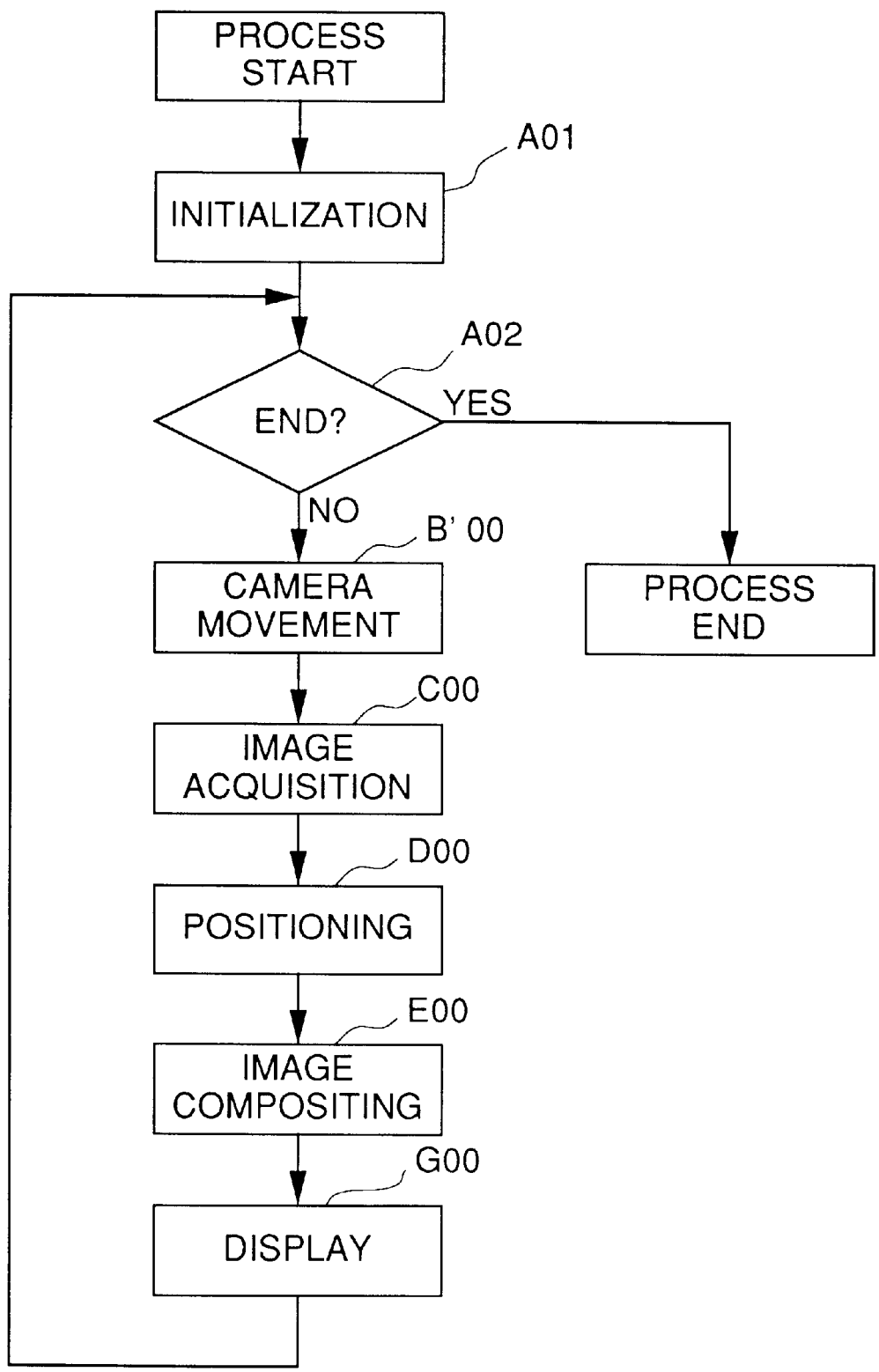
FIG. 12 is a flowchart showing the contents of the processing in a n image input apparatus in accordance with a first example of the second embodiment of the present invention.

FIG. 12 serves to explain the flow of the processing in this example. In FIG. 12, structure elements having the same designation as those in FIG. 5, which serves to explain the flow of the processing in the first example of the first embodiment, provide the same functions. In this example of the second embodiment, those parts which are not related to the positioning mechanism 013 and the positioning process (step D00), such as the outward appearance, the structure of each mechanism, the projection surface, the setting of the coordinate system, and the like, are all identical to those in the example of the first embodiment.

In FIG. 12, the initialization (step A01) has added thereto, in comparison with the first example of the first embodiment, a process which initializes the positional correction amount values to 0 when determining the compositing positions of the partial images. The termination confirmation (step A02), the camera movement (step B'00), and the image acquisition (step C00) are identical to those of the first example of the first embodiment.

Figure 13:
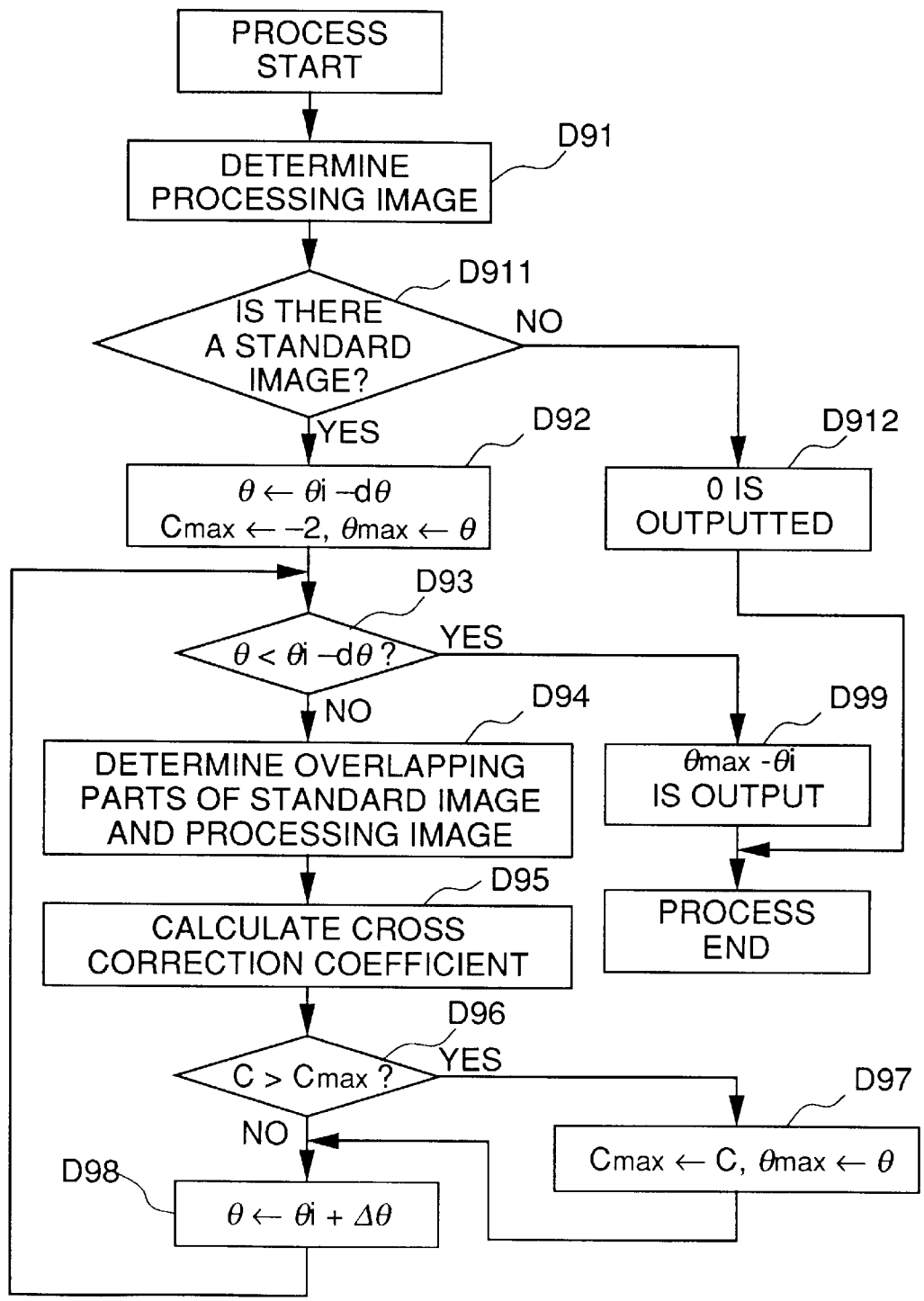
FIG. 13 is a flowchart showing the contents of the positioning processing in an image input apparatus in accordance with a first example of the second embodiment of the present invention.

FIG. 13 serves to explain the flow of the processing in the positioning process (step D00) in an example of a second embodiment of the present invention.

In FIG. 13, first, the positioning process determines the standard image, which serves as the standard when determining the partial image i and the positional correction amount of the partial image i (step D91). Here, the immediately previously acquired partial image, that is to say, partial image i−1, is used as the standard image. When i−1 is less than 0, the partial image i−1+N is used as the standard image. The standard image selection method used herein is only provisionally employed; other selection methods may be employed insofar as they involve images which have a correlation with the partial image i which is the object of processing. Furthermore, it is of course the case that it is also possible to employ, rather than a partial image, the composite image itself as the standard image. In the case in which there is no standard image (step D911), the positioning process is not conducted, and a positional correction amount of 0 is used (step D912), and the processing is terminated.

In the present example, a sequential search method which employs cross-correlation coefficients in the same manner as methods which are commonly used in image processing is employed. In other words, with respect to the acquisition position θi and the maximum error dθ of partial image i, processing is employed which selects, within the range θi−dθ≦θ≦θi+dθ, the θ having the highest cross-correlation coefficient in the overlapping parts of the standard image and the partial image i. dθ is a value which is determined from the drive accuracy of the camera movement mechanism and the positional detection accuracy; here, it is one-third of the image acquisition interval of 24°. When the drive accuracy of the camera movement mechanism and the positional detection accuracy are high, this value may be smaller, while when they are low, the value is set higher.

First, the variable θ is initialized to θi−dθ, which is the minimum value within the range, Cmax, which indicates the maximum cross-correlation coefficient, is initialized to a value smaller than the lower limit value of the cross-correlation coefficient (here, −2), and the position θmax, which returns a maximum cross-correlation value, is initialized to the acquisition position θi (step D92). Then, by applying the processing from step D94 onwards while variable θ is within the predetermined range, the position is determined at which partial image i best overlaps the standard image (step D93).

For this purpose, first, a working image having size sufficient to include both the standard image and the partial image when these images are projected by a method identical to that of the compositing processing in the example of the first embodiment is secured in image memory 008, all pixels are made blank, and the standard image is projected onto the working image by a method which reduces the effects of differences in viewpoint which is identical to that of the compositing processing in the example of the first embodiment. Next, with respect to the variable θ, the projection position of each pixel of partial image i is determined by means of the same projection method, and regions in which the standard image and the partial image i overlap are determined (step D94). The cross-correlation coefficient C is determined in the overlapping region obtained (step D95), and C is compared with the largest cross-correlation coefficient Cmax obtained to date (step D96), and when C is in excess of Cmax, then Cmax is replaced by C, and furthermore, θmax is replaced by θ (step D97). Next, in order to obtain the cross-correlation coefficient at the subsequent positioning, θ is updated such that $$\theta \leftarrow \theta + \Delta\theta,$$

and the processing from step D93 on is repeated (step D98).

Here, Δθ is a value which is to be set in accordance with the necessary accuracy; here, it is 0.5°, which is the smallest gradation of positional detection.

After cross-correlation coefficients have been determined with respect to all positions within the range, the maximum cross-correlation coefficient is stored as Cmax, while the position which returns Cmax is stored as θmax. The positioning process determines the positional correction amount of the partial image i from this θmax as θmax−θi, and stores this in image attribute memory 004 (step D99).

Here, a positional correction amount was determined in order to clearly distinguish the acquisition position of partial image i which was determined in advance and the correction amount thereof, so as to enable the parallel execution of the positioning process and the image compositing process; however, where it is not necessary to clearly distinguish these two, the acquisition position of partial image i may directly be replaced by θ.

Here, the only range which was taken into account was the amount of movement in the horizontal direction of the camera; however, when variations are observed with respect to the other coordinate axes as well, a three-dimensional region comprising variable ranges along each coordinate axis may be considered a candidate.

It is also possible to use positioning methods other than that described above, so that for example, it is possible to carry out a more simple summing of the absolute values of the differences in the subject pixel values, since a large amount of calculation is involved in the cross-correlation coefficients, or it is possible to average this sum over the overlapping surface area. Furthermore, it is possible to employ a method which does not involve a simple sequential search in three-dimensional space, but involves a small amount of calculation using the subject points. Such processes are methods employed in standard image processing, such as positioning or matching processing, and conventional techniques may be employed. Conventional positioning techniques are discussed in detail in Kyoritsu Publishing, bit special volume "Computer Science", ACM Computing Science 92, pages 77–119, so that details thereof are omitted here.

Using the results of the positioning in step D00, image compositing mechanism 009 projects each partial image onto the composite image while reducing the effects of differences in viewpoint contained in the partial images in the same manner as in the example of the first embodiment (step E00). In the present example, the only point which differs in step E91 in FIG. 7, which serves to explain the flow of the processing in the compositing process in the first example of the first embodiment, is that the positioning of the partial images is determined using the orientation data of the camera 005 during the acquisition of the partial images stored in the image attribute memory 004 and the positional correction amount determined by the positioning mechanism 013 to supplement one another; the remainder of the projection method is identical to that in the first embodiment.

In this way, the errors incorporated in the acquisition position of a partial image i are corrected by the positioning mechanism 013, and it becomes possible to produce a highly accurate composite image.

In the second embodiment, as well as in the first embodiment, it is possible to execute each process in parallel. When this is done, the positioning process is executed in parallel with the camera movement process, the image acquisition process, and the image compositing process in FIG. 8, which shows the flow of the processing, and the processing flow shown in FIG. 15 results.

The positioning process may be executed with reference to a positioning process flag which indicates whether or not the positioning process is to be applied and which is stored in image attribute memory 004, in the same manner as in the image compositing process in the example in which each process is executed in parallel in the first embodiment.

In other words, in the image acquisition process (step C00), with respect to a new acquired partial image, the partial image is stored in image memory 008, and the position during acquisition and the attribute data are stored in image attribute memory 004, and additionally a positioning process flag which indicates whether the positioning process is necessary is set in image attribute memory 004 (step C93). The positioning process flag may be easily executed by adding an attribute of the partial image in the image attribute memory 004 in the same manner as that of flags commonly used in computer processing; these flags are canceled during the initialization in step A01. This positioning process flag is canceled when the positioning process has been completed with respect to the partial image acquired. This positioning process flag is only one example; any sort of method may be employed insofar as it is capable of confirming the acquisition of a partial image and the application of a positioning process thereto.

In comparison with the example of the second embodiment described above, the positioning process flag of the partial image i in the image attribute memory 004 is observed during the positioning process, and thereby, a determination is made as to whether the image which has been acquired is to be processed, and the process of projection of the partial images onto the composite image is continually conducted from the partial images and the acquisition positions thereof.

Figure 15:
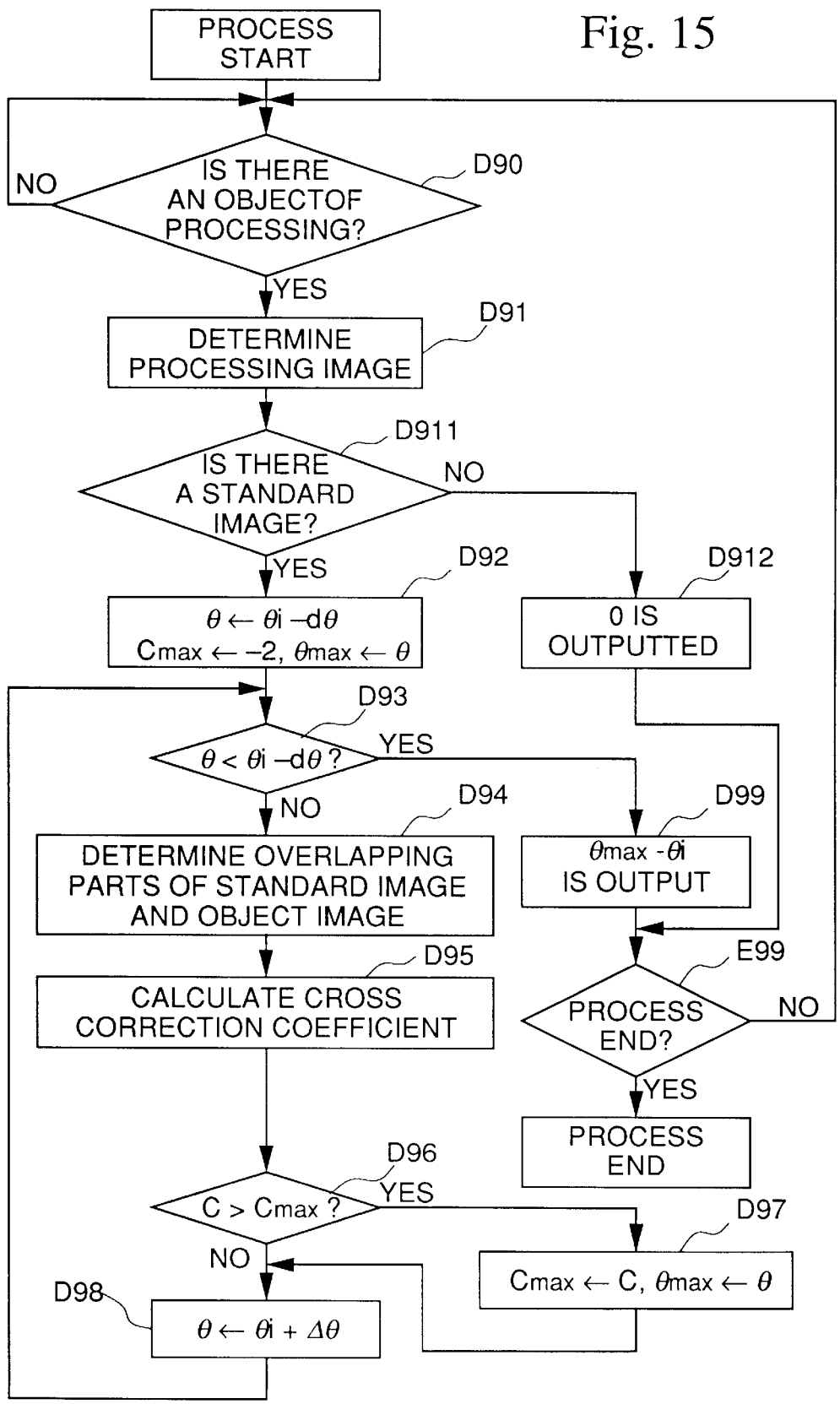
FIG. 15 is a flowchart showing the contents of the positioning processing in an image input apparatus in accordance with a second example of the second embodiment of the present invention.

In other words, first, in FIG. 15, a determination is made as to whether or not a positioning process flag was stored in the image attribute memory 004 for a partial image 1 during the acquisition of a partial image i which is to be processed, and when the flag was set, the processes from step D91–D912 are applied in the same manner as the processes having the same designations in FIG. 13, which serves to explain the flow of the processing in the example of the second embodiment described above, and a positional correction amount is determined for the partial image. When the positioning process of the partial image i has been completed, the positioning process flag is canceled, and by setting the projection process flag, the fact that the positioning process has been completed with respect to partial image i and that the application of the compositing process is required is recorded (step D913).

Then, when there has a been a directive (step D910) from the termination confirmation process (step A02) in FIG. 8, the compositing process is terminated. Where there has been no such directive, the processing from step D90 onward is repeated.

In the image compositing process (step E00), reference is made to the projection process flag which was set by the positioning process, and the image compositing process is executed in accordance with a processing flow identical to that of the second example of the first embodiment.

Figure 14:
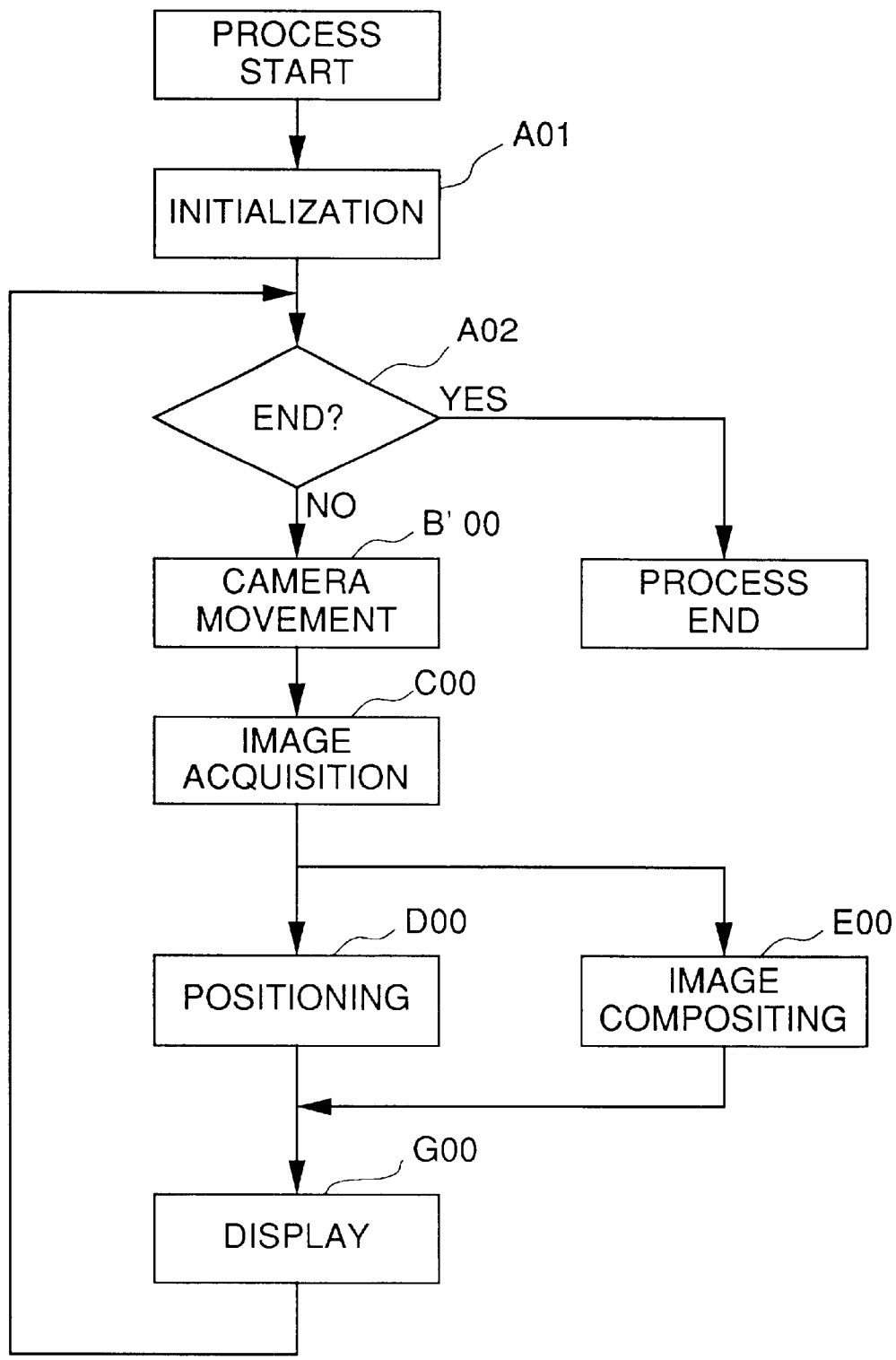
FIG. 14 is a flowchart showing the contents of the processing in an image input apparatus in accordance with a second example of the second embodiment of the present invention.

Furthermore, when the acquisition of partial images and image compositing are carried out continuously and with respect to the same target position, it is thought that the errors contained in the acquisition positions of each partial image become stabilized. In other words, when image acquisition and composition are continuously carried out, it is thought that the positional correction amount corresponding to a partial image i determined at a certain point in time may be employed with a high degree of accuracy at the time of acquisition of the subsequent partial image i. Using this fact, in the first example, as shown in FIG. 14, the positioning process (step D00) and the compositing process (step E00) may be executed in parallel. At this time, when determining the compositing positions in the compositing process (step E02), it is possible to use the positional correction amount which was previously determined with respect to the partial image i. By means of this structure, it is possible to reduce the effects of the positioning process, which involves high processing costs when compared with the other processes and which tends to cause a lowering of the overall processing speed.

Furthermore, in the image compositing process in the examples of each embodiment described above, a method was described in which a partial image i was projected onto a composite image; however, it is also possible to determine the pixel values of the points in the composite image by projecting the points in the composite image onto an image plane.

Figure 16:
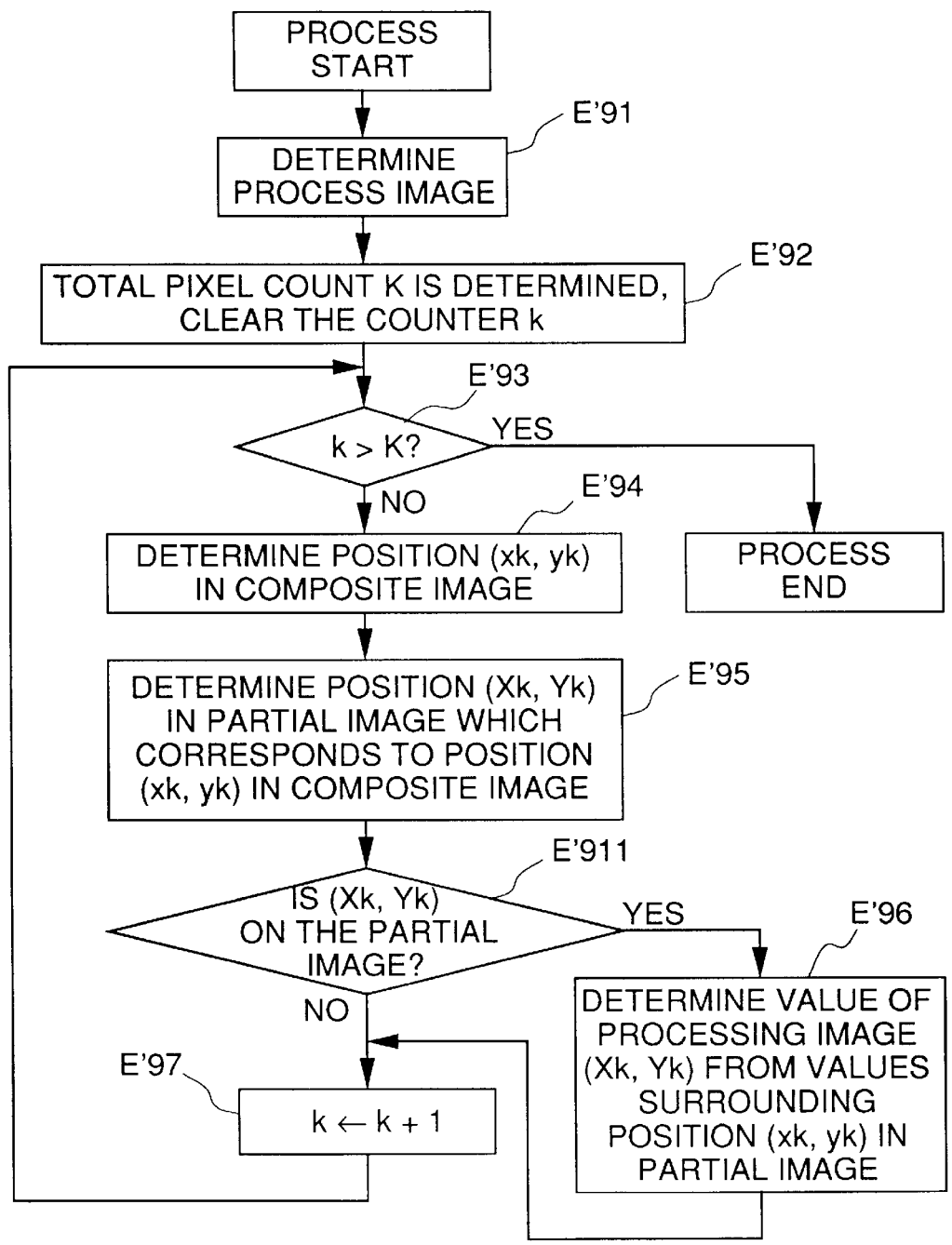
FIG. 16 is a flowchart showing the contents of another example of an image compositing process in an image input apparatus in accordance with an embodiment of the present invention.

FIG. 16 serves to explain an example of the processing flow in an image compositing process which is structured so that the pixel value of a point in the composite image is determined by projecting the point in the composite image onto an image plane.

The size of the composite image is determined in advance in the initialization processing of step A01, and the size in the X and Y directions is indicated by Mx, My. These values may be determined using the acquisition positions θi with respect to all partial images from the maximum and minimum values in the X and Y directions of positions in the composite image of pixels contained in the partial images determined by the same method as in the compositing process in the examples described above.

In the same manner as in FIG. 7, which serves to explain the flow of the processing in the image compositing process of the examples described above, the image compositing process 009 obtains the partial images i immediately after acquisition and the composite image from the image memory 008, and obtains as initial attribute data the various acquisition positions θi from image attribute memory 004 (step E'91). Here, there is no overlap in the pixels contained in the composite image, and a number k (where $0 \leq k \leq K$) is attached thereto in order from 0, and by indicating this number k, the position of the pixel in the composite image is determined. This is only provisionally set in this manner to facilitate the explanation; any sort of method may be employed insofar as it is capable of selecting pixels in order and without overlap. For example, there is no change in the essence of the present invention if a method is employed in which the values along each axis change in the X direction and Y direction, as in the raster scanning which is commonly employed.

The image compositing process initializes the variable k which designates the pixels in the image composited, and determines K, which indicates the total number of pixels (step B'92). Concretely, the following is accomplished:

$$k \leftarrow 0$$

$$K \leftarrow Mx \times My$$

Then, with respect to all pixels, the processing from step E'94 onward is applied (E'93). First, the positioning (Xk, Yk) in the composite image corresponding to the number k is determined as follows:

$$Xk \leftarrow (k \bmod Mx) - Mx \div 2$$

$$Yk \leftarrow (k \operatorname{DIV} Mx) - My \div 2$$

Here, MOD indicates an integer operator which determines the remainder when k is divided by Mx, while DIV indicates an integer operator which determines the quotient when k is divided by Mx. (Xk, Yk) is expressed in a coordinate system having the center of the composite image as the origin thereof.

A point indicating the pixel positioning (xk, yk) in a partial image which corresponds to a point indicating a pixel positioning (Xk, Yk) in the composite image obtained is then determined (E'95). In other words, the three-dimensional coordinates (X, Y, Z) of a projection point 312 on the projection surface 306 are expressed from a point (Xk, Yk) in the composite image by the reverse conversion of formula 7, which can be expressed by formula 8, so that it is possible to determine a point p311 as the point of intersection between the image plane 302 and a straight line which is parallel to a straight line connecting the projection point 312 and the center of rotation c313 of the camera and which passes through the viewpoint o301. Here, the positional vector of point q309 on the straight line 307 which passes through viewpoint o301, which has the vector from the center of rotation c313 of the camera to the projection point 312 as a directional vector, may be expressed by formula 9 using variable s.

Furthermore, the normal vector of image plane 302 is parallel to the positional vector of viewpoint o312, and passes through the intersection point between the optical axis and the image plane, or in other words, passes through a point resulting from the rotation of a point corresponding to (0, 0, f+L) in accordance with φ, ρ, and θ when φ=ρ=θ=0, so that the positional vector of point p311 on the image surface satisfies formula 10.

If replacement of ρ by 0 and θ by θi is carried out, then equation 11 results.

The point on the image plane 302 corresponding to the point (Xk, Yk) in the composite image is determined from the intersection point between the straight line 307 and the image plane 302, so that the constant s which defines the three-dimensional coordinates of the point p311 is given by formula 12, and substituting in 0 for ρ and θi for θ, formula 13 results:

The three-dimensional coordinate X and Y components (xk, yk), which result formula 14 when a conversion which is the inverse of formula 1 is conducted on the three-dimensional coordinates (x, y, z) of the point p311 which is defined by substituting this s into formula 9, or in other words, by the rotation by (−φ, −ρ, −θ) along each of the X, Y, and Z axis, when substituted thereinto 0 for ρ and θi for θ, formula 15 results in a position corresponding to the point (Xk, Yk) on the composite image in the partial image coordinate system.

In the image compositing process, the coordinate values in the partial image coordinate system which correspond to each pixel in the composite image are determined in accordance with the calculation method described above (step E'95), and a determination is made as to whether or not these values are within the partial image range, that is to say, between (−Sx/2, −Sy/2) and (Sx/2, Sy/2) (step E'96), the pixel value of the point (Xk, Yk) in the composite image is determined from the pixel values of the four points surrounding the point (xk, yk) in the partial image by co-linear interpolation. Any sort of interpolation may be employed insofar as it is used in common image processing. Interpolation processes are discussed in detail in "Image Analysis Handbook", pages 441–444, Tokyo Daigaku Shuppankai, 1992, so that the details thereof will be omitted here.

After the pixel value in the composite image corresponding to k is determined, the image compositing process increases the value of k by 1, and continues the execution of the processing described above with respect to the next image (step E'97).

When a corresponding point in a partial image is determined from a point in the composite image in this manner, the fact that the blank pixels which accompany errors in coordinate rounding are not generated in the composite image is a characteristic feature.

Furthermore, in the image compositing process described above, the size of the composite image was calculated in advance from the projected positions of the partial images; however, there are cases in which the size of the composite image may be set by other means, such as a directive from the user or the like. In such cases, as well, it is possible to employ the image projection method described above by finding an enlargement or reduction ratio such that the composite image size obtained by calculation fits within the indicated size, and by applying this ratio to the coordinate system of the composite image. For example, when the size determined by calculation is 2000×200 pixels, and the indicated size is 500×50 pixels, then by multiplying the X and Y components of the coordinate values of the indicated size by 4, it is possible to conduct a conversion to the coordinates in the case where a composite image having a size obtained by calculation is employed, and by using these coordinate values, the corresponding point in the partial image may be obtained.

Figure 17:
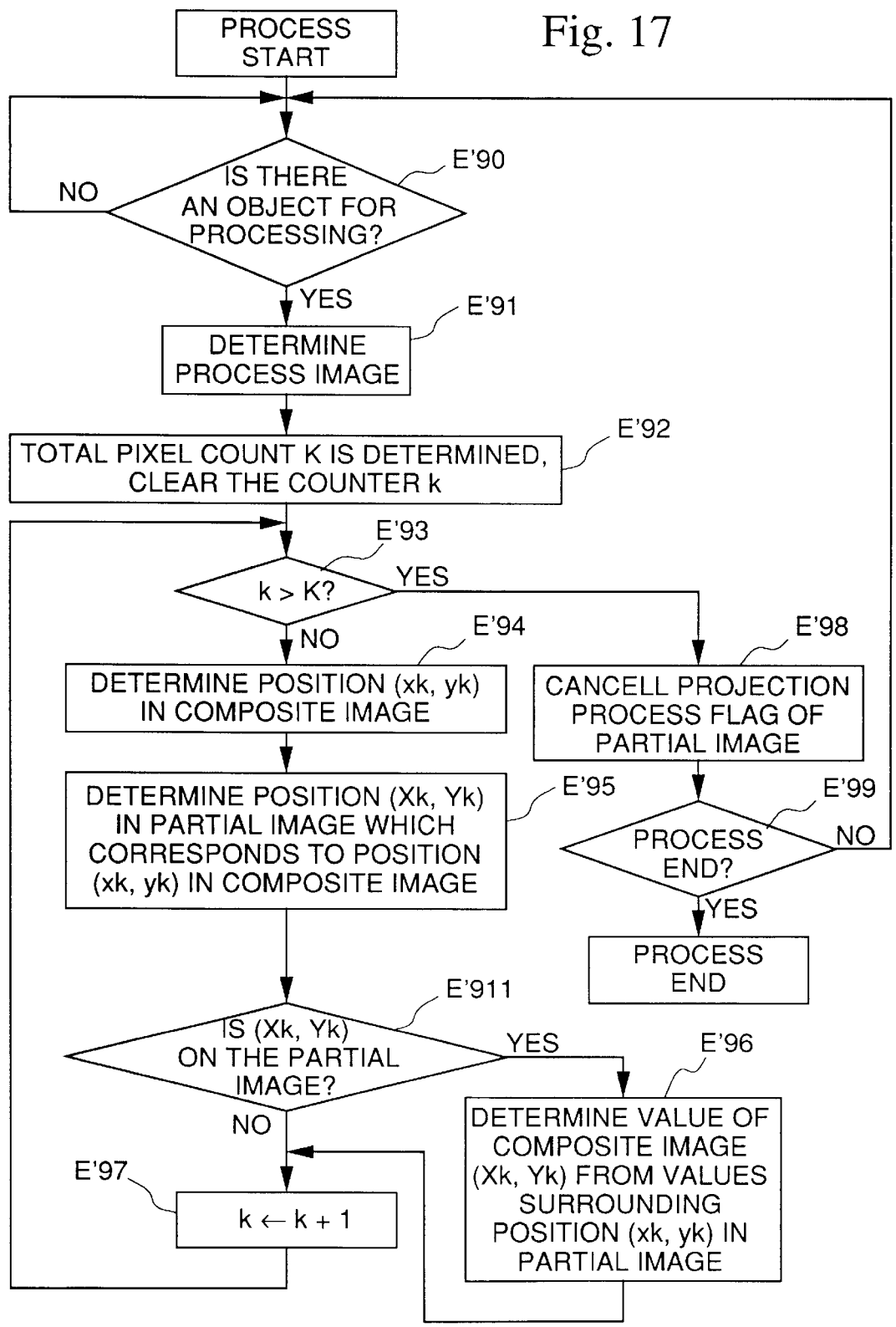
FIG. 17 is a flowchart showing the contents of another example of an image compositing process in an image input apparatus in accordance with an embodiment of the present invention.

The image compositing processing which determines a corresponding point in a partial image from the coordinates in the composite image may also be conducted in parallel with other processes, and FIG. 17 shows the processing flow when the image compositing process is executed in parallel. The processing flow depicted in FIG. 17 is one in which a change is added to the image compositing process shown in FIG. 16 such that the process is conducted while referring to the presence of a projection process flag in the image to be processed, in the same way as in the image compositing process which is processed in parallel in FIG. 11 with respect to the image compositing process depicted in FIG. 7; the details thereof will be omitted here.

Furthermore, in this example of the second embodiment, the camera movement mechanism 014 detected the orientation of the camera 005 at the time of partial image acquisition; however, in the case in which a positioning mechanism 013 is a structural element, it is possible to omit the mechanism which detects the orientation of camera 005 by appropriately setting the existing range of $\theta$.

Next, an image input apparatus in accordance with third and fourth embodiments of the image input apparatus 100 of the present invention will be explained in detail with reference to figures showing the contents of the processing of each structure, using concrete examples.

Figure 32:
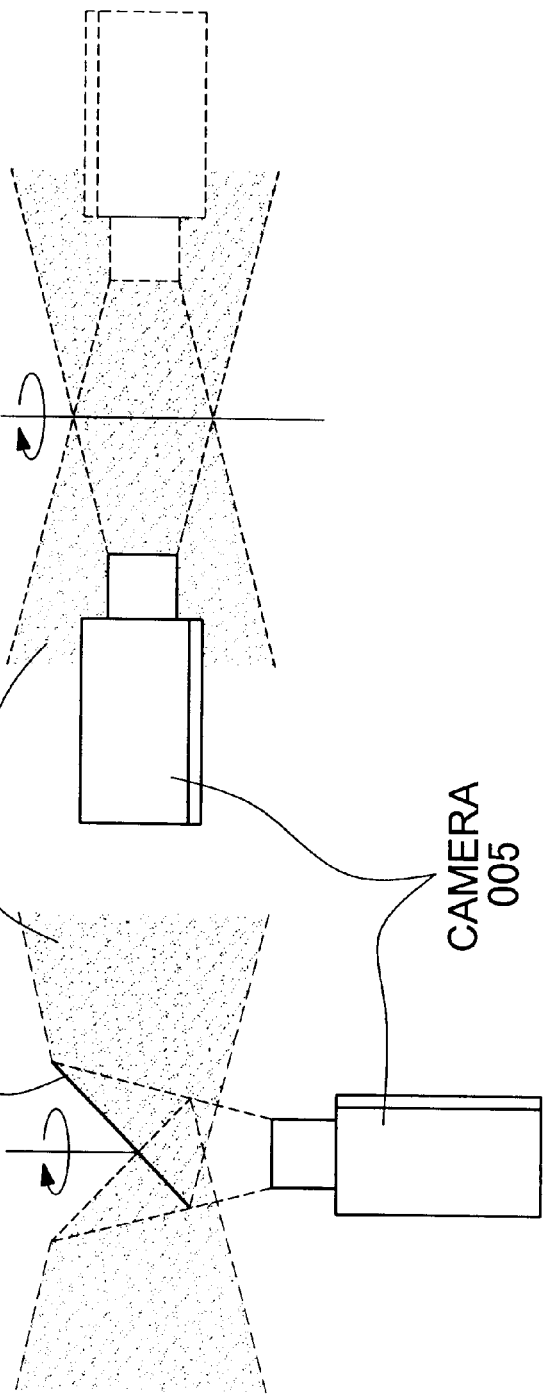
FIGS. 32A and 32B are explanatory diagrams showing the image acquisition range with respect to various cases in which the camera is rotated and in which a mirror is rotated in front of the camera, in an image input apparatus in accordance with the present invention.

Whereas the first and second embodiments composite a plurality of partial images obtained by rotating the camera 005 itself, the third and fourth embodiments are characterized in that they acquire the plurality of partial images by rotating a mirror 001 in front of the camera 005. FIGS. 32A and 32B serve to explain the correspondence between the rotation of mirror 001 and the rotation of camera 005; the right hand side depicts the case in which the camera is rotated, while the left hand side depicts the case in which the mirror is rotated in front of the camera.

As shown in FIGS. 32A and 32B, if changes in the actual vertical or left/right correspondence with the image or geometric warping are excluded, the rotation of the mirror 001 about the optical axis of camera 005 corresponds to a panning operation of camera 005, while the rotation of mirror 001 about an axis which is perpendicular to the optical axis of the camera corresponds to a tilt operation of camera 005. For this reason, there are cases in which, when simple compositing is carried out, the effects of differences in viewpoint are incorporated, and discontinuities are generated in the forms or positions in the composite image, when mirror 001 is employed. In the third and fourth embodiments, the effects of degradation in image quality resulting from these differences in viewpoint are reduced by applying compositing methods which are the same as those in the first and second embodiments.

In the following explanation, various structural elements having the same designation as those in the examples of the first and second embodiment provide essentially the same functions. In particular, those parts for which no explanation is given are all identical to the examples in the first and second embodiments, and the explanation given here will center on the differences between these and the examples of the first and second embodiments.

Figure 33:
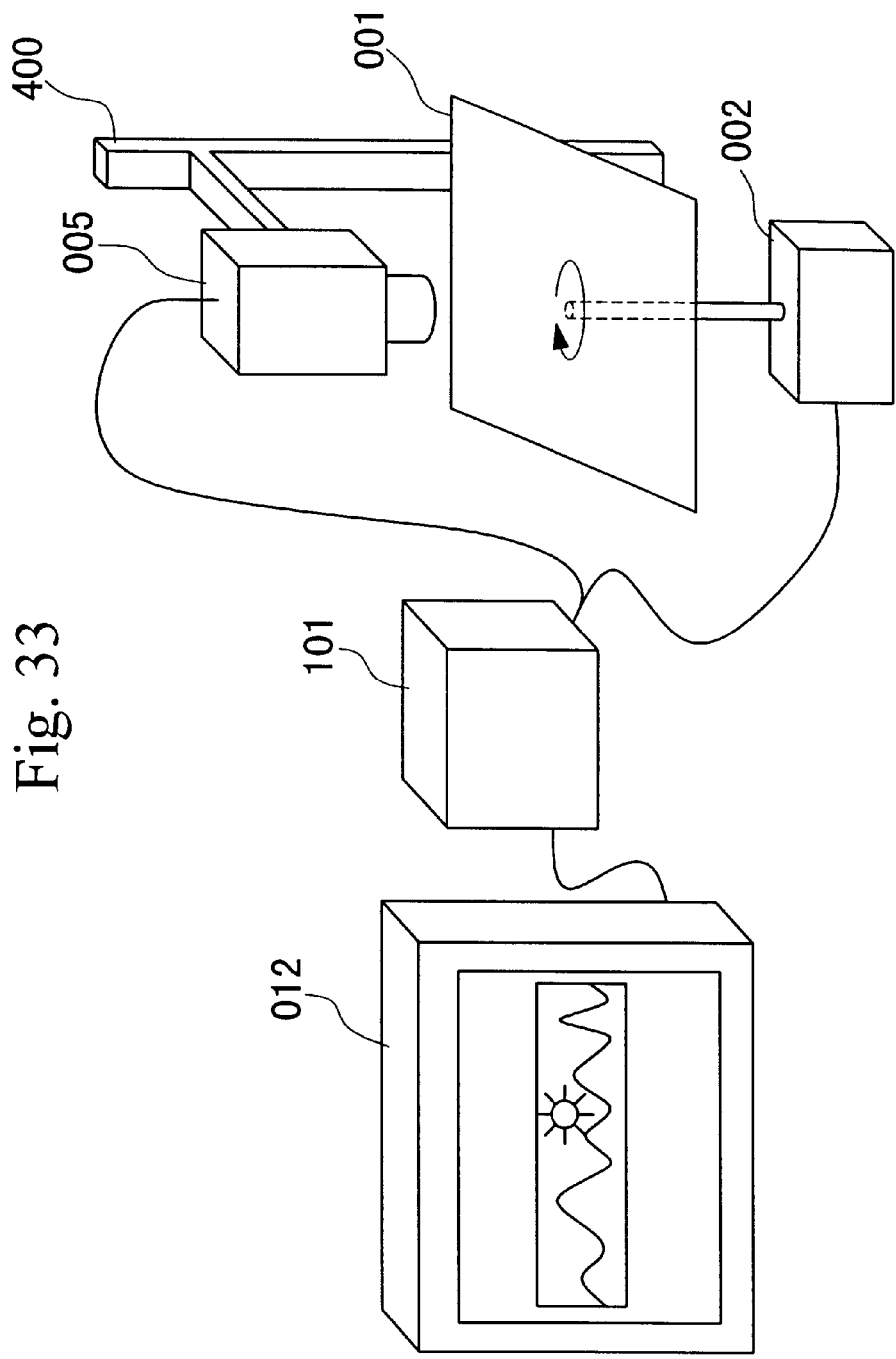
FIG. 33 is an explanatory diagram showing an example of the outward appearance of an image input apparatus in accordance with an example of the third and fourth embodiments of the present invention.

FIG. 33 serves to explain the structure of an example of the third embodiment; using this figure, each structure during the input of the image will be explained.

In FIG. 33, box 101 holds the mirror control apparatus 003, the image attribute memory 004, the image acquisition mechanism 006, the image acquisition control mechanism 007, the image memory 008, the image compositing mechanism 009, and the display control mechanism 011 of the embodiment described above, and the other structural elements are connected by means of cables.

Mirror 001 is supported by mirror movement mechanism 002 and is rotatable in a horizontal direction. In the same manner as the camera movement mechanism 014 in the first and second embodiments, mirror movement mechanism 002 employs a stepping motor, an origin detector, gears, and a mirror supporting jig, and realizes the horizontal rotation of the mirror connected to the jig by extracting the rotational output of the stepping motor as a rotation of the supporting jig by appropriately reducing that output via gears. The origin detector detects the amount of rotation of the mirror in the horizontal direction using a reference point which is seen as 0, so that for example, a structure may be employed in which a Hall element and a magnet attached to the gear are combined, and one pulse is emitted per one horizontal rotation of the mirror. Such origin detectors are frequently employed together with stepping motors, so that a detailed explanation thereof will be omitted here.

In the case of a mirror movement mechanism 002 having the structure described above, the orientation of mirror 001, that is to say, the angle thereof in the horizontal direction, is determined as a standard for the output of the origin detector from the number of output pulses to the stepping motor and the rotational amount per pulse and the gear deceleration ratio. Clearly, the mirror movement mechanism 002 may have a structure other than that described above, so that for example, a structure may be employed in which a DC motor, deceleration gears, a mirror attachment jig, and a rotary encoder are employed, and a variety of other methods are possible.

Mirror control mechanism 003 sends a pulse to the mirror movement mechanism 002, calculates and stores the sent pulse count, and conducts the origin detection by means of the origin detector, and is the same type of mechanism as is commonly used in the control of stepping motors, so that the details thereof will be omitted here. This may be easily achieved by combining a personal computer and a mechanism for converting the output thereof to a form appropriate to the stepping motor.

In the present embodiment, the amount of rotation per pulse of the stepping motor is 18°, and the gear deceleration ratio is 1:18. At this time, the mirror 001 rotates by 1° in the horizontal direction in response to one output pulse to the stepping motor. This is set in this manner simply in order to facilitate the explanation, and this should not be interpreted as a limitation on the present invention. Clearly, it is also possible to use stepping motors having other amounts of rotation, or other deceleration ratios.

Furthermore, in the present example, mirror 001 is set so as to rotate only in the horizontal direction, and the center of rotation was thus on the optical axis; however, this was done to facilitate the explanation, and the present invention is not limited in this manner. By changing the mechanism of mirror movement mechanism 002, it is also possible to enable rotation in the horizontal and vertical directions of mirror 001, or to place the center of rotation at a point other than on the optical axis.

Figure 34:
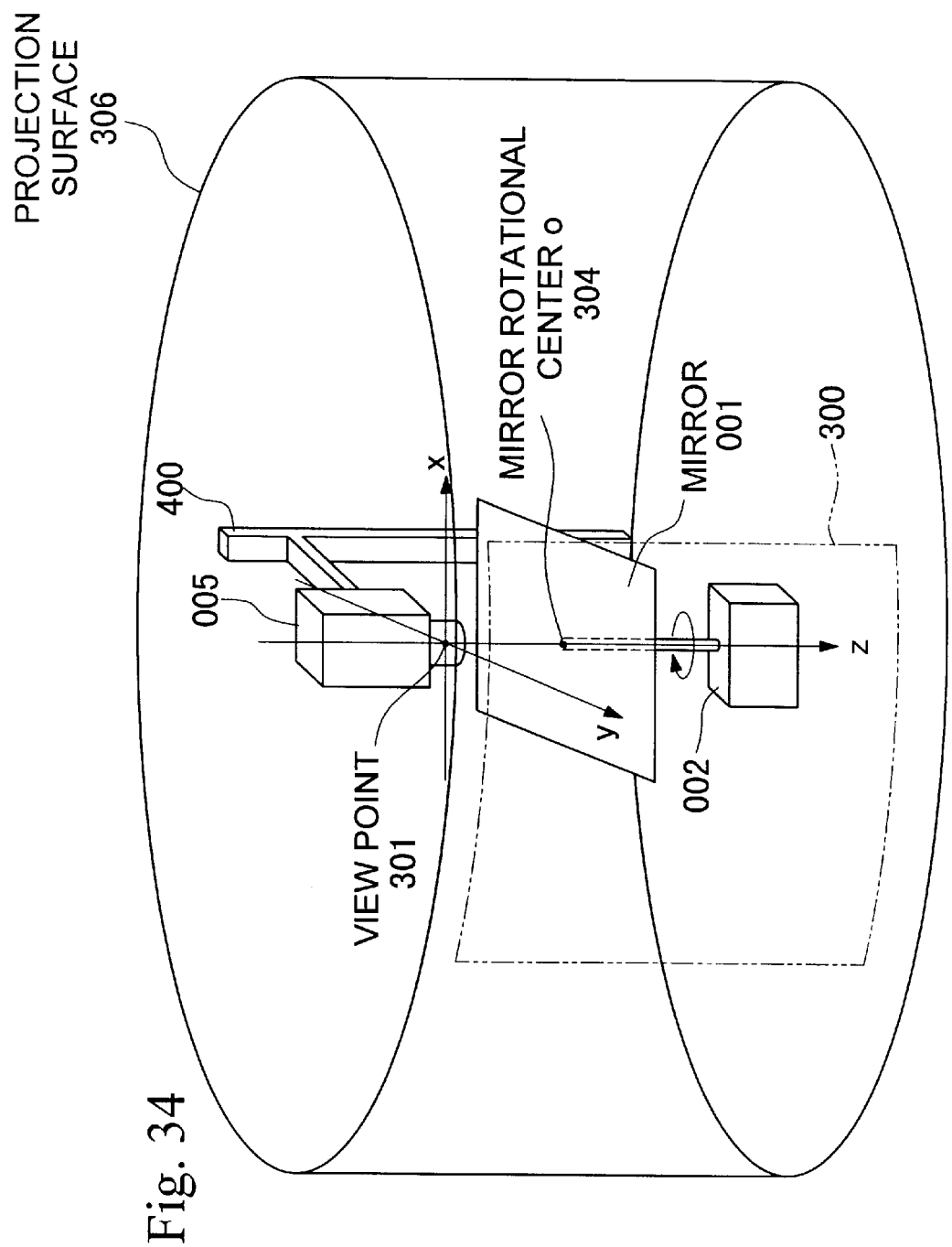
FIG. 34 is an explanatory diagram showing the relationship between the image input apparatus and the projection surface in accordance with an example of the third and fourth embodiments of the present invention.

Camera 005 is a standard video camera, and is supported via support column 400 so that the optical axis of camera 005 and the rotational axis of mirror 001 are in agreement, and camera 005 is disposed so that, via mirror 001, images of the outside field are inputted by camera 005. FIG. 34 is an image diagram which serves to explain the production of a composite image by compositing partial images obtained by camera 005; it shows the relationships between the mirror 001, the camera 005, the mirror movement mechanism 002, the projection surface 306, and the coordinate system.

As is shown in FIG. 34, in the present embodiment, the partial image 300 obtained by camera 005 via mirror 001 is projected onto a cylindrical projection surface 306 which is coaxial with the axis of rotation of mirror 001, and is composited with other partial images. Here, a cylindrical surface was employed as the projection surface 306 in the present embodiment; however, a spherical surface having the center of rotation of mirror 001 as the center thereof is also possible. This projection surface 306 results in a composite image when opened to form a plane.

Furthermore, when the rotational range of mirror 001 is less than 180°, a planar surface is possible instead of a cylindrical surface or a spherical surface, as in the examples of the first and second embodiments.

Figure 35:
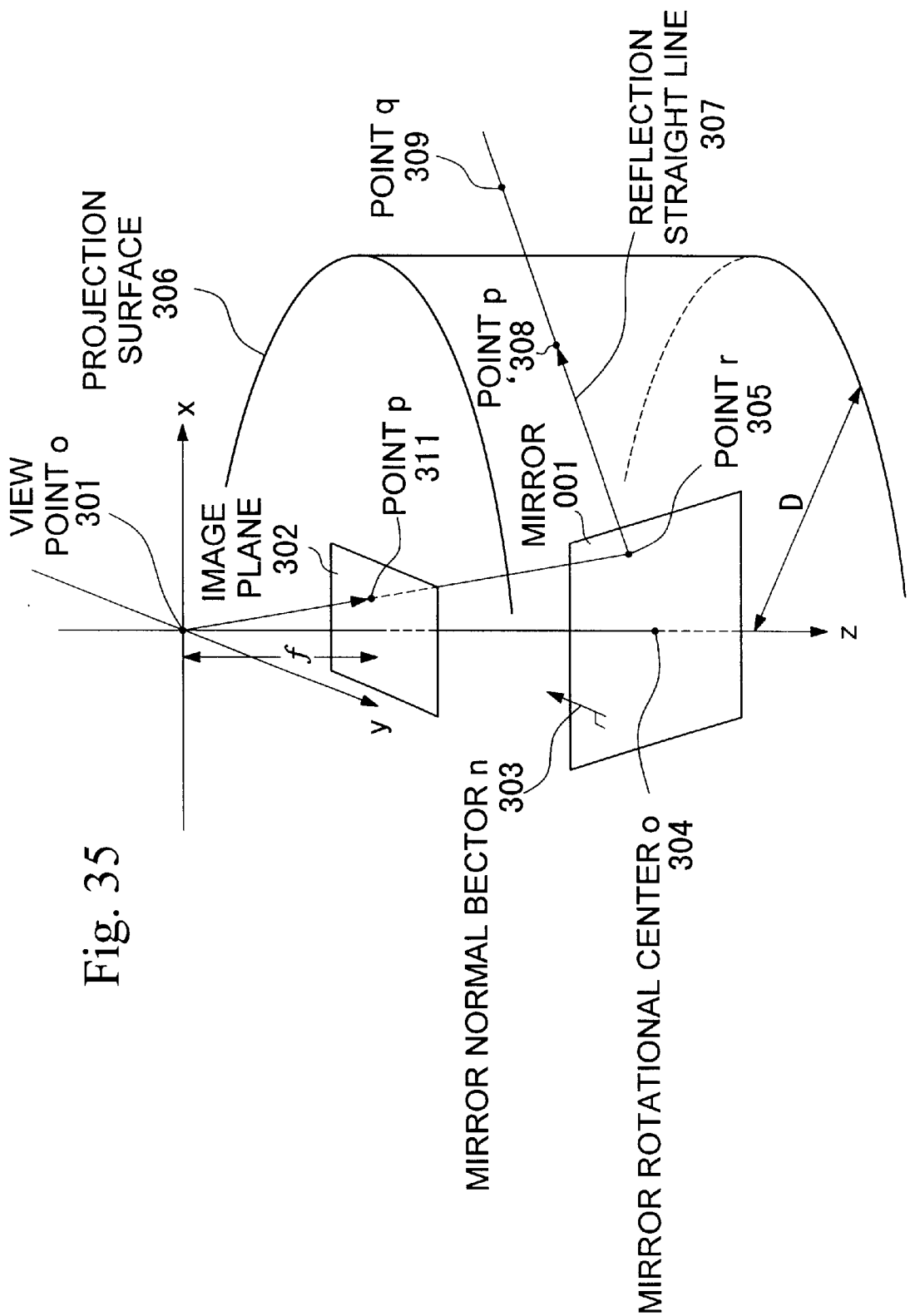
FIG. 35 is a model diagram which serves to explain the projection method applied to an image input apparatus in accordance with an example of the third and fourth embodiments of the present invention.

FIG. 35 is a diagram which serves to explain the compositing process employing projection; it depicts the relationship between the image plane and the projection surface of camera 005 via mirror 001.

In FIG. 35, a three-dimensional coordinate system is established which comprises X and Y axes which are parallel to the axes of image plane 302 which corresponds to the partial image obtained by camera 005, and a Z axis which is in the direction of the optical axis of camera 005, which system has the viewpoint o301 of camera 005, which is realized as a pin hole camera model, as the origin. If the focal length of camera 005 is represented by f, then image plane 302 is present at a positioning separated by a distance f in the Z axis direction. Mirror 005 is realized as a flat surface, and rotates about a center of rotation c304 on the Z axis, and the unit normal vector thereof is n303. Projection surface 306 is a cylindrical surface having the Z axis as the axis thereof, and the diameter thereof is D.

The unit normal vector n303 of mirror 001 is obtained by formula 16, using the state in which it is level, or in other words, is parallel with the XY plane, as the standard, and employing the rotational amounts $\phi$, $\rho$, and $\theta$ about each of the X, Y, and Z axes. In this example, rotation was contemplated only in the horizontal direction, so that $\phi$, which corresponds to the amount of rotation in the vertical direction, was fixed, and furthermore, the value of $\rho$, which corresponds to the amount of rotation about the Y axis, was viewed as 0. The amount of rotation in the horizontal direction, that is to say, the rotational amount $\theta$ about the Z axis, was a value obtained by observation by the mirror movement mechanism 002.

FIG. 18 serves to explain the flow of the processing in this example.

Hereinbelow, based on FIG. 18, the flow of the processing in the present example will be explained in detail.

In the present example, the image input apparatus 100 first conducts the necessary initialization of all structural elements, such as the initialization of the number of images constituting a single wide-viewfield image, the positions at which each partial image is to be acquired, the movement of mirror movement mechanism 002 to the origin, and the initialization of the counter which calculates the number of output pulses within the mirror control mechanism 003 (step A01). This is the same as in the examples of the first and second embodiments, so that the details thereof will be omitted here.

The orientation of the mirror 001 which is to acquire the partial image i is expressed by the angle $\theta i$ in the horizontal direction. This is only provisionally set in this manner, and the present invention should not be limited thereto, and other methods of expression are also possible. When rotation of the mirror 001 is also possible in directions other than the horizontal direction, in other words, about axes other than the Z axis, the orientation in which image acquisition is to be conducted may be set so as to include the amounts of rotation about all axes.

Furthermore, the image memory 008 is of a size sufficient to store the composite image and a number N of partial images, and various attribute data relating to the size of the partial images, the posture of the mirror during acquisition, the positions in the image memory which stores the partial images, the size of the composite image, and its position in the image memory which stores the composite image, are stored in image attribute memory 004. By employing these data, it becomes possible to avoid referring to the pixel values of each partial image or the composite image. Such an image memory 008 and image attribute memory 004 may easily be realized by combining memory elements or by diverting a storage apparatus installed in the computer.

After the completion of initialization, the image input apparatus 100 of the present invention repeats the processing steps B00–G00 until the completion of image acquisition processing (step A02). The conditions under which processing is terminated can be established by a directive from the user, or by termination after the elapsing of a predetermined period of time, or by various other methods; details thereof are omitted, as this does not relate to the essence of the present invention.

Mirror control mechanism 003 employs mirror movement mechanism 002 and moves the orientation of mirror 001 to the acquisition position $\theta i$ of partial image i (step B00).

Figure 19:
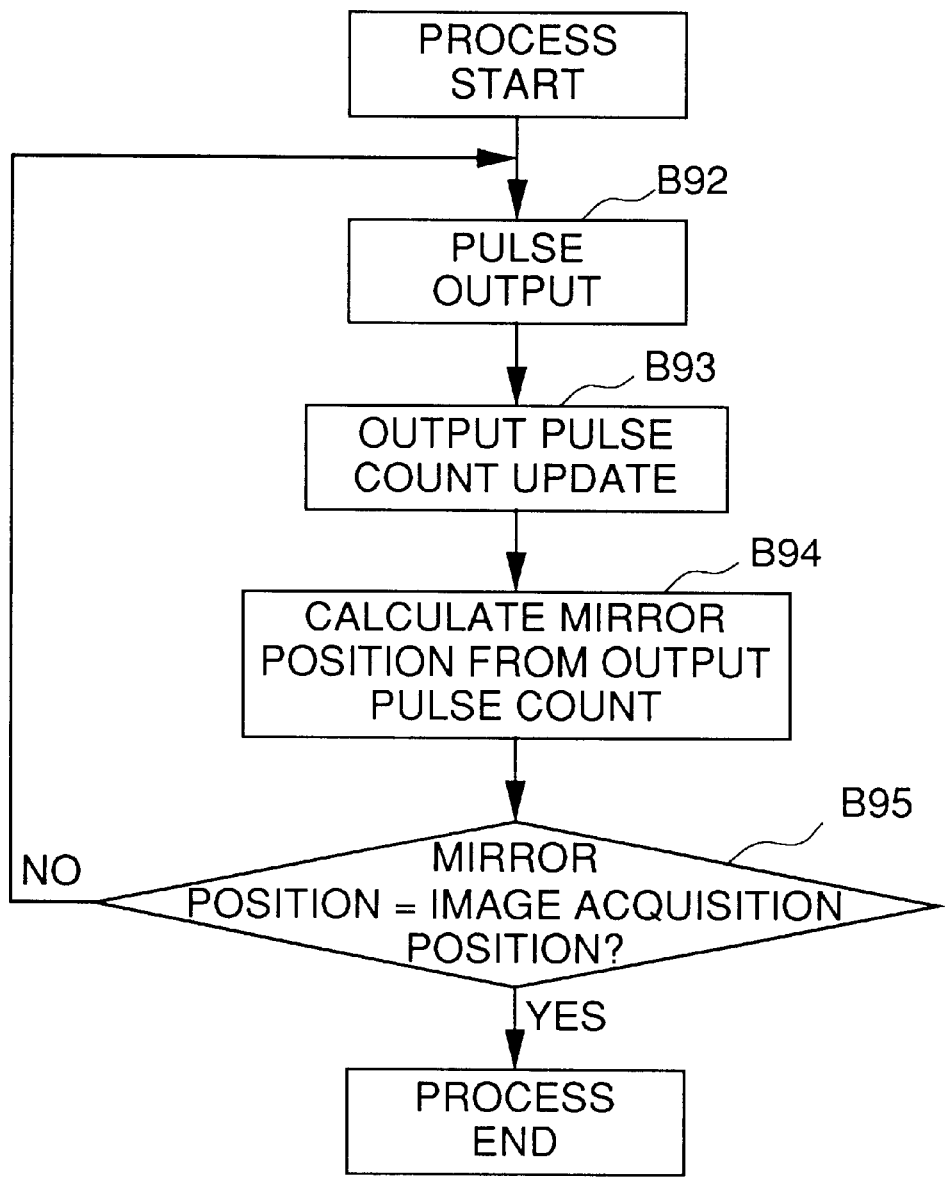
FIG. 19 is a flowchart showing the contents of the mirror movement processing in an image input apparatus in accordance with an example of the third embodiment of the present invention.

FIG. 19 serves to explain the processing flow in the mirror movement processing.

In FIG. 19, mirror control mechanism 003 first sends a directive to mirror movement mechanism 002 and initiates the movement of mirror 001. In other words, mirror movement mechanism 002 outputs a pulse to the stepping motor and moves the orientation of the mirror (step B92), and updates the outputted pulse count (step B93). Then, the orientation $\theta$ of mirror 001 is determined from the output pulse count, based on calculations which are the same as those used to determine the camera angle in the first and second embodiments (step B'94).

Here, in step B92, one pulse is outputted, and in step B94, the counter value which indicates the output pulse count is increased by one. However, this is only provisionally set in this manner, so that for example, in the case of finer gradations in the rotation in the horizontal direction of the camera, it would be possible to output two pulses at the same time, and use values differing from those in the example described above, in the same way as in the examples of the first and second embodiments described above.

After this, mirror control mechanism 003 compares the $\theta$ which was obtained with the $\theta i$ indicating the position at which partial image i is to be acquired, and thereby observes whether or not mirror 001 has moved to the target orientation (step B95), and when the mirror has moved to the target orientation, this mechanism terminates the movement of mirror 001. When the mirror has not reached the target position, control then returns to step B92, and the processing after the pulse output is repeated.

Next, the image acquisition control mechanism 007 incorporates the image acquired by camera 005 via mirror 001 into the apparatus (step C00) in the same way as in the image acquisition process in the examples of the first and second embodiments described above. That is to say, image acquisition control mechanism 007 incorporates the image of the external field taken by camera 005 as a partial image by means of the image acquisition mechanism 006 into the image memory 008, and incorporates the orientation of mirror 001 during acquisition, that is to say, $\theta i$, into image attribute memory 004 (step C00). Here, the structure of the image acquisition mechanism is the same as in the examples of the first and second embodiments described above.

Next, image compositing mechanism 009 projects the partial image obtained onto projection surface 306 so as to reduce the effects of differences in viewpoint, and opens the projection surface 306 and updates the composite image (step E00).

The flow of the compositing process in the present example is the same as the process flow in FIG. 7, which depicts the flow of the compositing process in the examples of the first and second embodiments; however, whereas the orientation of camera 005 was employed in the examples of the first and second embodiments, in the present example, the orientation of the mirror 001 is employed, and the projection method in step E95 employs the center of rotation c304 of the mirror, and these are the points of difference.

In FIG. 7, image compositing mechanism 009 first obtains partial image i from image memory 008 and obtains the acquisition position θi from image attribute memory 004 in order to project the partial image i onto the composite image immediately after acquisition (step E91). In the present example, the number appended to each pixel of the partial images, and the processing which determines the positioning of the pixels in the partial image i using these numbers (steps E92, E93, and E94), are identical to those in the examples of the first and second embodiments.

Hereinbelow, the projection process of the pixels in the partial image onto projection surface 306 in step E95 and step E96 will be explained in detail with reference to the figures.

First, a unit normal vector n303 of the mirror 001 at the time of acquisition of partial image i is determined from the mirror position θi at the time of acquisition of the partial image i by substituting θi for θ, and 0 for ρ in formula 16, in accordance with formula 17.

This shows the conversion in which a unit vector of (0,0,1) is rotated about the X, Y, and Z axis when φ, ρ, and θ are equal to 0. Here, in considering the point p311 (xj, yj) in the partial image i, the coordinates in three-dimensional space thereof are (xj, yj, f). In other words, formula 18 results.

Using parameter s, the straight line passing from viewpoint o301 through point p311 can be expressed by formula 19.

The relationship between point r305 on mirror 001, the unit normal vector n303, and the rotational center c304 can be expressed by formula 20 using the inner product, and in particular, in the case in which the point r305 represents the intersection point between the straight line expressed by formula 19 and the mirror 001, then this can be expressed by formula 21.

Here, the directional vector resulting from the reflection of the straight line directional vector 1 at the surface indicated by unit normal vector n can be expressed by formula 22 using a matrix R which indicates the reflection comprised by the X, Y, and Z components of the unit normal vector, so that a point q309 on a straight line (which is the reflection straight line 307) resulting from the reflection of a straight line from the viewpoint o301 which passes through the point p311 and is reflected at the point r305 on mirror 001 can be expressed by formula 23 using the matrix R and the parameter s.

The projection point p'308, which is defined as the intersection point between this reflection straight line 307 and the projection surface 306, represents the projection of point p311 onto projection surface 306 using viewpoint o301 as the center of the projection. In the present invention, the rotation of mirror 001 has the same effect as the rotation about an axis in front of camera 005, so that there is a problem in that, in accordance with the rotation of the mirror 001, differences in viewpoint are generated as a result of the movement of the viewpoint o301. In other words, a point in three-dimensional space is projected to different points in the projection depending on the orientation of mirror 001, so that discontinuities are generated in the shape or the positioning.

Figure 37:
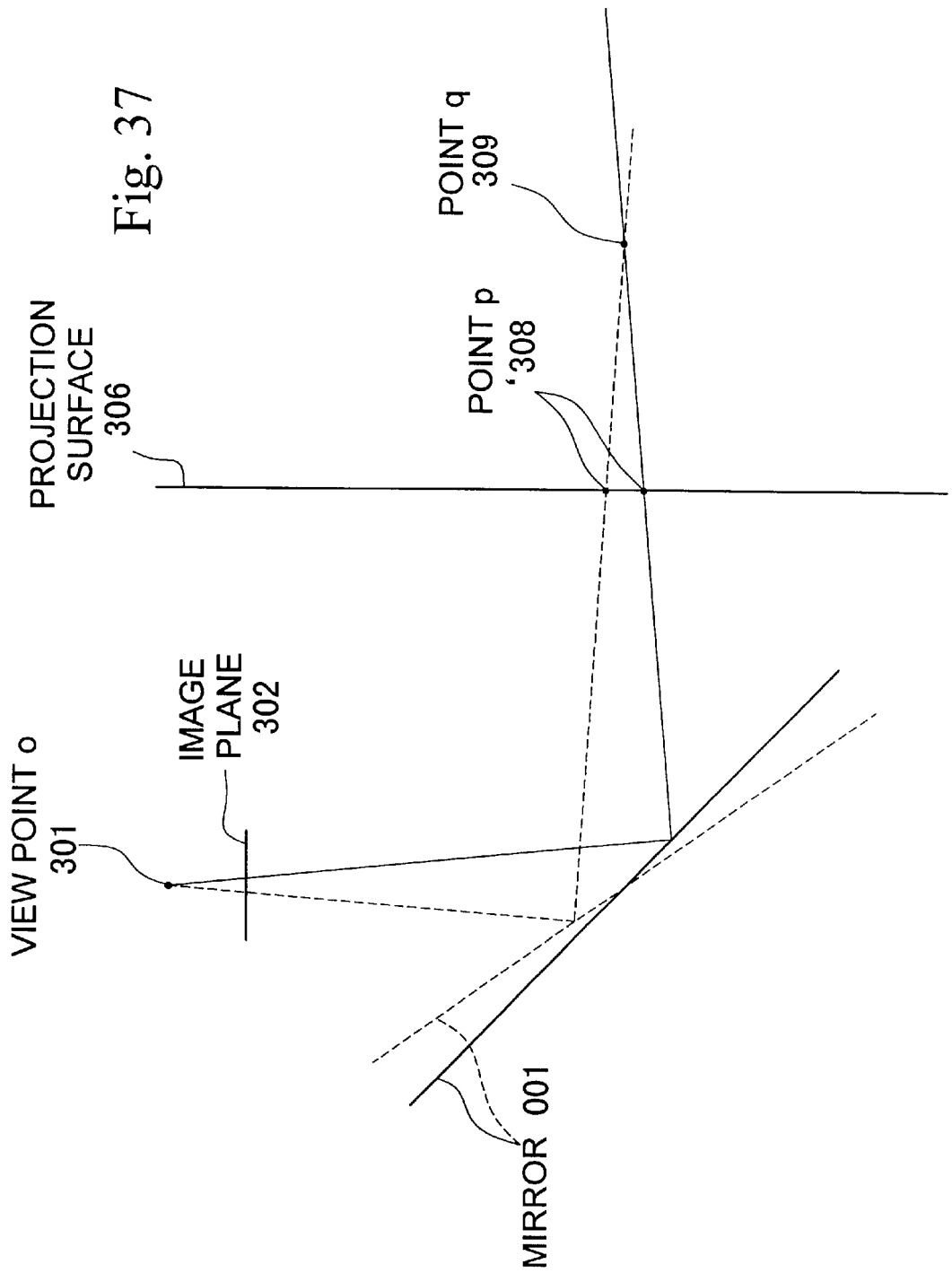
FIG. 37 is a model diagram which serves to explain the state in which differences in viewpoint are produced because the center of rotation of the mirror provided in front of the camera is not in agreement with the center of projection.

FIG. 37 serves to explain the problem of differences in viewpoint; it shows that a point q309 in space is projected to two differing points p'308 on the projection surface by means of the projection method described above when the mirror 001 has differing orientations, as shown by the dashed line and the solid line. This parallax arises because the center of rotation c304 of the mirror 001 and the center of projection onto the projection surface 306 are not in agreement.

In order to solve this problem, in the image input apparatus in accordance with the present invention, in the same manner as the center of rotation of the camera was made the center of projection in the examples of the first and second embodiments, the center of rotation c304 is employed as the center of projection in the image compositing process in the image compositing mechanism 009, and each partial image is thus projected onto projection surface 306.

Figure 36:
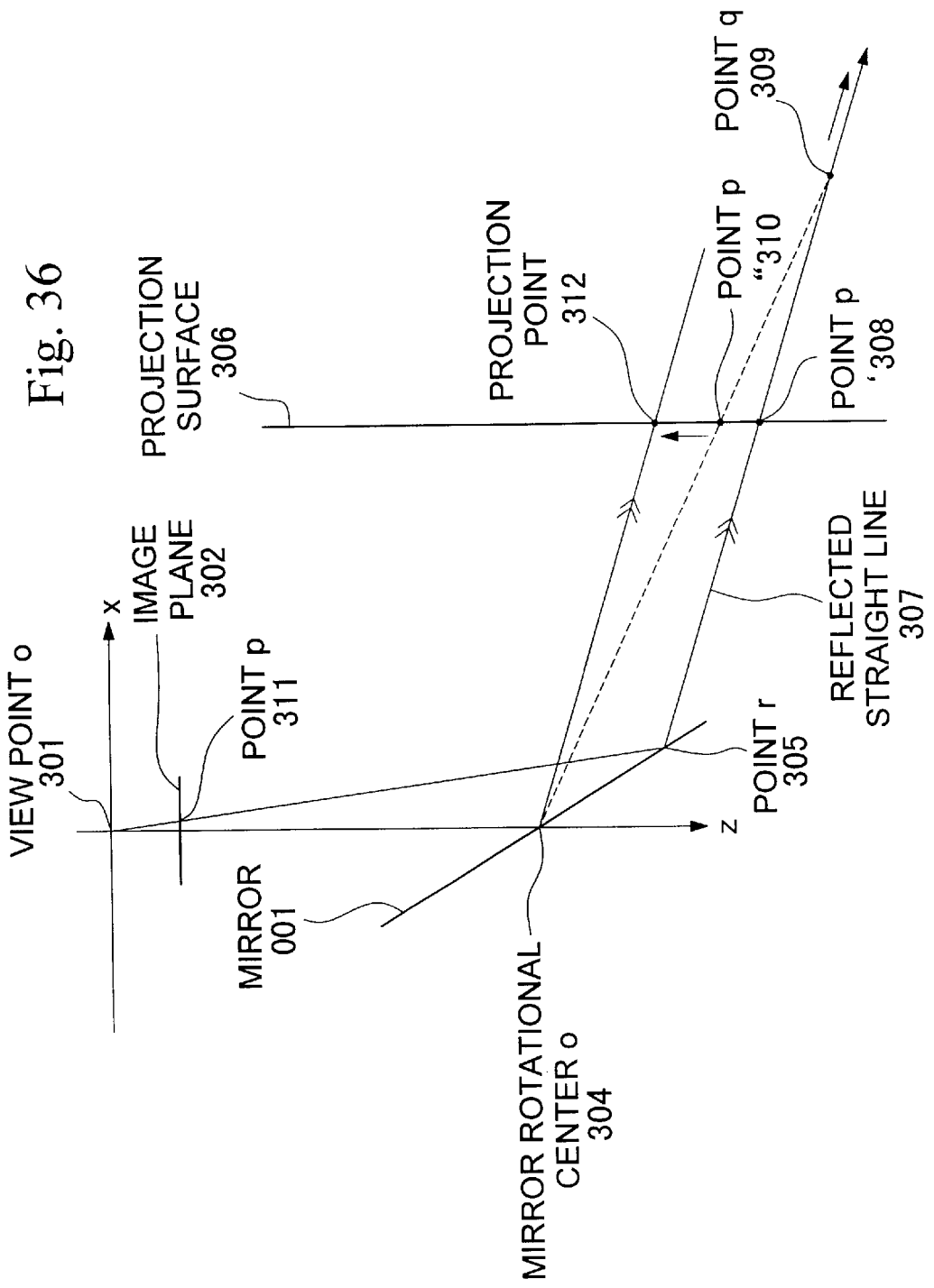
FIG. 36 is a model diagram which serves to explain a projection method in which the rotational center of the mirror is made the center of projection which is applied to an image input apparatus in accordance with an example of the third and fourth embodiments of the present invention.

FIG. 36 serves to explain the projection method which employs the rotational center c304 as the center of projection. A vector from the rotational center c304 to a point q309 on the reflection straight line 307 expressed by formula 23 is given by formula 24, and the straight line which results from an extension of this vector may be described by formula 25 using parameter t.

If the point of intersection p"310 between the projection surface 306 and this straight line is considered, then since the parameter s, which determines the positioning in space of the point q309, is included in formula 25, when the center of rotation c304 is employed as the center of the projection, as shown in FIG. 36, in correspondence with the value of parameter s, that is to say, with the distance of point q309 from point r305, the positioning of the point p"310 changes.

However, when the case is considered in which the point q309 in space becomes distant, or in other words, the value of parameter s becomes large, then the vector connecting the rotational center c304 and the point p"310 gradually approaches the directional vector of the reflection straight line 307, and ultimately, converges in a parallel direction. For example, when the focal length of the lens is 5.5 and the center of rotation is (0,0,30), then convergence essentially occurs at a distance of about 1000 from the reflection point. In other words, when a point which is on the reflection straight line 307 as viewed from the center of rotation c304 is projected onto the projection surface 306, then the point of intersection p'310 converges at the intersection point between the projection surface 306 and a straight line which is parallel to the reflection straight line 307 and which passes through the rotational center c304. This indicates that almost all points in space which lie on the reflection straight line 307 resulting from the reflection by mirror 001 of a straight line connecting the viewpoint o301 and a point p311 in the image plane 302 are projected at that intersection point. From this, it is possible to greatly reduce the problem of differences in viewpoint described above by employing this convergence point as the projection point 312, and it is thus possible to dramatically increase the quality of the composite images obtained.

In step E95, the positional vector of the intersection point between the cylindrical surface having a radius D comprising the projection surface 306 and a straight line which passes through the center of rotation c304 and has a directional vector identical to that of the reflection straight line

307 depicted in formula 23 may be obtained as formula 26 from the points (xj, yj, f) in partial image i, and first, the three-dimensional position (X, Y, Z) of a point 312 on projection surface 306 corresponding to the point p311 in partial image i, is obtained. Furthermore, the position (Xj, Yj) in the composite image in which the projection surface 306 is opened to form a plane which corresponds to a projection point 312 is determined in accordance with formula 7 in the same manner as in the examples of the first and second embodiments. Then, in step E96, each point in partial image i is projected onto the composite image by replacing the pixel values at positions corresponding to the composite image stored in image memory 008 with pixel values of the partial image i. When (Xj, Yj) does not represent integer values, the number to the right of the decimal point may be rounded, as in the examples in the first and second embodiments.

Furthermore, the update timing of the composite image size, and the method thereof, are the same as in the examples in the first and second embodiments.

A determination as to whether the projection processing of all pixels in a partial image i onto the composite image has been completed or not is made by a comparison between J, which indicates the total number of pixels, and the variable j, and when processing of all pixels has been completed, the image compositing processing is terminated (step E93).

After the projection processing onto the composite image of the partial image i in the compositing processing (step E00) has been completed, then display control mechanism 011 reads out the updated composite image from image memory 008, and displays this in display mechanism 012 (step G00), in the same manner as in the examples in the first and second embodiments.

After the display of the updated composite image has been completed, as is the case in the examples of the first and second embodiments, the steps from step A02 onward in FIG. 18 are repeated for the next partial image which is to be acquired. The fact that an example of a function which employs a continuously updated composite image, such as that shown in FIG. 31, may be employed is the same as in the examples of the first and second embodiments.

In the explanation given above, the mirror movement, image acquisition, image compositing, and display processing were conducted in order; however, these may also be conducted in parallel.

Hereinbelow, as a second example of the third embodiment, the case will be explained in detail in which the various processes are conducted in parallel; a comparison with the first example of the third embodiment will be made while referring to the figures.

In the second example of the third embodiment, as well, the parts other than those relating to the processing flow, such as the outward appearance, the structure of each mechanism, the projection surface, and the setting of the coordinate system and the like, are identical to those in the first example of the third embodiment.

Figure 20:
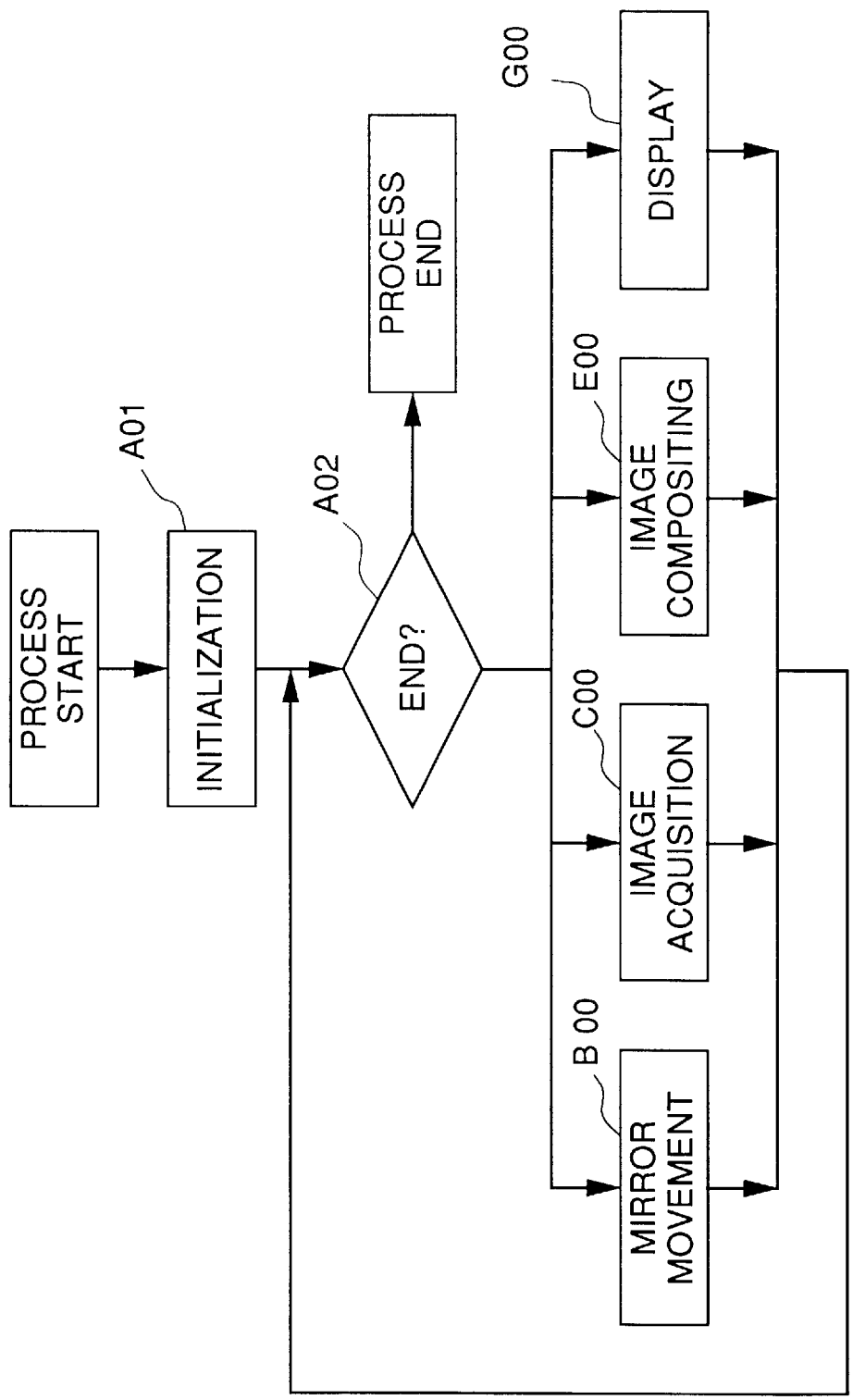
FIG. 20 is a flowchart showing the contents of the image input processing in an image input apparatus in accordance with a second example of the third embodiment of the present invention.

FIG. 20 serves to explain the flow of all the processing in the case in which the processing is conducted in parallel.

In comparison with the flow of the processes in the first example of the third embodiment shown in FIG. 18, the processing shown in FIG. 20 is executed in parallel while synchronizing each process: the mirror movement (step B00), the image acquisition (step C00), the image compositing (step E00), and the display (step G00).

After an initializing process (step A01) and a confirmation of termination process (step A02) identical to those of the first example of the third embodiment have been conducted, each process begins operation.

Figure 21:
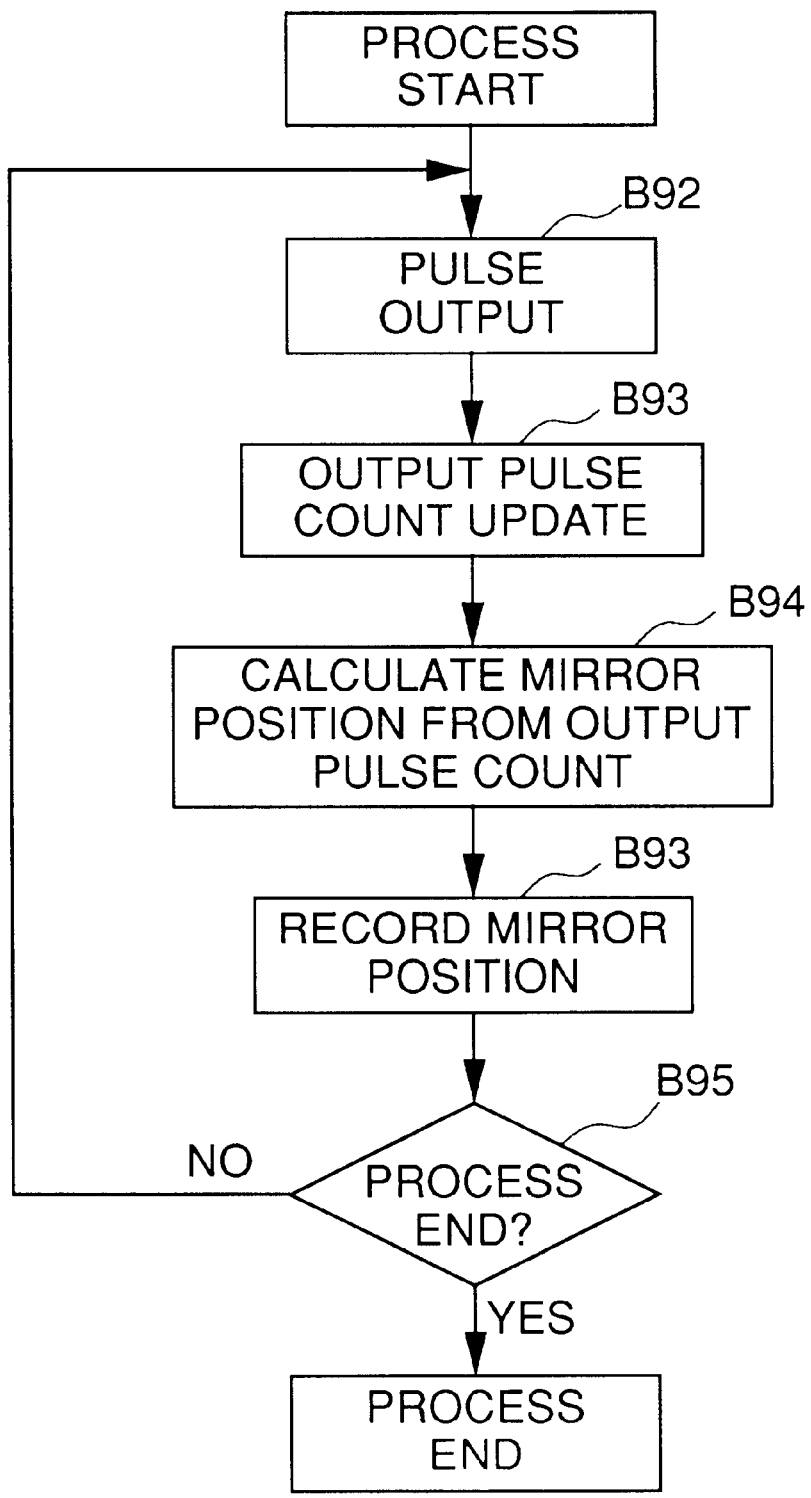
FIG. 21 is a flowchart showing the contents of the mirror movement processing in an image input apparatus in accordance with a second example of the third embodiment of the present invention.

FIG. 21 serves to explain the flow of the processing of the mirror movement process (step B00) in the second example of the third embodiment.

In comparison with the first example, the mirror movement process in the second example does not move the mirror 001 to individual image acquisition positions, but rather, continuously moves the mirror while recording the orientation thereof.

In other words, in the mirror movement process, the processing from pulse output (step B92) to mirror positioning calculation (step B94) is continuously conducted until there is a directive from the termination confirmation process (step A02) in FIG. 20, and the mirror positions obtained are recorded in mirror control mechanism 015 (step B96); this processing is repeated. The image acquisition process (step C00) conducts processing while referring to the mirror positions, as in the examples of the first and second embodiments. Here, angles in the horizontal direction are transmitted as mirror positions; however, any other methods are possible which allow the confirmation of the orientation of the mirror in the image acquisition processing, such as the direct transmission of output pulse counts or the like. Furthermore, it is also possible to transmit rotational amounts not merely in the horizontal direction, but about all axes, as in the examples of the first and second embodiments.

Each process from the pulse output (step B92) to the mirror positioning calculation (step B94) which has the same designation as that in FIG. 19, which is the figure which serves to explain the flow of the processing in the first example of the third embodiment, is an identical process.

When there has been a directive (step B97) from the termination confirmation process (step A02) in FIG. 20, in the same manner as in the first example of the third embodiment, the movement of mirror 001 is halted, and processing terminates.

Figure 22:
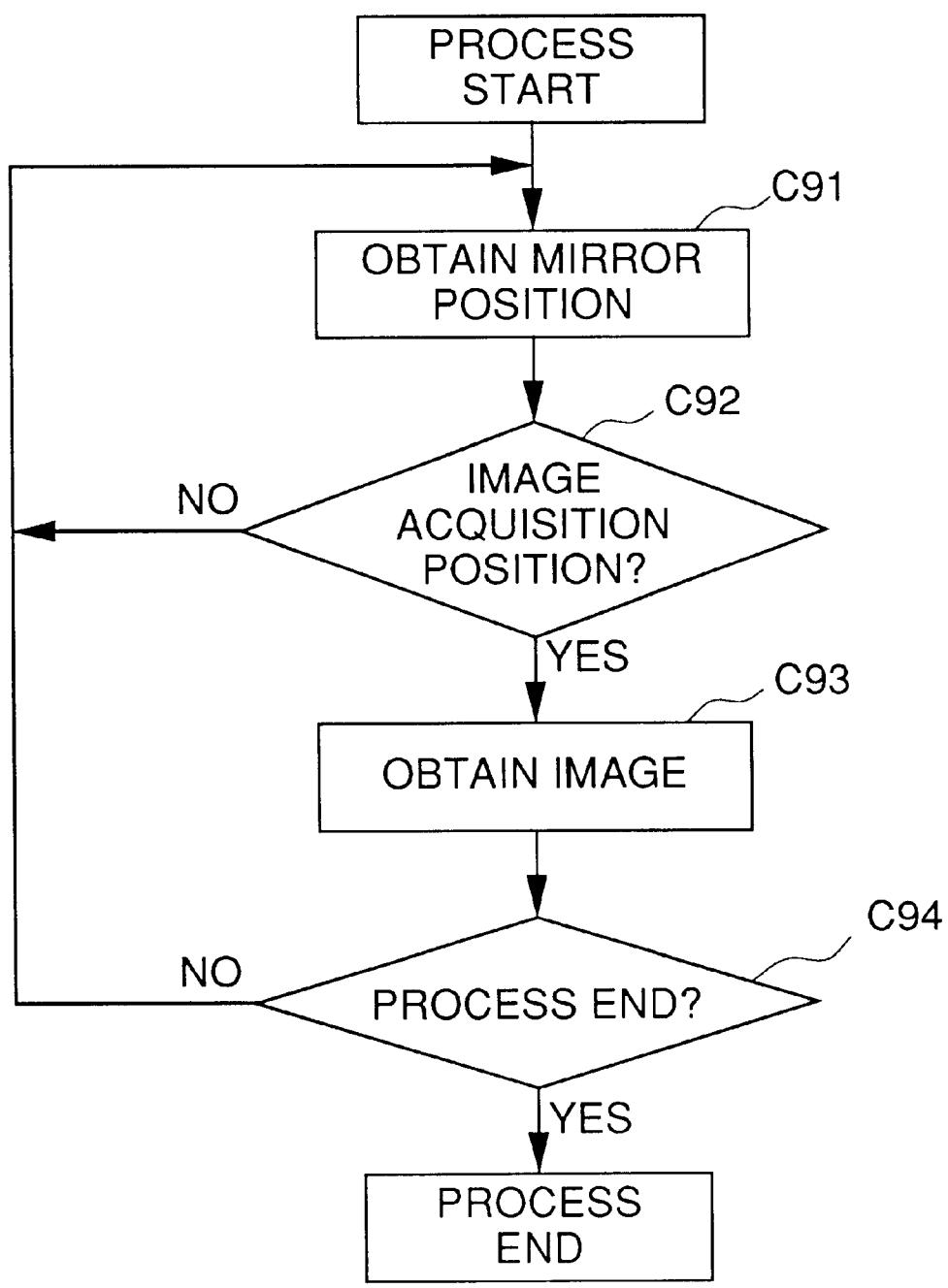
FIG. 22 is a flowchart showing the contents of the image acquisition processing in an image input apparatus in accordance with a second example of the third embodiment of the present invention.

FIG. 22 serves to explain in a detailed fashion the flow of the processing in the image acquisition process (step C00) in the second example of the third embodiment.

The image acquisition processing flow in the present example is the same as the processing flow in FIG. 10, which shows the image acquisition process flow in the second example of the first embodiment; however, whereas in the earlier example the orientation of camera 005 was obtained (step C91), in the present example, the orientation of mirror 001 is obtained (step C95), and since this is the only difference, a detailed explanation thereof will be omitted.

The compositing process flow in the present example is the same as the process flow in FIG. 11, which shows the compositing process flow in the second example of the first embodiment; however, these differ in that, whereas the orientation of camera 005 was employed in the second example of the first embodiment, the orientation of mirror 001 is used in the present example, and in that the projection method in step E04 employs the rotational center c304 of the mirror, as in the processing in the first example of the third embodiment.

In the display process, the display control mechanism 011 reads out the composite image continuously from image memory 008, and displays this in display mechanism 012 (step G00). The fact that, because it is continuously read out and displayed, the updated composite image is immediately displayed in display mechanism 012, and that a portion of the composite image may be selectively displayed in accordance with the directive of a user, or a plurality of users may extract differing parts of the composite image and display them in display mechanism 012; this is the same as in the case of the previous examples.

By making the processing parallel in nature, in comparison with the first example of the third embodiment, in a single flow of processing from image acquisition to the compositing of the image, an advantage is gained in that there is no problem with a delay in a single process having an effect on other processes, thus reducing the operational speed overall.

Next, an example of the fourth embodiment of the image input apparatus in accordance with the present invention will be explained in detail with reference to the figures.

In the third embodiment, the structure was such that there were no differences generated between the positioning at which the acquisition of the partial image was to be carried out and the orientation of the mirror when the partial image was actually acquired. However, when the accuracy of detection of the mirror orientation of the mirror movement mechanism 002 was low, and further, when the delay from the image acquisition directive to the actual acquisition of the partial image was great, there were cases in which large errors were included in the acquisition position of a partial image, and this caused a problem in that the accuracy of the composite image worsened dramatically.

The fourth embodiment of the present invention was created in order to solve this problem of errors contained in the acquisition positions, in the same way as in the second embodiment solves this problem with respect to the first embodiment; in comparison with the third embodiment, it is capable of eliminating errors incorporated in the acquisition positions of each partial image and acquiring a highly precise composite image, by adding a positioning mechanism which applies positioning between partial images.

The present example has an outward appearance identical to that shown in FIG. 33, which serves to explain the structure of an example of the third embodiment; however, in addition to mirror control mechanism 003, image attribute memory 004, image acquisition mechanism 006, image acquisition control mechanism 007, image memory 008, image compositing mechanism 009, and display control mechanism 011, box 101 also contains a positioning mechanism 013, and is connected to the other structural elements by means of cables. In comparison with the first example of the third embodiment, structural elements having the same designations provide the same functions; however, image attribute memory 004 stores data relating to the orientation of the mirror during the acquisition of the partial images as well as positional correction amounts of each partial image which are determined by the positioning mechanism 013. Furthermore, image compositing mechanism 009 uses the acquisition positions of the partial images within image attribute memory 004, as well as the positional correction amounts of the partial images obtained by positioning mechanism 013, and determines the compositing positions.

Figure 23:
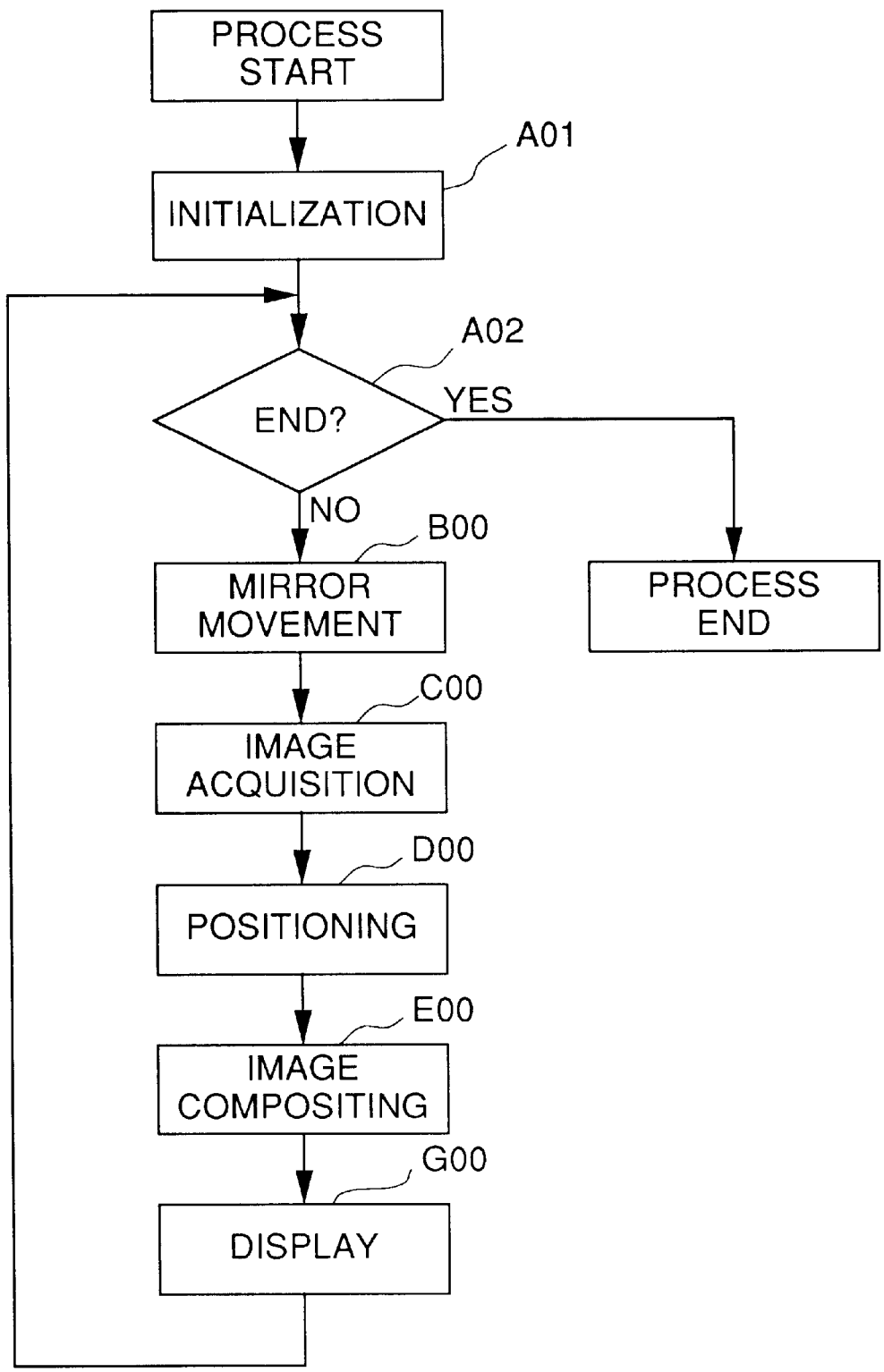
FIG. 23 is a flowchart showing the contents of the image input processing in an image input apparatus in accordance with a first example of the fourth embodiment of the present invention.

FIG. 23 serves to explain the flow of the processing in this example. In FIG. 23, structure elements having the same designation as those in FIG. 18, which serves to explain the flow of the processing in the first example of the third embodiment, provide the same functions. In this example of the fourth embodiment, those parts which are not related to the positioning mechanism 013 and the positioning process (step D00), such as the outward appearance, the structure of each mechanism, the projection surface, the setting of the coordinate system, and the like, are all identical to those in the example of the third embodiment.

In FIG. 23, the initialization (step A01) has added thereto, in comparison with the first example of the third embodiment, a process which initializes the positional correction amount values to 0 when determining the compositing positions of the partial images. The termination confirmation (step A02), the mirror movement (step B00), and the image acquisition (step C00) are identical to those of the first example of the third embodiment.

The flow of the positioning process (step D00) in the present example is the same as the processing flow in FIG. 13 which shows the positioning process flow in an example of the second embodiment; however, the difference is that, whereas the orientation of the camera 005 was employed in the example of the second embodiment, in the present example, the orientation of the mirror 001 is employed.

Using the results of the positioning in step D00, image compositing mechanism 009 projects each partial image onto the composite image while reducing the effects of differences in viewpoint contained in the partial images in the same manner as in the example of the third embodiment (step E00). In the present example, the only point which differs in step E02 from FIG. 7, which serves to explain the flow of the processing in the compositing process in the first example of the third embodiment, is that the compositing position of the partial images is determined using the orientation data of the mirror 001 during the acquisition of the partial images stored in the image attribute memory 004 and the compositing positional correction amount determined by the positioning mechanism 013; the remainder of the projection method is identical to that in the first example of the third embodiment.

In this way, the errors incorporated in the acquisition position of a partial image i are corrected by the positioning mechanism 013, and it becomes possible to produce a highly accurate composite image.

In the fourth embodiment, as well, as in the third embodiment, it is possible to execute each process in parallel, and at this time, the positioning in step D00 has a processing flow which is the same as that shown in FIG. 15, which shows the positioning process flow in an example of the second embodiment; however, there is a difference in that, whereas the orientation of the camera 005 is employed in the example of the second embodiment, the orientation of the mirror 001 is employed in the present embodiment.

Figure 24:
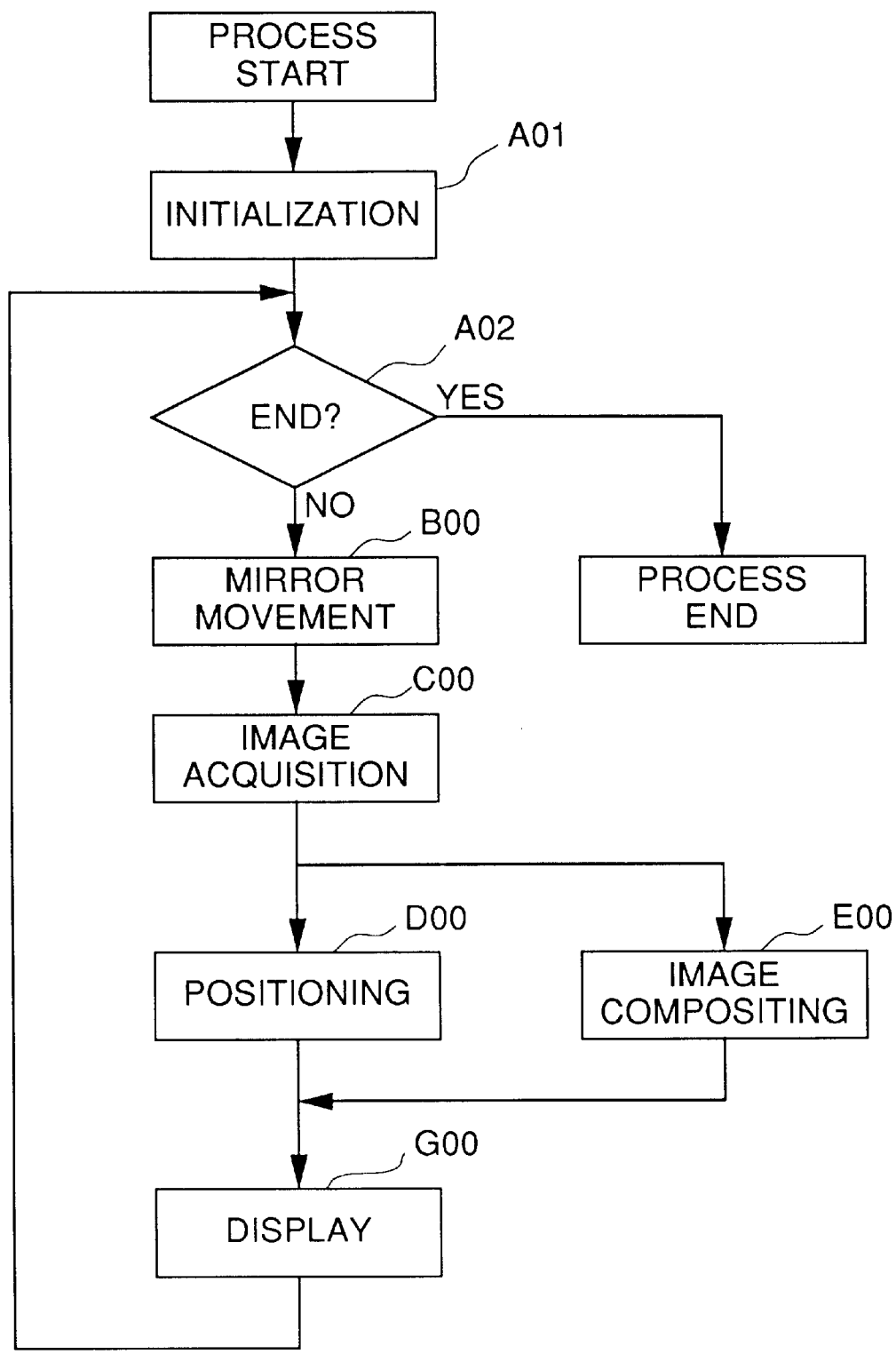
FIG. 24 is a flowchart showing the contents of the image input processing in an image input apparatus in accordance with a second example of the fourth embodiment of the present invention.

Furthermore, as in the example of the second embodiment, when the acquisition of partial images and image compositing are carried out continuously and with respect to the same target position, it is thought that the errors contained in the acquisition positions of each partial image become stabilized, so that when image acquisition and composition are continuously carried out, it is thought that the positional correction amount corresponding to a partial image i determined at a certain point in time may be employed with a high degree of accuracy at the time of acquisition of the subsequent partial image i. Using this fact, in the first example of the fourth embodiment, as shown in FIG. 24, the positioning process (step D00) and the compositing process (step E00) may be executed in parallel. FIG. 24 shows a process flow which is the same as that in FIG. 14, which shows the process flow in an example of the second embodiment; however, there are differences in that it is not the camera 005, but rather the mirror 001 which moves (step B'00), and the data used in each process refer not to the orientation of camera 005 but rather to that of mirror 001.

Furthermore, in the image compositing process in the examples of the third and fourth embodiments described above, a method was described in which a partial image i was projected onto a composite image; however, it is also possible, as in the examples of the first and second embodiments, to determine the pixel values of the points in the composite image by projecting the points in the composite image onto an image plane.

The flow of the image compositing process at this time is shown in FIGS. 16 and 17, as in the examples of the first and second embodiments. FIG. 17 shows the case in which the image compositing process is conducted in parallel with the other processes.

The processes in this image compositing process differ from that used in the examples of the first and second embodiments only in that, whereas the orientation of camera 005 was used in the examples of the first and second embodiments, the orientation of mirror 001 is employed in the present example, and in that the calculations performed when the position (xk, yk) in the partial image is determined from the position (Xk, Yk) in the composite image differ. Hereinbelow, the calculation method employed in the case in which pixel values are determined for points in the composite image by projecting points in the composite image onto the image surface, in the examples of the third and fourth embodiments, will be explained.

As in the examples of the first and second embodiments, the three-dimensional coordinates (X, Y, Z) of the projection point 312 on the projection surface 306 can be expressed by formula 27 from the point (Xk, Yk) in the composite image.

A point in the partial image i corresponding to this projection point 312 is determined as the intersection point between the image plane 302 and a straight line, which is parallel to a straight line passing through the projection point 312 and the rotational center c304 of the mirror, and which passes through the viewpoint o301 when reflected by mirror 001.

The directional vector of the straight line passing through the projection point 312 and the rotational center 304 of the mirror is given by formula 28, and the directional vector of the straight line reflected by mirror 001 can be written as formula 29 using the matrix R, which indicates reflection.

The straight line having this directional vector and passing through the viewpoint o301, that is to say, through the origin, is as formula 30 using parameter s.

The coordinates (x, y, z) of the intersection point p311 with the image plane 302 are determined as the point, among the points on this straight line, having a Z component which agrees with the focal length f, and the X component and Y component at this time are the position (xk, yk) of the point in the partial image i. That is to say, this can be expressed by formula 31.

The method for determining the pixel values in the composite image from the position (xk, yk) determined is the same as in the examples of the first and second embodiments, so that the details thereof will be omitted here.

The fact that, in the case in which the corresponding point in a partial image is determined from the point in the composite image in this way, the blank pixels which occur as a result of rounding errors in the coordinates are not produced in the composite image, is the same as in the examples of the first and second embodiments. Furthermore, the determining of an enlargement or reduction ratio so that the composite image size determined by calculation fits within an indicated size, and the application of this ratio to the coordinate system of the composite image, may also employ the image projection method described above. Furthermore, the possibility of executing this process in parallel with other processes is also the same as in the examples of the first and second embodiments.

FIGS. 40A and 40B are an example of the fourth embodiment; it shows an example of an image in which the pixel values in a composite image are determined by co-linear interpolation from corresponding points in a partial image.

FIG. 40A shows the state of a composite image obtained in the image compositing processing, while FIG. 40B shows the state in which the central portion of the composite image was extracted and displayed in a display device.

Figure 38:
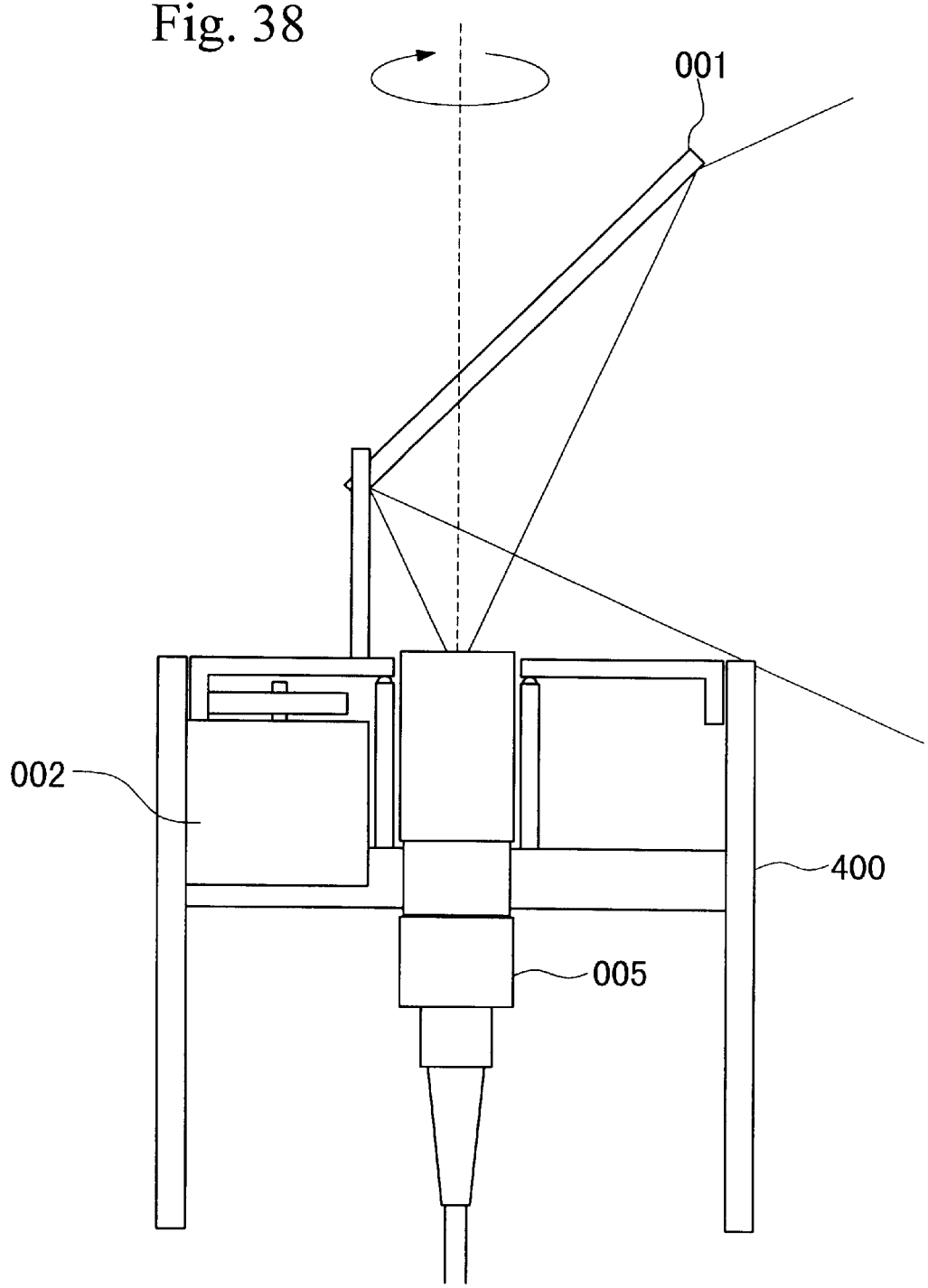
FIG. 38 is a cross sectional view showing another structural example of an image input apparatus in accordance with an example of the third and fourth embodiments of the present invention.
Figure 39:
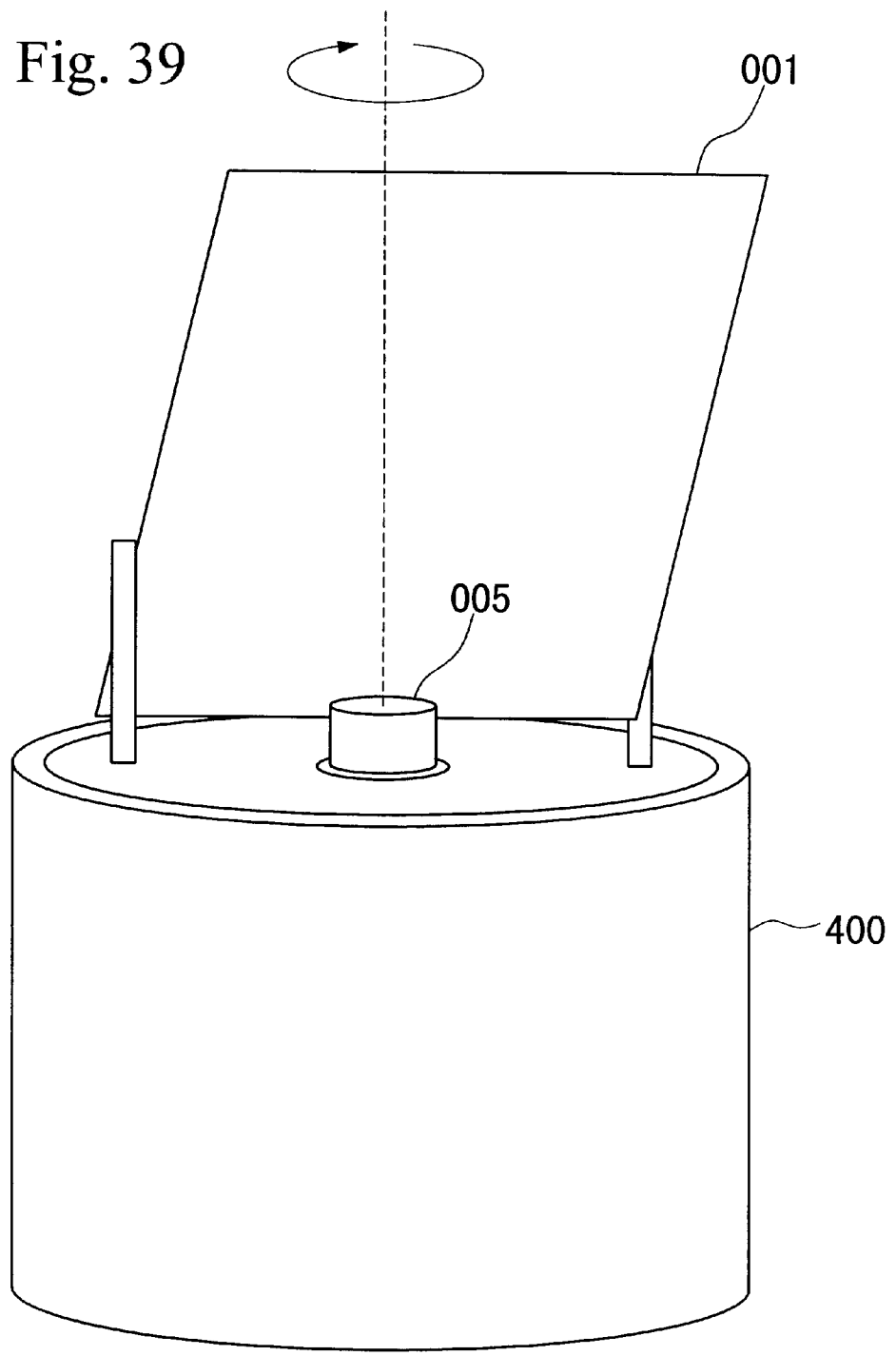
FIG. 39 is an explanatory diagram showing the outer appearance of the image input apparatus shown in FIG. 38.

Furthermore, in the examples of the third and fourth embodiments, as shown in FIG. 33, the explanation dealt with a case in which the camera 005 was disposed above and the mirror 001 was disposed below; however, the present invention is not necessarily so limited. FIGS. 38 and 39 show another example in which the camera 005 is disposed below and the mirror 001 is disposed above. FIG. 39 shows the outward appearance, while FIG. 38 shows a cross-sectional view. When this type of structure is employed, it is possible to prevent the entry of the support pillar 400 which supports camera 005 into the view field by placing the mirror support jigs which are a structural element of the mirror movement mechanism 002 on both sides of the mirror so that the jigs are not reflected in the partial images.

Furthermore, in this example of the fourth embodiment, the mirror detection mechanism 002 was made to detect the orientation of the mirror 001 during the acquisition of partial images; however, if the positioning mechanism 013 is a structural element, then it is possible to omit the detection mechanism for the orientation of the mirror 001 by appropriately setting the existing range for θ.

Furthermore, in the examples of each embodiment described above, the video camera was treated as though it had a fixed focal length; however, the present invention may easily be employed even in cases in which the focal length is variable as a result of a zoom lens or the like, by providing a mechanism for transmitting the current focal length to the apparatus.

Furthermore, in the examples of the embodiments described above, the optical system of the camera 005 was explained as a simple pin hole model, which was free from peripheral darkening or distortions and aberrations; however, the present invention may be employed using cameras which produce distortions arising in the optical system in this way by adding a mechanism for correcting such distortions to the image acquisition control mechanism 007. Measurement techniques for such camera parameters are introduced in detail in Deguchi, "Recent Trends in Camera Calibration Methods", Seishokempo Vol. 93, No. 25, CV82-1, 1993, and a discussion thereof will be omitted.

In each example, the camera 005 or the mirror 001 was automatically moved by means of a camera movement mechanism 014 or a mirror movement mechanism 002, spectively; however, this may be simplified and the user may move camera 005 or mirror 001 manually.

Figure 41:
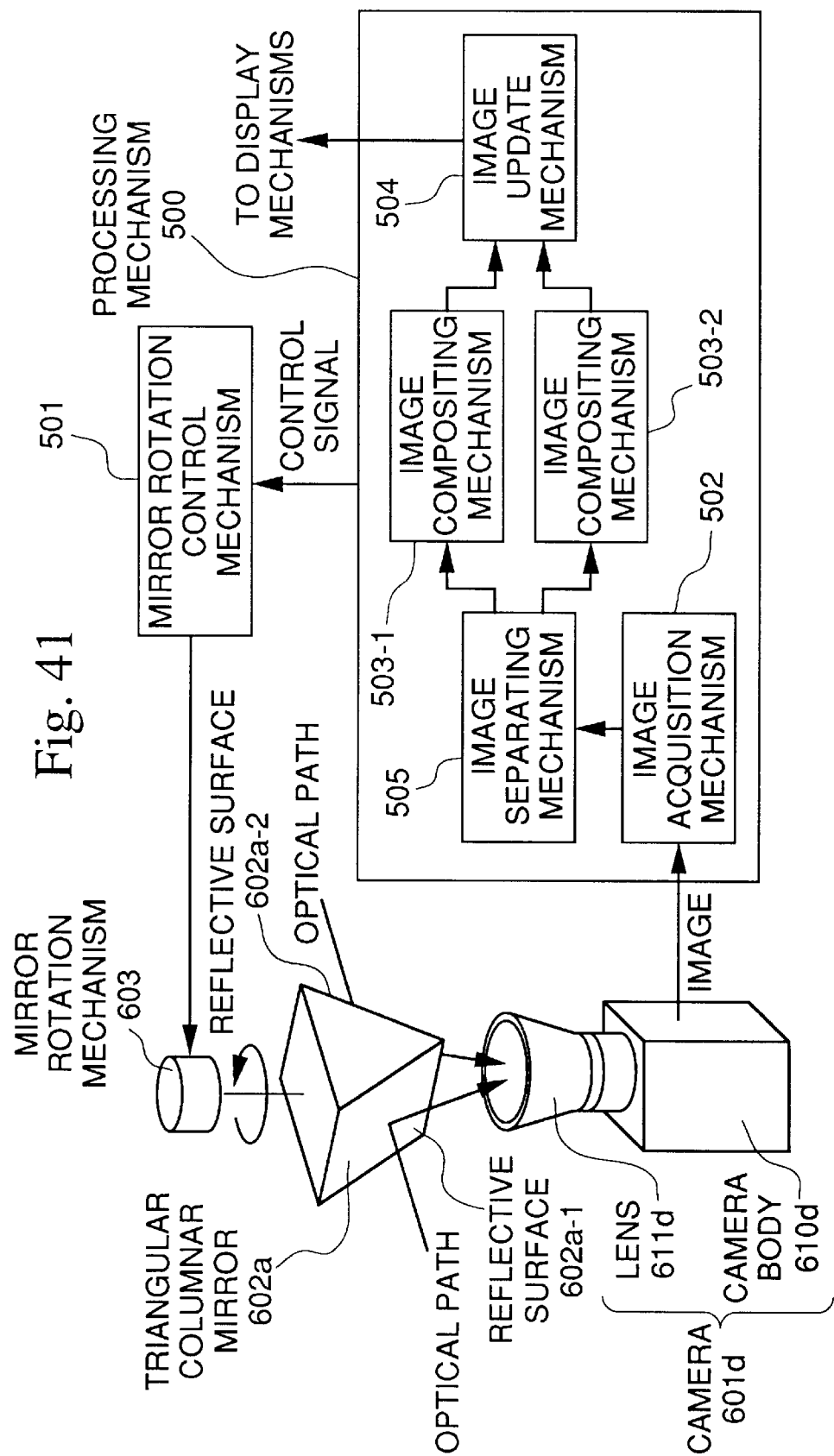
FIG. 41 is a block diagram showing the structure containing a mechanism part of an image input apparatus in accordance with the fifth embodiment of the present invention.
Figure 42:
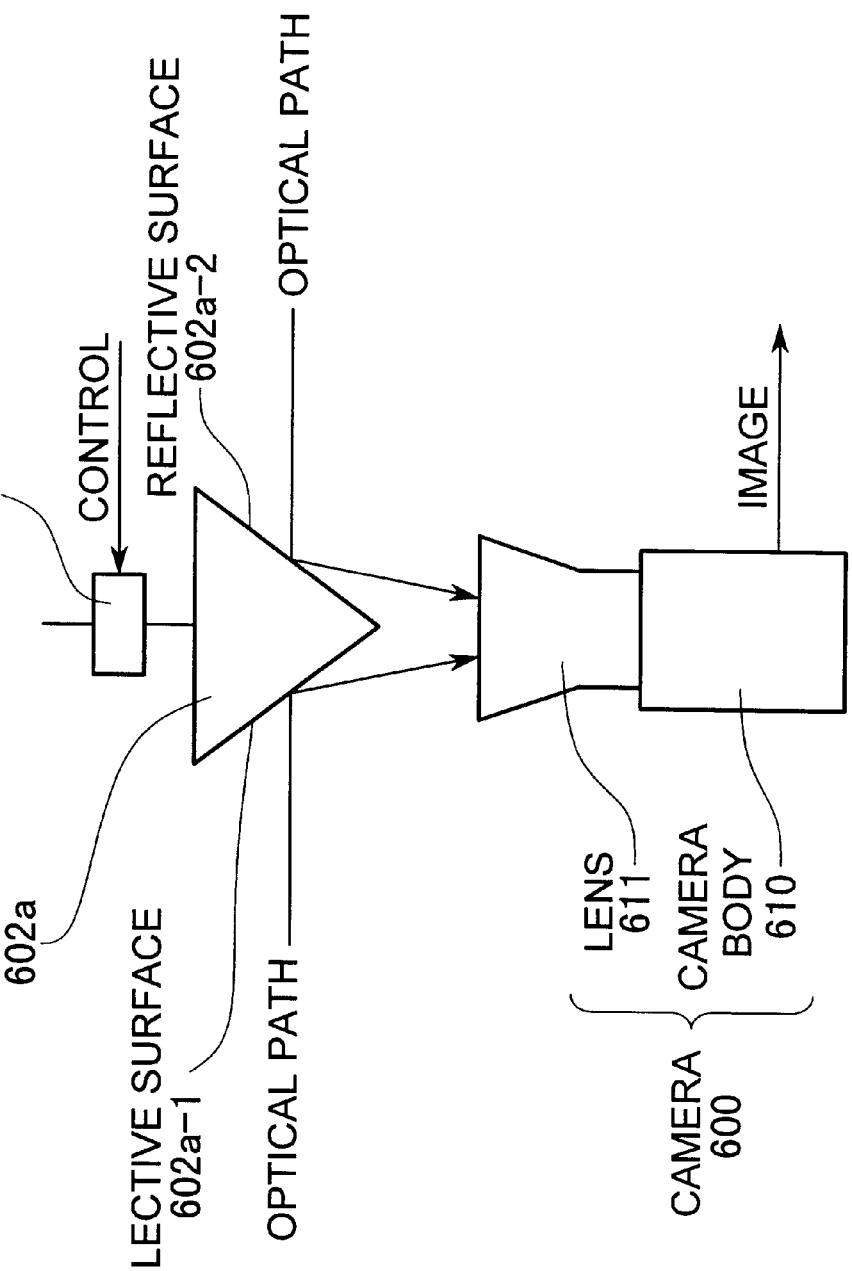
FIG. 42 is an explanatory diagram showing a side view of the mechanism part of the image input apparatus shown in FIG. 41.

Next, the structure of an image input apparatus in accordance with a fifth embodiment of the present invention is shown in FIGS. 41 and 42. FIG. 41 shows the entire structure, including the mechanism part of the image input apparatus, while FIG. 42 shows a side view of the mechanism part in FIG. 41. In these figures, the image input apparatus in accordance with this embodiment comprises a mechanism part and a control part, and concretely, the mechanism part comprises a camera 600 which photographs a field to be photographed and comprises a camera body 610 and a camera lens 611; a triangular columnar mirror 602a, which has two reflective side surfaces 602a-1 and 602a-2 and which is disposed in front of camera 600 so as to modify the optical path of light reflected from the field to be photographed in the direction of the camera lens 611 of the camera 600; and a mirror rotation mechanism 603, which rotates the triangular columnar mirror 602a about the optical axis of camera 600. Camera 600 and mirror 602a correspond to camera 005 and mirror 001 of the image input apparatus in accordance with the fourth embodiment which is depicted in FIG. 4, and mirror rotation mechanism 603 corresponds to the mirror movement mechanism 002 in the image input apparatus in accordance with the fourth embodiment shown in FIG. 4.

Furthermore, the control part comprises a processing mechanism 500, which composites the plurality of images inputted from the camera in accordance with the rotation of the triangular columnar mirrors 602*a* and forms a wide view angle image, and a mirror rotation control mechanism 501, which controls mirror rotation mechanism 603 in accordance with control signals from processing mechanism 500. The mirror rotation control mechanism 501 corresponds to the mirror control mechanism 003 of the image input apparatus in accordance with the fourth embodiment shown in FIG. 4.

Processing mechanism 500 is provided with an image acquisition mechanism 502 which acquires and processes images acquired by camera 600, an image separation mechanism 505, which separates the images obtained by photographing the light from the reflective surface 602*a*-1 from the images obtained by photographing the light from the reflective surface 602*a*-2, thus separating the images processed by image acquisition mechanism 502, image compositing mechanisms 503-1 and 503-2 which independently conduct the compositing processing of the images separated by image separating mechanism 505, and an image update mechanism 504, which updates the composite image by combining the images composited by image compositing mechanisms 503-1 and 503-2 so that the respective updated portions thereof are reflected in the wide-viewfield image. The image compositing mechanism 503-1 corresponds to the first image compositing mechanism, while image compositing mechanism 503-2 corresponds to the second image compositing mechanism of the present invention.

Image acquisition mechanism 502 corresponds to the image acquisition mechanism 006 and the image acquisition control mechanism 007 of the image input mechanism in accordance with the fourth embodiment depicted in FIG. 4. Image compositing mechanisms 503-1 and 503-2 correspond to the image compositing mechanism 009 of the image input apparatus in accordance with the fourth embodiment shown in FIG. 4.

The operation of the image input apparatus in accordance with this fifth embodiment of the present invention having the structure described above will now be explained. In the structure described above, processing mechanism 500 controls the mirror rotation mechanism 603 via mirror rotation control mechanism 501, and thus controls the rotation of the triangular columnar mirror 602*a*.

The processing mechanism 500 is capable of freely setting the rotational speed of the triangular columnar mirror 602*a*; however, this speed is normally controlled so that the mirror rotates at a constant speed. The reflected light from the field to be photographed enters into the camera 600 after the optical path thereof is modified by the reflective surfaces 602*a*-1 and 601*a*-2 of the triangular mirror, and as a result of the mirror, the camera 600 acquires images of the field to be photographed, and those image signals are sent from the camera body 610 to the image acquisition mechanism 502.

The image acquisition mechanism 502 acquires and processes images in order from the camera body 610 while the triangular columnar mirror 602*a* is rotated. When the triangular mirror 602*a* rotates at a constant speed, and images are acquired at fixed intervals, then it is possible to acquire images of the field to be photographed which surrounds the image input apparatus at fixed intervals.

The images acquired by image acquisition mechanism 502 comprise a mixture of images obtained by photographing light reflected from reflective surface 602*a*-1 of triangular columnar mirror 602*a*, and images obtained by photographing light reflected from reflective surface 602*a*-2.

The image separation mechanism 505 separates the images acquired and processed by the image acquisition mechanism 502 in accordance with the reflective surfaces 602*a*-1 and 602*a*-2 of the triangular columnar mirror, and sends the separated images, respectively, to the image compositing mechanism 503-1 and the image compositing mechanism 503-2.

In image compositing mechanisms 503-1 and 503-2, the compositing of the images is independently conducted, and the results of this composition are sent to the image update mechanism 504.

In image update mechanism 504, the wide-viewfield image is updated in order by overlaying updated portions from the images sent from image compositing mechanisms 503-1 and 503-2 onto the wide-viewfield image, and this image is then displayed in a display device which is not depicted in the figure.

The compositing processing in image compositing mechanisms 503-1 and 503-2 is identical to the compositing processing in the first through fourth embodiments in the present invention.

Figure 43:
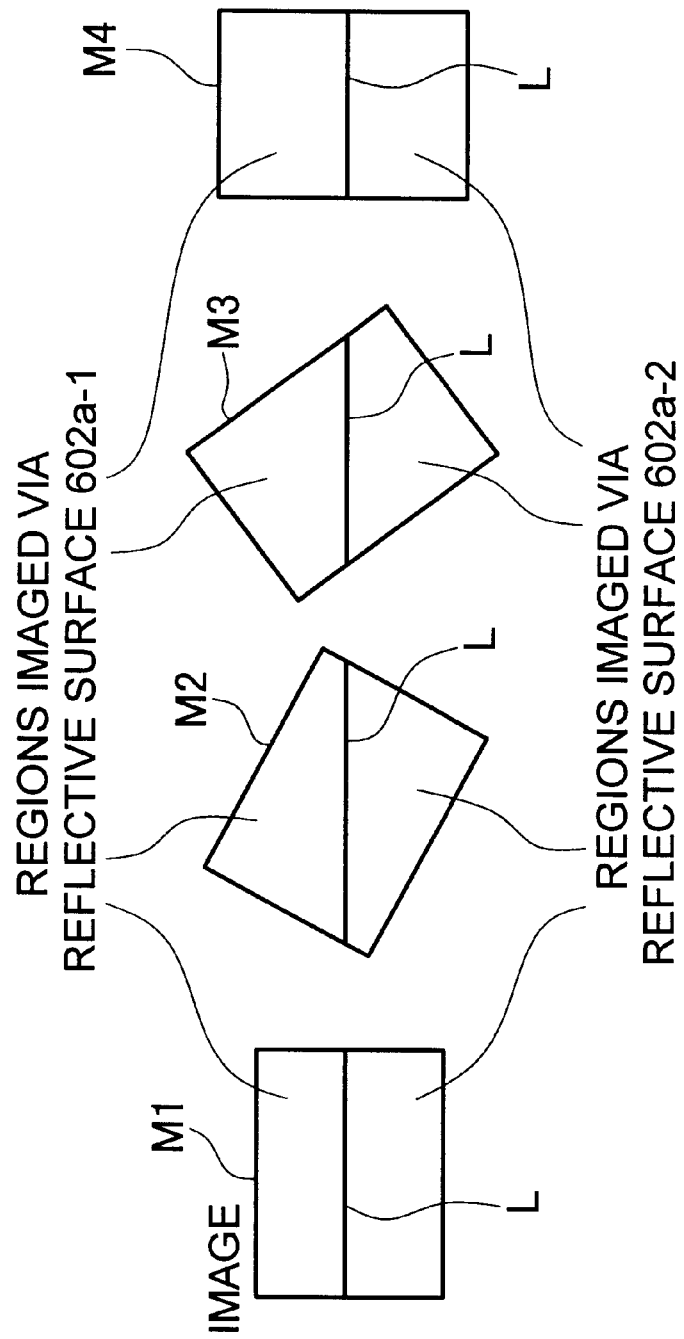
FIG. 43 is an explanatory diagram showing an example of an image acquired by the camera in the image input apparatus shown in FIG. 41.

FIG. 43 shows the example of images M1, M2, M3, M4, . . . which are acquired by camera 600 in the image input apparatus shown in FIG. 41 and are in a state in which they are rotated so that they are aligned in the vertical direction.

As shown in FIG. 43, the positioning of the limit line L in each image region acquired via two reflective surfaces 602*a*-1 and 602*a*-2 of the triangular columnar mirror 602-*a* is determined by the reference angle of the triangular columnar mirror 602*a* with respect to the optical axis of the camera lens 611 of the camera 600. The image separation mechanism 505 separates the images obtained into two in accordance with this limit line L. The separated images can be regarded as two partial images, the mirror angles of which at the time of acquisition differ by 180°, so that these images are independently composited in image compositing mechanisms 503-1 and 503-2 by processing which is the same as that of the image compositing processing in the first through fourth embodiments of the present invention.

Figure 44:
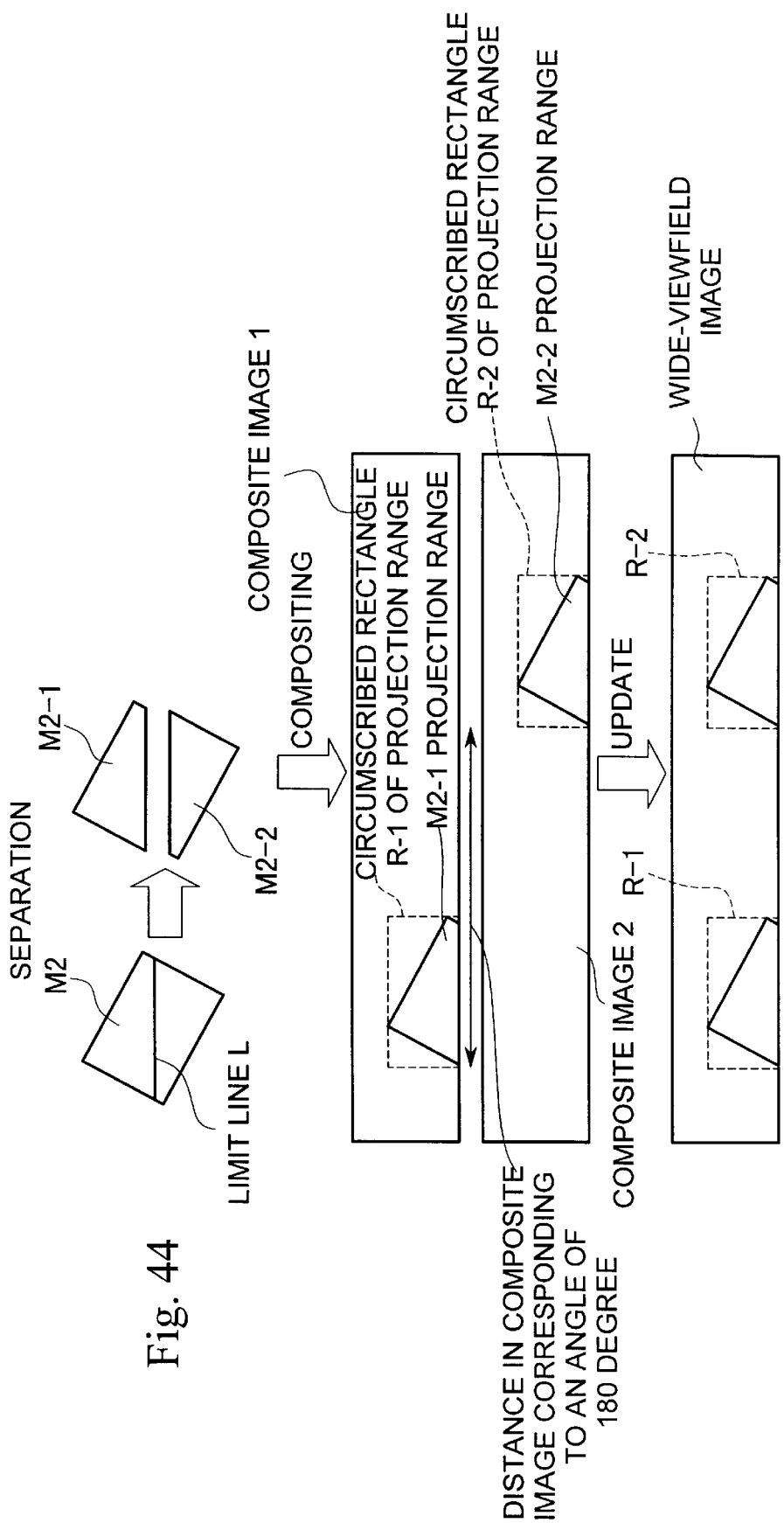
FIG. 44 is an explanatory diagram showing the processing from image acquisition to the update of the wide-viewfield image by an image input apparatus in accordance with the fifth embodiment of the present invention.

Image update mechanism 504 updates the wide-viewfield image by removing, among the composite images generated by image compositing mechanisms 503-1 and 503-2, only that part in which the acquired images are reflected, and overlaying this on the corresponding part of the wide-viewfield image. The portion which is reflected by the image obtained may be easily determined as a circumscribed rectangle of a region in which the pixels of images after separation are projected onto a composite image. Furthermore, FIG. 44 serves to explain the state in which image M2 in FIG. 43 is composited in the wide-viewfield image. In FIG. 44, image M2 is divided into an image M2-1 which was acquired via the reflective surface 602*a*-1 of the triangular columnar mirror 602*a*, and an image M2-2 which was acquired via reflective surface 602*a*-2, and then these are independently composited on composite image 1 and composite image 2. At this time, the compositing positions of these differs by 180°. Image update mechanism 504 extracts the circumscribed rectangular regions R-1 and R-2 of the parts updated in composite image 1 and composite image 2, and overwrites these, thus updating the wide-viewfield image.

In the above manner, in this embodiment, in the individually acquired images, an object to be photographed in a certain direction as viewed from the camera may be photographed simultaneously with an object which is in a direction different by 180° from the first direction. Accordingly, it is possible to obtain wide-viewfield images which span a full 360° by rotating the triangular columnar mirror 602a by only 180°. In other words, when the triangular columnar mirror 602a is rotated by 360°, the wide-viewfield image is updated twice. In other words, in comparison with the image input apparatus in accordance with the fourth embodiment of the present invention, the frame rate of wide-viewfield image entry can be doubled. Here, the case was discussed in which two independent image compositing mechanisms were present; however, if it is not necessary to conduct the compositing processes in parallel, it is possible to employ the image compositing mechanism used in the first through fourth embodiments of the present invention so as to process the images in order after separation.

In accordance with the image input apparatus in accordance with the fifth embodiment of the present invention described above, it is possible to simultaneously composite images taken in two directions by a camera using a triangular columnar mirror, and to conduct updating, and thereby, the amount of time required for a single rotation of the mirror about the optical axis of the camera is halved, and it is possible in that time to conduct a single update of the full 360° scope of the wide-viewfield image.

Figure 45:
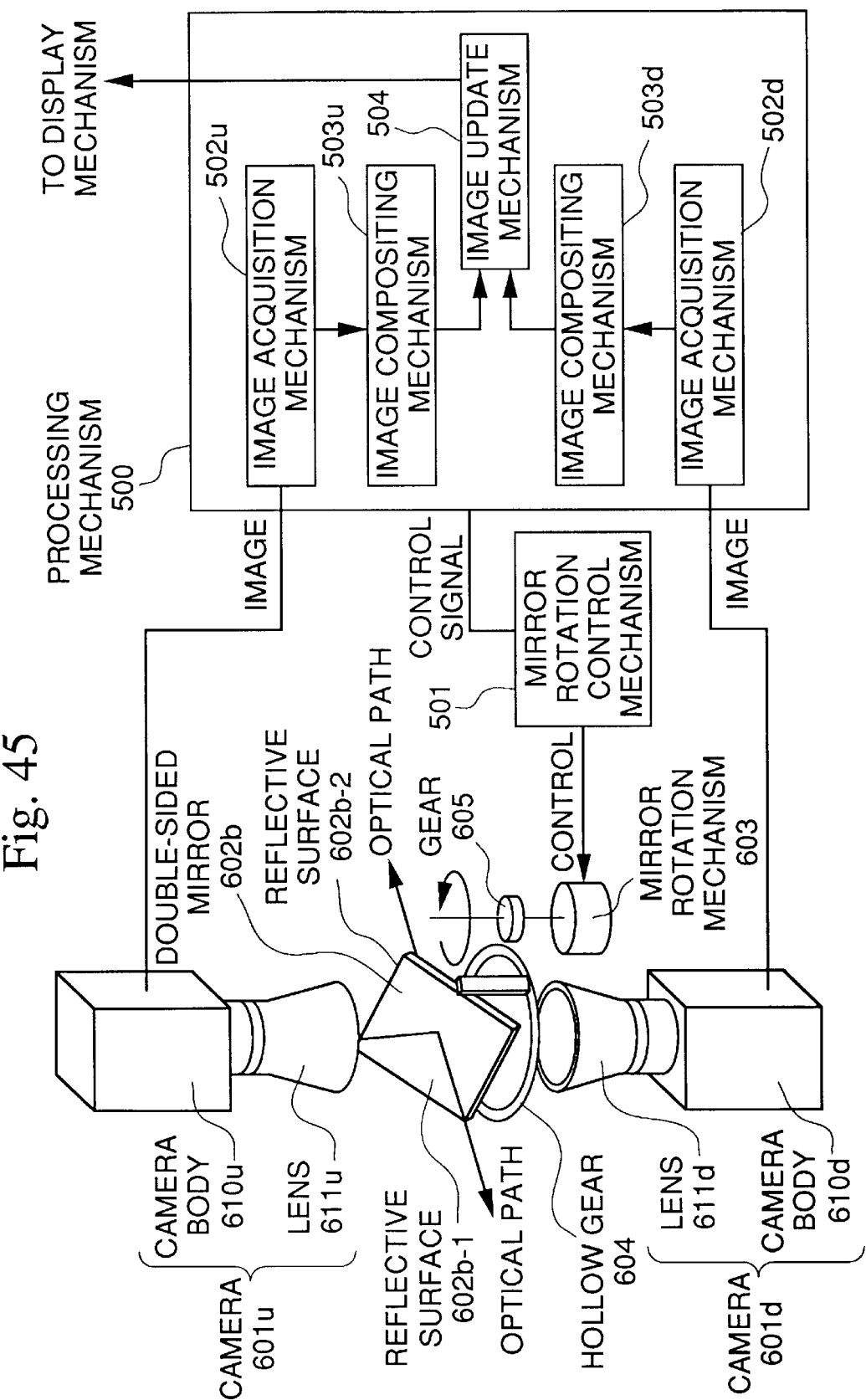
FIG. 45 is a block diagram showing the structure of the image input apparatus including the mechanical portions in accordance with the sixth embodiment of the present invention.
Figure 46:
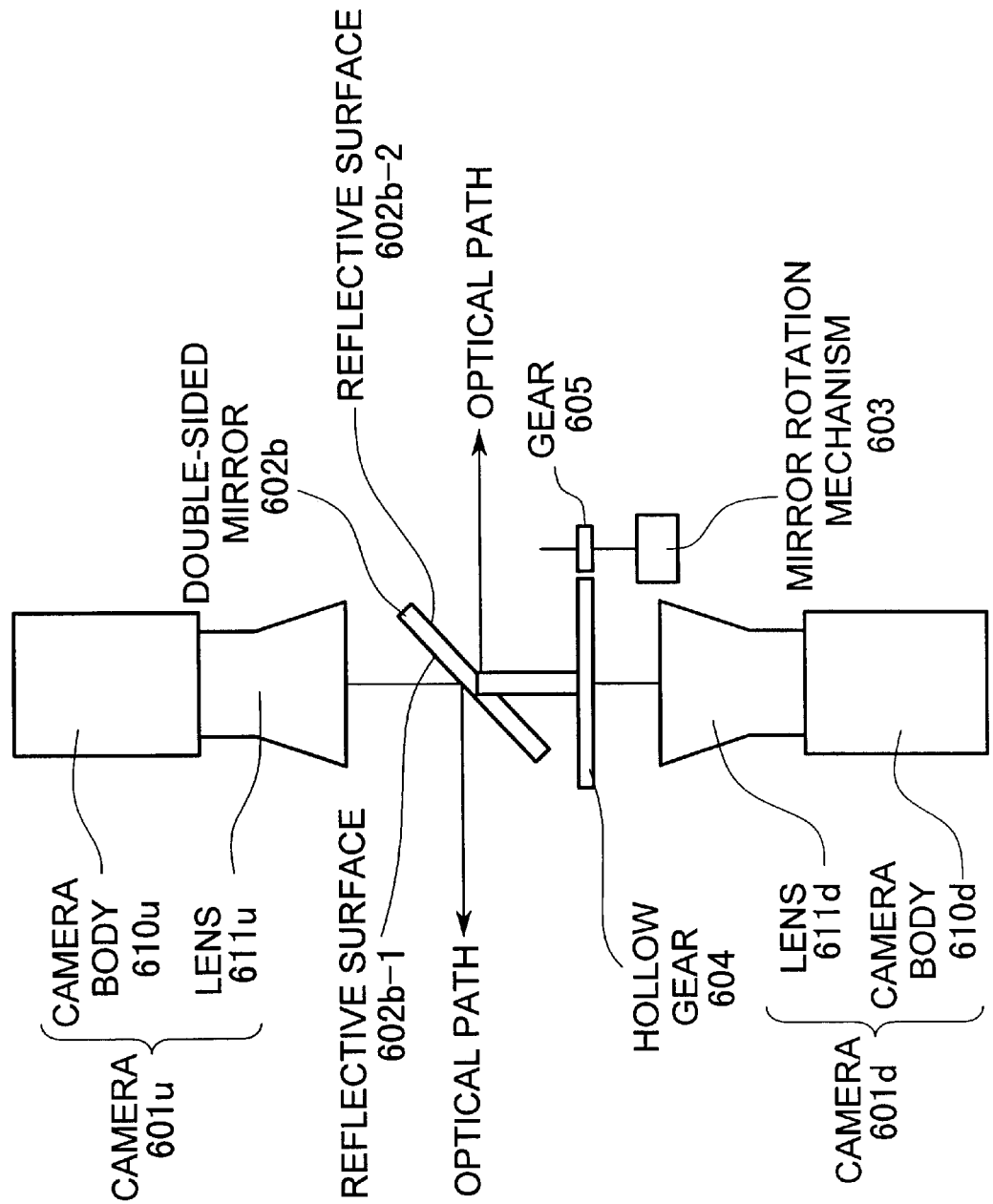
FIG. 46 is a diagram showing the side view of the mechanical portion of the image input apparatus shown in FIG. 45.

Next, the structure of the image input apparatus in accordance with a sixth embodiment of the present invention will be shown in FIGS. 45 and 46. FIG. 45 shows the entirety of the structure of the image input apparatus, including the mechanism part, while FIG. 46 shows a side view of the mechanism part shown in FIG. 45. In these figures, the image input apparatus in accordance with this embodiment comprises a mechanism part and a control part, and concretely, the mechanism part comprises a camera 601u comprising a camera body 610u and a camera lens 611u; a camera 601d comprising a camera body 610d and a camera lens 611d which is positioned in opposition to camera 601u so that the optical axes of the camera lenses thereof are in agreement; a double-sided mirror 602b, which is positioned between camera 601u and camera 601d, has reflective sides 602b-1 and 602b-2, and which alters the optical path of light reflected from the field to be photographed in the direction of the camera lenses of cameras 601u and 601d; a mirror rotation mechanism 603, which rotates the double-sided mirror 602b about the optical axis of cameras 601u and 601d; a hollow gear 604 which supports the double-sided mirror 602b so as to transmit the rotation of mirror rotation mechanism 603 to the double-sided mirror 602b; and a gear 605. Camera 601u corresponds to the first camera of the present invention, while camera 601d corresponds to the second camera of the present invention.

Double-sided mirror 602b corresponds to the mirror 001 of the image input apparatus in accordance with the fourth embodiment of the present invention depicted in FIG. 4, while mirror rotation mechanism 603 corresponds to the mirror movement mechanism 002 of FIG. 4.

Furthermore, the control part comprises a control mechanism 500, which composites a plurality of images inputted by cameras 601u and 601d in accordance with the rotation of the mirror and synthesizes a wide-view angle image; and a mirror rotation control mechanism 501, which controls the mirror rotation mechanism 603 in accordance with control signals outputted by the processing mechanism 500.

The processing mechanism 500 comprises an image acquisition mechanism 502u, which acquires and processes images acquired by camera 601u; an image compositing mechanism 503u, which conducts compositing processing on the images processed by image acquisition mechanism 502u; image acquisition mechanism 502d, which obtains and process images acquired by camera 601d; and image compositing mechanism 503d, which composites images processed by image acquisition mechanism 502d; and an image update mechanism 504, which overwrites the updated portions of images composited by image compositing mechanisms 503u and 503d onto the wide-viewfield image and updates this image. The mirror rotation control mechanism 501 corresponds to the mirror control mechanism 003 of the image input apparatus in accordance with the fourth embodiment of the present invention shown in FIG. 4, image acquisition mechanisms 502u and 502d correspond to image acquisition mechanism 006 and image acquisition control mechanism 007 of the image input apparatus in accordance with the fourth embodiment of the present invention shown in FIG. 4, and image compositing mechanisms 503u and 503d correspond to the image compositing mechanism 009 of the image input apparatus in accordance with the fourth embodiment of the present invention shown in FIG. 4.

Here, image acquisition mechanism 502u corresponds to the first image acquisition mechanism of the present invention, image acquisition mechanism 502d corresponds to the second image acquisition mechanism of the present invention, image compositing mechanism 503u corresponds to the first image compositing mechanism of the present invention, and image compositing mechanism 503d corresponds to the second image compositing mechanism of the present invention.

Next, the operation of the image input apparatus in accordance with the sixth embodiment of the present invention having this structure described above will be explained. In the structure described above, processing mechanism 500 controls the mirror rotation mechanism 603 via the mirror rotation control mechanism 501, and causes the gear 605 to rotate. The rotation of gear 605 is transmitted to double-sided mirror 602b via hollow gear 604. Hollow gear 604 has a hollow shape so that the light reflected by reflective surface 602b-2 of double-sided mirror 602b will enter camera 601d.

Processing mechanism 500 is capable of freely setting the rotational speed of the double-sided mirror 602b; however, it normally controls this speed so that the mirror rotates at a constant speed. The light reflected from the field to be photographed has the optical path thereof altered by the reflective surfaces 602b-1 and 602b-2 of the double-sided mirror 602b, and these enter, respectively, camera 601u and camera 601d, and as a result, the field to be photographed is photographed by camera 601u and camera 601d, and the image signals thereof are sent from camera body 610u and camera body 601d to image acquisition mechanism 502u and image acquisition mechanism 502d.

Image acquisition mechanisms 502u and 502d acquire and process in order the images from camera body 610u and camera body 610d when the double-sided mirror 602b is rotating. When the double-sided mirror 602b is rotating at a constant speed, if images are acquired at standard intervals, it is possible to acquire images of the field to be photographed surrounding the image input apparatus at standard intervals.

The images acquired by image acquisition mechanism 502u and image acquisition mechanism 502d are composited by, respectively, image compositing mechanism 503u and image compositing mechanism 503d, and these are transmitted to the image update mechanism 504.

In image update mechanism 504, the updated parts from the images transmitted from image compositing mechanism 503u and image compositing mechanism 503d are overwritten on the wide-viewfield image, and thereby, the wide-viewfield image is successively updated, and is outputted to a display mechanism which is not depicted in the figure.

Figure 47:
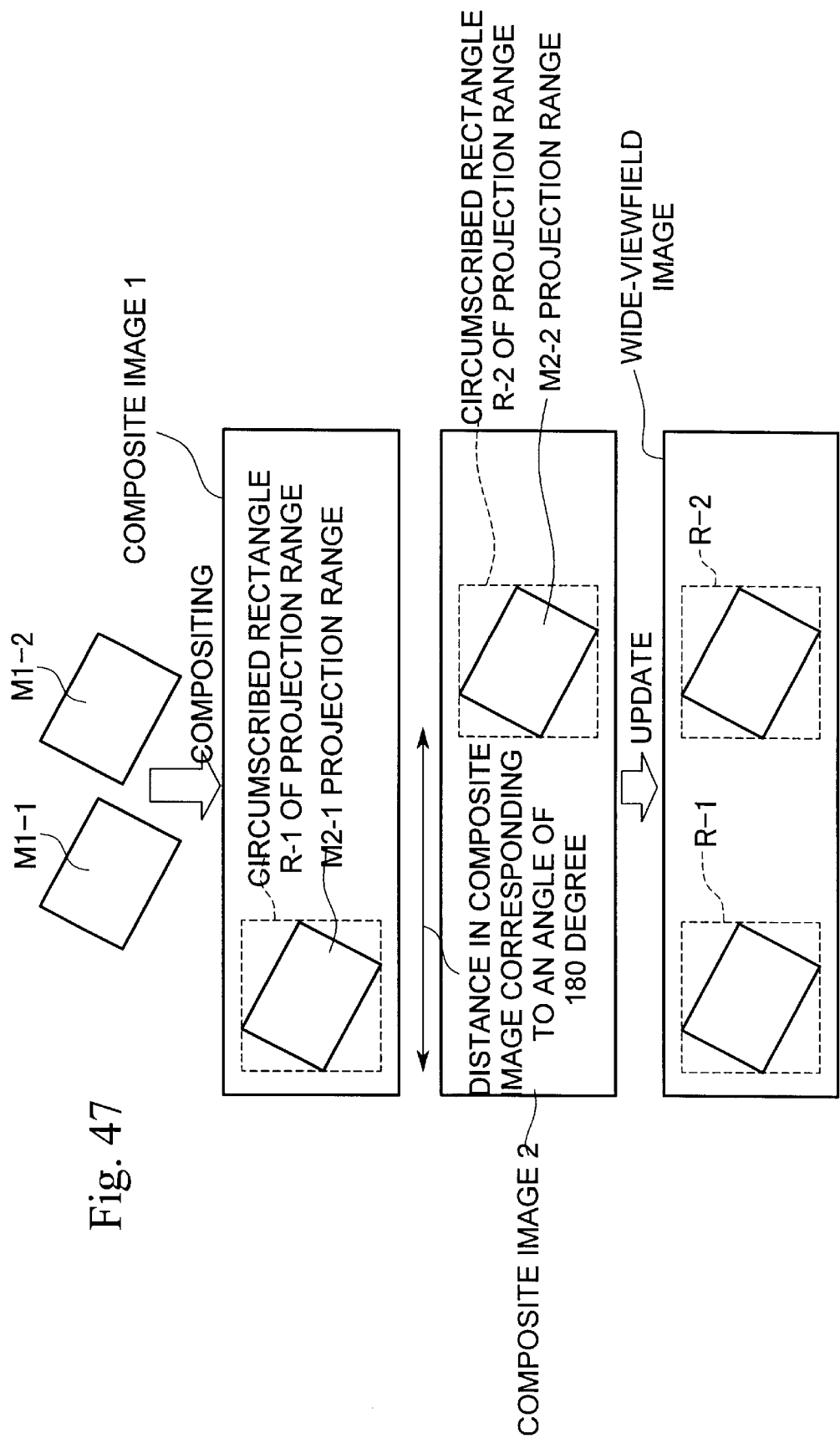
FIG. 47 is a diagram for explaining the processing from image acquisition to the update of the wide-viewfield image by an image input apparatus in accordance with the sixth embodiment of the present invention.

FIG. 47 serves to explain the processing from image acquisition to the update of the wide-viewfield image in the present embodiment. In this embodiment, two cameras, and a double-sided mirror 602b placed therebetween, are employed, so that it is a characteristic feature that two images, the acquisition positions of which differ by 180° with respect to the positioning of the mirror, can be obtained. These two images are composited by image compositing mechanism 503u and image compositing mechanism 503d and composite images are formed in the manner of the fifth embodiment in accordance with the present invention, and the updated parts of each composite image are written onto the wide-viewfield image by image update mechanism 504, and thereby, the wide-viewfield image is updated. In other words, in FIG. 47, an image M1-1, which is acquired via reflective surface 602b-1 of the double-sided mirror 602b with respect to a certain mirror angle, and image M1-2, which is acquired via reflective surface 602b-2 in the same manner, are composited onto a composite image 1 and composite image 2, respectively. At this time, the compositing positions thereof differ by 180° from each other, and the partial images corresponding to the circumscribed rectangular regions R-1 and R-2 of the updated regions are written onto the wide-viewfield image.

The image input method in accordance with the fourth embodiment of the present invention may be applied in an unchanged manner to the processing systems of the camera 601u and 601d in the image composition in the present embodiment.

In the present embodiment, two cameras, and a double-sided mirror 602 disposed therebetween, are employed, so that when the mirror makes one rotation, two wide-viewfield images having a scope of 360° are produced. In other words, while the double-sided mirror 602b rotates one time, the 360° wide-viewfield image is updated twice. In other words, in the same manner as in the fifth embodiment, in comparison with the image input apparatus in accordance with the fourth embodiment, the frame rate during input of the wide-viewfield image is doubled.

Here, an explanation was given of the case in which two independent image compositing mechanisms were present; however, if it is not necessary to conduct the compositing processing in parallel, the image compositing mechanism employed in the first through fourth embodiments of the present invention may be applied to the images in order.

As described above, in accordance with the image input apparatus in accordance with the sixth embodiment of the present invention, it is possible to simultaneously composite images acquired in two directions by a camera using a double-sided mirror, and to update this, and thereby, the time required for the mirror to be rotated once about the optical axis of the camera is one-half, and in that time, it is possible to update a wide-viewfield image having a scope of 360° once.

Furthermore, by combining two cameras and a double-sided mirror, it is possible to input the wide-viewfield images at high speed, and it is possible to produce wide-viewfield images having the same degree of resolution as those of the image input apparatus in accordance with the fourth embodiment of the present invention.

Image input may be conducted by storing, in a computer-readable recording medium, a program for executing the functions of an image input apparatus for inputting wide-viewfield composite images by photographing parts of a field to be photographed while altering the photographic direction by rotating a camera which is supported in a rotatable manner, projecting a plurality of partial images of the field to be photographed which are obtained onto a projection surface, and based on the results of this projection, conducting compositing on a composite image surface, wherein is provided an image compositing mechanism, which employs the rotational center of the camera as the center of projection during the compositing of the plurality of partial images, and which employs, as the projection point of a pixel of a partial image, the intersection point between the projection surface which is established in space and a straight line, which is parallel to a straight line connecting the viewpoint of the camera and the pixel in the partial image in an image plane formed by the plurality of partial images, and which passes through the rotational center of the camera, reading the program stored in the recording medium into a computer system, and executing this.

By reading a program recorded in the recording medium into a computer system and executing this, it is possible to obtain a satisfactory wide-viewfield composite image in which the effects of differences in viewpoint contained in the partial images are reduced, even in the case in which the camera is rotated about a point other than the principal point of the lens.

Furthermore, image input may be conducted by storing, in a computer-readable recording medium, a program for executing the functions of an image input apparatus for inputting wide-viewfield composite images by photographing parts of a field to be photographed while altering the photographic direction by rotating a camera which is supported in a rotatable manner, projecting a plurality of partial images of the field to be photographed which are obtained onto a projection surface, and based on the results of this projection, conducting compositing on a composite image surface, wherein are provided: a camera movement mechanism for changing the photographic direction of the camera; a posture control mechanism for directing the camera movement mechanism so as to change the photographic direction of the camera and for transmitting camera posture data to all parts; a first storage mechanism for storing partial images and composite images produced by compositing the partial images; a second storage mechanism for storing attribute data related to partial images and composite images and camera posture data from partial image acquisition; a partial image acquisition mechanism for incorporating images photographed by the camera and acquiring partial images from these incorporated images, and storing the partial images in the first storage mechanism, and for storing posture data from the acquisition of the partial images of the camera received from the posture control mechanism, and attribute data relating to the partial images and composite images, in the second storage mechanism; and an image compositing mechanism for setting the rotational center of the camera as a center of projection, determining a projection point so that an intersection point between a projection surface established in space and a straight line, which is parallel with a straight line connecting the viewpoint of the camera and a pixel in a partial image in an image plane formed by the plurality of partial images, and which passes through the rotational center of the camera, is employed as the projection point of the pixel in the partial image, compositing the partial images with reference to the contents of the first and second storage mechanisms, and storing a composite image in the first storage mechanism, reading the program stored in the recording medium into a computer system, and executing this.

By reading a program recorded in the recording medium into a computer system and executing this, it is possible to obtain a satisfactory wide-viewfield composite image in which the effects of differences in viewpoint contained in the partial images are reduced, even in the case in which the camera is rotated about a point other than the principal point of the lens.

Furthermore, image input may be conducted by storing, in a computer-readable recording medium, a program for executing the functions of an image input apparatus for inputting wide-viewfield composite images by photographing parts of a field to be photographed while altering the photographic direction by rotating a camera which is supported in a rotatable manner, projecting a plurality of partial images of the field to be photographed which are obtained onto a projection surface, and based on the results of this projection, conducting compositing on a composite image surface, wherein are provided: a camera movement mechanism for changing the photographic direction of the camera; a posture control mechanism for directing the camera movement mechanism so as to change the photographic direction of the camera and for transmitting camera posture data to all parts; a first storage mechanism for storing partial images and composite images produced by compositing the partial images; a second storage mechanism for storing attribute data related to partial images and composite images and camera posture data from partial image acquisition; a partial image acquisition mechanism for incorporating images photographed by the camera and acquiring partial images from these incorporated images, and storing the partial images in the first storage mechanism, and for storing posture data from the acquisition of the partial images of the camera received from the posture control mechanism, and attribute data relating to the partial images and composite images, in the second storage mechanism; a positioning mechanism for determining positional relationships between partial images stored in the first storage mechanism, determining positional correction amounts of the composited positions of the partial images stored in the second storage mechanism based on the positional relationships obtained, and storing these in the second storage mechanism; and an image compositing mechanism for determining partial image compositing positions using the camera posture data obtained at the time of acquisition of the partial images stored in the second storage mechanism and the positional correction amounts determined by the positioning mechanism, and in accordance with the compositing positions determined, setting the center of projection to the center of rotation of the camera, and determining the projection point such that the projection point of a pixel in a partial image is set to the intersection point between the projection surface established in space and a straight line, which is parallel to a straight line connecting the viewpoint of the camera and the pixel in the partial image in an image plane formed by the plurality of partial images, and which passes through the rotational center of the camera, and composites the partial images with reference to the contents of the first and second storage mechanisms, and stores a resulting composite image in the first storage mechanism, reading the program stored in the recording medium into a computer system, and executing this.

By reading a program recorded in the recording medium into a computer system and executing this, it is possible to obtain a satisfactory wide-viewfield composite image in which the effects of differences in viewpoint contained in the partial images are reduced, even in the case in which the camera is rotated about a point other than the principal point of the lens, and furthermore, it is possible to reduce the errors of the angle detection mechanism of the camera which constitutes the camera movement mechanism, and to produce highly accurate composite images.

Additionally, by appropriately setting the existing range of orientation of the camera during the acquisition of the partial images, it is possible to omit the angle detection mechanism of the camera, which comprises the camera movement mechanism in the structure of the image input apparatus.

Furthermore, image input may be conducted by storing, in a computer-readable recording medium, a program for executing the functions of an image input apparatus for inputting a wide-viewfield composite image by photographing parts of a field to be photographed while altering the photographic range of a camera in the field to be photographed by rotating a mirror supported in a rotatable manner before the camera, projecting a plurality of partial images of the field to be photographed obtained onto a projection surface, and based on the results of this projection, conducting compositing on a composite image plane, wherein is provided an image compositing mechanism for setting the rotational center of the mirror during the compositing of the plurality of partial images to the center of projection, and setting the intersection point between the projection surface which is established in space and a straight line, which is parallel to a reflection straight line indicating the reflected light beam resulting when a light beam from the viewpoint of the camera and which passes through a pixel of a partial image in an image plane formed by partial images is reflected by the mirror, and which passes through the rotational center of the mirror, as the projection point of the partial image, reading the program stored in the recording medium into a computer system, and executing this.

By reading a program recorded in the recording medium into a computer system and executing this, it is possible to obtain a satisfactory wide-viewfield composite image in which the effects of differences in viewpoint contained in the partial images are reduced.

Furthermore, image input may be conducted by storing, in a computer-readable recording medium, a program for executing the functions of an image input apparatus for inputting a wide-viewfield composite image by photographing parts of a field to be photographed while altering the photographic range of a camera in the field to be photographed by rotating a mirror supported in a rotatable manner before the camera, projecting a plurality of partial images of the field to be photographed obtained onto a projection surface, and based on the results of this projection, conducting compositing on a composite image plane, wherein are provided: a mirror movement mechanism for altering the direction of the mirror so as to change the photographic direction of the camera; a mirror control mechanism for directing the mirror movement mechanism so as to change the orientation of the mirror and for transmitting posture data of the mirror to all parts; a first storage mechanism for storing partial images and composite images produced by compositing the partial images; a second storage mechanism for storing attribute data related to partial images and composite images and the mirror posture data from partial image acquisition; a partial image acquisition mechanism for incorporating images photographed by the camera and acquiring partial images from these incorporated images, and storing the partial images in the first storage mechanism, and for storing posture data from the acquisition of the partial images of the mirror received from the mirror control mechanism, and attribute data relating to the partial images and composite images, in the second storage mechanism; and an image compositing mechanism which uses the rotational center of the mirror as the center of projection during the compositing of the plurality of partial images, and which determines a projection point such that the intersection point between the projection surface which is established in space and a straight line, which is parallel to a reflection straight line indicating a reflected beam of light resulting from the reflection by the mirror of a light beam from the viewpoint of the camera which passes through a pixel of a partial image in an image plane formed by the partial images, and which passes through the rotational center of the mirror, is employed as the projection point of the pixel of the partial image, and which composites the partial images with reference to the contents of the first and second storage mechanisms, and stores a composite image in the first storage mechanism, reading the program stored in the recording medium into a computer system, and executing this.

By reading a program recorded in the recording medium into a computer system and executing this, it is possible to obtain a satisfactory wide-viewfield composite image in which the effects of differences in viewpoint contained in the partial images are reduced.

Furthermore, image input may be conducted by storing, in a computer-readable recording medium, a program for executing the functions of an image input apparatus for inputting a wide-viewfield composite image by photographing parts of a field to be photographed while altering the photographic range of a camera in the field to be photographed by rotating a mirror supported in a rotatable manner before the camera, projecting a plurality of partial images of the field to be photographed obtained onto a projection surface, and based on the results of this projection, conducting compositing on a composite image plane, wherein are provided: a mirror movement mechanism for altering the direction of the mirror so as to change the photographic direction of the camera; a mirror control mechanism for directing the mirror movement mechanism so as to change the orientation of the mirror and for transmitting posture data of the mirror to all parts; a first storage mechanism for storing partial images and composite images produced by compositing the partial images; a second storage mechanism for storing attribute data related to partial images and composite images and the mirror posture data from partial image acquisition; a partial image acquisition mechanism for incorporating images photographed by the camera and acquiring partial images from these incorporated images, and storing the partial images in the first storage mechanism, and for storing posture data from the acquisition of the partial images of the mirror received from the mirror control mechanism, and attribute data relating to the partial images and composite images, in the second storage mechanism; a positioning mechanism for determining positional relationships between partial images stored in the first storage mechanism, determining positional correction amounts of the composited positions of the partial images stored in the second storage mechanism based on the positional relationships obtained, and storing these in the second storage mechanism; and an image compositing mechanism for determining compositing positions of the partial images using the posture data of the camera at the time of acquisition of the partial images stored in the second storage mechanism and the positional correction amounts of the compositing positions obtained from the positioning mechanism, and, in accordance with the compositing positions obtained, setting the rotational center of the mirror as the center of projection during the compositing of the plurality of partial images, determining a projection point such that the intersection point between the projection surface which is established in space and a straight line, which is parallel to a reflection straight line indicating a reflected beam of light resulting from the reflection by the mirror of a light beam from the viewpoint of the camera which passes through a pixel of a partial image in an image plane formed by the partial images, and which passes through the rotational center of the mirror, is employed as the projection point of the pixel of the partial image, compositing the partial images with reference to the contents of the first and second storage mechanisms, and storing a composite image in the first storage mechanism, reading the program stored in the recording medium into a computer system, and executing this.

By reading a program recorded in the recording medium into a computer system and executing this, it is possible to obtain a satisfactory wide-viewfield composite image in which the effects of differences in viewpoint contained in the partial images are reduced, and furthermore, it is possible to reduce the errors of the angle detection mechanism of the mirror which constitutes the mirror movement mechanism, and to produce highly accurate composite images.

Additionally, by appropriately setting the existing range of orientation of the mirror during the acquisition of the partial images, it is possible to omit the angle detection mechanism of the mirror, which comprises the mirror movement mechanism in the structure of the image input apparatus.

Furthermore, image input may be conducted by storing, in a computer-readable recording medium, a program for executing the functions of an image input apparatus for inputting a wide-viewfield composite image by photographing parts of a field to be photographed while altering the photographic direction by rotating a camera supported in a rotatable manner, and compositing a plurality of partial images of the field to be photographed which are obtained, wherein is provided an image compositing mechanism which determines a pixel on a composite image surface corresponding to a point in a projection surface from the intersection point between an image plane formed by the plurality of partial images and a straight line, which is parallel to a straight line connecting the point in the projection surface established in space during the compositing of the plurality of partial images and the rotational center of the camera, and which passes through the viewpoint of the camera, reading the program stored in the recording medium into a computer system, and executing this.

By reading a program recorded in the recording medium into a computer system and executing this, it is possible to obtain a satisfactory wide-viewfield composite image in which the effects of differences in viewpoint contained in the partial images are reduced, even in the case in which the camera is rotated about a point other than the principal point of the lens, and furthermore, an effect is achieved whereby, when determining the pixel values in the composite image by means of arithmetic processing such as linear interpolation or the like, blank pixels, which are a product of rounding errors in the coordinate values indicating the positions of the pixels, are not produced in the composite image.

Furthermore, image input may be conducted by storing, in a computer-readable recording medium, a program for executing the functions of an image input apparatus for inputting a wide-viewfield composite image by photographing parts of a field to be photographed while altering the photographic direction by rotating a camera supported in a rotatable manner, and compositing a plurality of partial images of the field to be photographed which are obtained, wherein are provided: a camera movement mechanism for changing the photographic direction of the camera; a posture control mechanism for directing the camera movement mechanism so as to change the photographic direction of the camera and for transmitting camera posture data to all parts; a first storage mechanism for storing partial images and composite images produced by compositing the partial images; a second storage mechanism for storing attribute data related to partial images and composite images and camera posture data from partial image acquisition; a partial image acquisition mechanism for incorporating images photographed by the camera and acquiring partial images from these incorporated images, and storing the partial images in the first storage mechanism, and for storing posture data from the acquisition of the partial images of the camera received from the posture control mechanism, and attribute data relating to the partial images and composite images, in the second storage mechanism; and an image compositing mechanism for determining a pixel on a composite image surface corresponding to a point on the projection surface from the intersection point between an image plane formed by the plurality of partial images obtained and a straight line, which is parallel to a straight line connecting a point in the projection surface established in space at the time of the compositing of the plurality of partial images with the rotational center of the camera, and which passes through the viewpoint of the camera, compositing the partial images with reference to the contents of the first and second storage mechanisms, and storing the composite image in the first storage mechanism, reading the program stored in the recording medium into a computer system, and executing this.

By reading a program recorded in the recording medium into a computer system and executing this, it is possible to obtain a satisfactory wide-viewfield composite image in which the effects of differences in viewpoint contained in the partial images are reduced, even in the case in which the camera is rotated about a point other than the principal point of the lens, and furthermore, an effect is achieved whereby, when determining the pixel values in the composite image by means of arithmetic processing such as linear interpolation or the like, blank pixels, which are a product of rounding errors in the coordinate values indicating the positions of the pixels, are not produced in the composite image.

Furthermore, image input may be conducted by storing, in a computer-readable recording medium, a program for executing the functions of an image input apparatus for inputting a wide-viewfield composite image by photographing parts of a field to be photographed while altering the photographic direction by rotating a camera supported in a rotatable manner, and compositing a plurality of partial images of the field to be photographed which are obtained, wherein are provided: a camera movement mechanism for changing the photographic direction of the camera; a posture control mechanism for directing the camera movement mechanism so as to change the photographic direction of the camera and for transmitting camera posture data to all parts; a first storage mechanism for storing partial images and composite images produced by compositing the partial images; a second storage mechanism for storing attribute data related to partial images and composite images and camera posture data from partial image acquisition; a partial image acquisition mechanism for incorporating images photographed by the camera and acquiring partial images from these incorporated images, and storing the partial images in the first storage mechanism, and for storing posture data from the acquisition of the partial images of the camera received from the posture control mechanism, and attribute data relating to the partial images and composite images, in the second storage mechanism; a positioning mechanism for determining positional relationships between partial images stored in the first storage mechanism, determining positional correction amounts of the composited positions of the partial images stored in the second storage mechanism based on the positional relationships obtained, and storing these in the second storage mechanism; and an image compositing mechanism for determining compositing positions of the partial images using the posture data of the camera at the time of acquisition of the partial images stored in the second storage mechanism and the positional correction amounts of the compositing positions obtained from the positioning mechanism, and, in accordance with the compositing positions obtained, determining a pixel on a composite image surface corresponding to a point on the projection surface from the intersection point between an image plane formed by the plurality of partial images obtained and a straight line, which is parallel to a straight line connecting a point in the projection surface established in space with the rotational center of the camera, and which passes through the viewpoint of the camera, compositing the partial images with reference to the contents of the first and second storage mechanisms, and storing the composite image in the first storage mechanism, reading the program stored in the recording medium into a computer system, and executing this.

By reading a program recorded in the recording medium into a computer system and executing this, it is possible to obtain a satisfactory wide-viewfield composite image in which the effects of differences in viewpoint contained in the partial images are reduced, even in the case in which the camera is rotated about a point other than the principal point of the lens, and furthermore, an effect is achieved whereby, when determining the pixel values in the composite image by means of arithmetic processing such as linear interpolation or the like, blank pixels, which are a product of rounding errors in the coordinate values indicating the positions of the pixels, are not produced in the composite image.

Furthermore, it is possible to reduce the errors of the angle detection mechanism of the camera which constitutes the camera movement mechanism, and to produce highly accurate composite images.

Additionally, by appropriately setting the existing range of orientation of the camera during the acquisition of the partial images, it is possible to omit the angle detection mechanism of the camera, which comprises the camera movement mechanism in the structure of the image input apparatus.

Furthermore, image input may be conducted by storing, in a computer-readable recording medium, a program for realizing the functions of an image input apparatus for inputting a wide-viewfield composite image by photographing parts of a field to be photographed while altering the photographic range of a camera in the field to be photographed by rotating a mirror supported in a rotatable manner before the camera, and compositing a plurality of partial images of the field to be photographed which are obtained, wherein is provided an image compositing mechanism for determining a pixel on a composite image surface corresponding to a point in a projection surface from the intersection point between an image plane formed by the partial images and a straight line, which is parallel to a straight line indicating the reflected light beam resulting from the reflection of a straight line connecting the point in the projection surface which is established in space during the compositing of the plurality of partial images and the rotational center of the mirror, and passes through the viewpoint of the camera, reading the program stored in the recording medium into a computer system, and executing this.

By reading a program recorded in the recording medium into a computer system and executing this, it is possible to obtain a satisfactory wide-viewfield composite image in which the effects of differences in viewpoint contained in the partial images are reduced, and furthermore, an effect is achieved whereby, when determining the pixel values in the composite image by means of arithmetic processing such as linear interpolation or the like, blank pixels, which are a product of rounding errors in the coordinate values indicating the positions of the pixels, are not produced in the composite image.

Furthermore, image input may be conducted by storing, in a computer-readable recording medium, a program for realizing the functions of an image input apparatus for inputting a wide-viewfield composite image by photographing parts of a field to be photographed while altering the photographic range of a camera in the field to be photographed by rotating a mirror supported in a rotatable manner before the camera, and compositing a plurality of partial images of the field to be photographed which are obtained, wherein are provided: a mirror movement mechanism for altering the direction of the mirror so as to change the photographic direction of the camera; a mirror control mechanism for directing the mirror movement mechanism so as to change the orientation of the mirror and for transmitting posture data of the mirror to all parts; a first storage mechanism for storing partial images and composite images produced by compositing the partial images; a second storage mechanism for storing attribute data related to partial images and composite images and the mirror posture data from partial image acquisition; a partial image acquisition mechanism for incorporating images photographed by the camera and acquiring partial images from these incorporated images, and storing the partial images in the first storage mechanism, and for storing posture data from the acquisition of the partial images of the mirror received from the mirror control mechanism, and attribute data relating to the partial images and composite images, in the second storage mechanism; and an image compositing mechanism for determining a pixel on a composite image surface corresponding to a point in a projection surface from an intersection point between an image plane formed by the partial images and a straight line, which is parallel to a straight line indicating a reflected light beam resulting from a reflection by the mirror of a straight line connecting a point on the projection surface which is established in space at the time of the compositing of the plurality of partial images and the rotational center of the mirror, and which passes through the viewpoint of the camera, compositing the partial images with reference to the contents of the first and second storage mechanisms, and storing the composite image in the first storage mechanism, reading the program stored in the recording medium into a computer system, and executing this.

By reading a program recorded in the recording medium into a computer system and executing this, it is possible to obtain a satisfactory wide-viewfield composite image in which the effects of differences in viewpoint contained in the partial images are reduced, and furthermore, an effect is achieved whereby, when determining the pixel values in the composite image by means of arithmetic processing such as linear interpolation or the like, blank pixels, which are a product of rounding errors in the coordinate values indicating the positions of the pixels, are not produced in the composite image.

Furthermore, image input may be conducted by storing, in a computer-readable recording medium, a program for realizing the functions of an image input apparatus for inputting a wide-viewfield composite image by photographing parts of a field to be photographed while altering the photographic range of a camera in the field to be photographed by rotating a mirror supported in a rotatable manner before the camera, and compositing a plurality of partial images of the field to be photographed which are obtained, wherein are provided: a mirror movement mechanism for altering the direction of the mirror so as to change the photographic direction of the camera; a mirror control mechanism for directing the mirror movement mechanism so as to change the orientation of the mirror and for transmitting posture data of the mirror to all parts; a first storage mechanism for storing partial images and composite images produced by compositing the partial images; a second storage mechanism for storing attribute data related to partial images and composite images and the mirror posture data from partial image acquisition; a partial image acquisition mechanism for incorporating images photographed by the camera and acquiring partial images from these incorporated images, and storing the partial images in the first storage mechanism, and for storing posture data from the acquisition of the partial images of the mirror received from the mirror control mechanism, and attribute data relating to the partial images and composite images, in the second storage mechanism; a positioning mechanism for determining positional relationships between partial images stored in the first storage mechanism, determining positional correction amounts of the composited positions of the partial images stored in the second storage mechanism based on the positional relationships obtained, and storing these in the second storage mechanism; and an image compositing mechanism for determining compositing positions of the partial images using the posture data of the camera at the time of acquisition of the partial images stored in the second storage mechanism and the positional correction amounts of the compositing positions obtained from the positioning mechanism, and, in accordance with the compositing positions obtained, determining a pixel on a composite image surface corresponding to a point in a projection surface from an intersection point between an image plane formed by the partial images and a straight line, which is parallel to a straight line indicating a reflected light beam resulting from a reflection by the mirror of a straight line connecting a point on the projection surface which is established in space at the time of the compositing of the plurality of partial images and the rotational center of the mirror, and which passes through the viewpoint of the camera, compositing the partial images with reference to the contents of the first and second storage mechanisms, and storing the composite image in the first storage mechanism, reading the program stored in the recording medium into a computer system, and executing this.

By reading a program recorded in the recording medium into a computer system and executing this, it is possible to obtain a satisfactory wide-viewfield composite image in which the effects of differences in viewpoint contained in the partial images are reduced, and furthermore, an effect is achieved whereby, when determining the pixel values in the composite image by means of arithmetic processing such as linear interpolation or the like, blank pixels, which are a product of rounding errors in the coordinate values indicating the positions of the pixels, are not produced in the composite image.

Furthermore, it is possible to reduce the errors of the angle detection mechanism of the mirror which constitutes the mirror movement mechanism, and to produce highly accurate composite images.

Additionally, by appropriately setting the existing range of orientation of the mirror during the acquisition of the partial images, it is possible to omit the angle detection mechanism of the mirror, which comprises the mirror movement mechanism in the structure of the image input apparatus.

In accordance with the invention as described in claim 1, it is possible to obtain a satisfactory wide-viewfield composite image in which the effects of differences in view contained in the partial images are minimized, even when the camera is rotated about a point other than the principal point of the lens.

In accordance with the invention as described in claim 2, satisfactory wide-viewfield composite images, in which the effects of differences in viewpoint incorporated in the partial images are limited, may be obtained.

In accordance with the invention as disclosed in claim 3, in addition to the effects achieved by the invention as disclosed in claim 1, an effect is achieved whereby, when determining pixel values in the composite image by means of, for example, arithmetic processing such as linear interpolation or the like, blank pixels, which are a product of rounding errors in the coordinate values indicating the positions of the pixels, are not produced in the composite image.

In accordance with the invention as disclosed in claim 4, in addition to the effects of the invention as disclosed in claim 2, when the pixel values in the composite image are determined by means of, for example, arithmetic processing such as linear interpolation or the like, blank pixels, which are a product of rounding errors in the coordinate values indicating the position of the pixels, are not produced in the composite image.

In accordance with the invention as disclosed in claims 5 and 6, it is possible to obtain a satisfactory wide-viewfield composite image, in which the effects of differences in viewpoint contained in the partial images are reduced, even when the camera is rotated about a point other than the principal point of the lens.

In accordance with the invention as disclosed in claim 7, it is possible to obtain a satisfactory wide-viewfield composite image, in which the effects of differences in viewpoint contained in the partial images are reduced, even when the camera is rotated about a point other than the principal point of the lens, and it is possible to produce a high-precision composite image in which errors in the angle detection mechanism of the camera which comprises the camera movement mechanism are reduced.

By means of appropriately setting the existing range of camera orientation during the acquisition of partial images, it is possible to omit the angle detection mechanism of the camera which comprises the camera movement mechanism in the structure of the image input apparatus.

In accordance with the invention as disclosed in claims 8 and 9, it is possible to obtain satisfactory wide-viewfield composite images in which the effects of differences in viewpoint contained in the partial images are reduced.

In accordance with the invention as disclosed in claim 10, in an image input apparatus for inputting a wide-viewfield composite image by photographing parts of a field to be photographed while changing the range of photography in the field to be photographed of a camera by rotating a mirror which is supported in a rotatable manner before the camera, projecting a plurality of partial images of the field to be photographed which are obtained onto a projection surface, and based on the results of this projection, conducting compositing on a composite image surface, the rotational center of the mirror is set as the center of projection during the compositing of the plurality of partial images, a projection point is determined such that the intersection point between the projection surface which is established in space and a straight line, which is parallel to a reflection straight line indicating a reflected beam of light resulting from the reflection by the mirror of a light beam from the viewpoint of the camera which passes through a pixel of a partial image in an image plane formed by the partial images, and which passes through the rotational center of the mirror, is employed as the projection point of the pixel of the partial image, so that it is possible to obtain satisfactory wide-viewfield composite images in which the effects of differences in viewpoint contained in the partial images are reduced, and it is possible to produce highly precise composite images in which errors in the angle detection mechanism of the mirror which constitutes the mirror movement mechanism are reduced.

Furthermore, by means of appropriately setting the existing range of mirror orientation during the acquisition of partial images, it is possible to omit the angle detection mechanism of the mirror which comprises the mirror movement mechanism in the structure of the image input apparatus.

In accordance with the invention as disclosed in claims 11 and 12, even when the camera is rotated about a point other than the principal point of the lens, it is possible to obtain a satisfactory wide-viewfield composite image in which the effects of differences in viewpoint contained in the partial images are reduced, and an effect is achieved whereby, when determining the pixel values in the composite image by means of arithmetic processing such as linear interpolation or the like, blank pixels, which are a product of rounding errors in the coordinate values indicating the positions of the pixels, are not produced in the composite image.

In accordance with the invention as disclosed in claim 13, even when the camera is rotated about a point other than the principal point of the lens, it is possible to obtain a satisfactory wide-viewfield composite image in which the effects of differences in viewpoint contained in the partial images are reduced, and an effect is achieved whereby, when determining the pixel values in the composite image by means of arithmetic processing such as linear interpolation or the like, blank pixels, which are a product of rounding errors in the coordinate values indicating the positions of the pixels, are not produced in the composite image.

Furthermore, it is possible to reduce the errors of the angle detection mechanism of the camera which constitutes the camera movement mechanism, and to produce highly accurate composite images.

Additionally, by appropriately setting the existing range of orientation of the camera during the acquisition of the partial images, it is possible to omit the angle detection mechanism of the camera, which comprises the camera movement mechanism in the structure of the image input apparatus.

In accordance with the invention as disclosed in claims 14 and 15, it is possible to obtain a satisfactory wide-viewfield composite image in which the effects of differences in viewpoint contained in the partial images are reduced, and an effect is achieved whereby, when determining the pixel values in the composite image by means of arithmetic processing such as linear interpolation or the like, blank pixels, which are a product of rounding errors in the coordinate values indicating the positions of the pixels, are not produced in the composite image.

In accordance with the invention as disclosed in claim 16, it is possible to obtain a satisfactory wide-viewfield composite image in which the effects of differences in viewpoint contained in the partial images are reduced, and an effect is achieved whereby, when determining the pixel values in the composite image by means of arithmetic processing such as linear interpolation or the like, blank pixels, which are a product of rounding errors in the coordinate values indicating the positions of the pixels, are not produced in the composite image. Furthermore, it is possible to reduce the errors of the angle detection mechanism of the mirror which constitutes the mirror movement mechanism, and to produce highly accurate composite images. Additionally, by appropriately setting the existing range of orientation of the mirror during the acquisition of the partial images, it is possible to omit the angle detection mechanism of the mirror, which comprises the mirror movement mechanism in the structure of the image input apparatus.

In accordance with the invention as disclosed in claim 17, by reading a program recorded in the recording medium into a computer system and executing this, it is possible to obtain a satisfactory wide-viewfield composite image in which the effects of differences in viewpoint contained in the partial images are reduced, even in the case in which the camera is rotated about a point other than the principal point of the lens.

In accordance with the invention as disclosed in claim 18, by reading a program recorded in the recording medium into a computer system and executing this, it is possible to obtain a satisfactory wide-viewfield composite image in which the effects of differences in viewpoint contained in the partial images are reduced, even in the case in which the camera is rotated about a point other than the principal point of the lens.

In accordance with the invention as disclosed in claim 19, by reading a program recorded in the recording medium into a computer system and executing this, it is possible to obtain a satisfactory wide-viewfield composite image in which the effects of differences in viewpoint contained in the partial images are reduced, even in the case in which the camera is rotated about a point other than the principal point of the lens, and furthermore, it is possible to reduce the errors of the angle detection mechanism of the camera which constitutes the camera movement mechanism, and to produce highly accurate composite images. Additionally, by appropriately setting the existing range of orientation of the camera during the acquisition of the partial images, it is possible to omit the angle detection mechanism of the camera, which comprises the camera movement mechanism in the structure of the image input apparatus.

In accordance with the invention as disclosed in claim 20, by reading a program recorded in the recording medium into a computer system and executing this, it is possible to obtain a satisfactory wide-viewfield composite image in which the effects of differences in viewpoint contained in the partial images are reduced.

In accordance with the invention as disclosed in claim 21, by reading a program recorded in the recording medium into a computer system and executing this, it is possible to obtain a satisfactory wide-viewfield composite image in which the effects of differences in viewpoint contained in the partial images are reduced.

In accordance with the invention as disclosed in claim 22, by reading a program recorded in the recording medium into a computer system and executing this, it is possible to obtain a satisfactory wide-viewfield composite image in which the effects of differences in viewpoint contained in the partial images are reduced, and furthermore, it is possible to reduce the errors of the angle detection mechanism of the mirror which constitutes the mirror movement mechanism, and to produce highly accurate composite images.

Additionally, by appropriately setting the existing range of orientation of the mirror during the acquisition of the partial images, it is possible to omit the angle detection mechanism of the mirror, which comprises the mirror movement mechanism in the structure of the image input apparatus.

In accordance with the invention as disclosed in claim 23, by reading a program recorded in the recording medium into a computer system and executing this, it is possible to obtain a satisfactory wide-viewfield composite image in which the effects of differences in viewpoint contained in the partial images are reduced, even in the case in which the camera is rotated about a point other than the principal point of the lens, and furthermore, an effect is achieved whereby, when determining the pixel values in the composite image by means of arithmetic processing such as linear interpolation or the like, blank pixels, which are a product of rounding errors in the coordinate values indicating the positions of the pixels, are not produced in the composite image.

In accordance with the invention as disclosed in claim 24, by reading a program recorded in the recording medium into a computer system and executing this, it is possible to obtain a satisfactory wide-viewfield composite image in which the effects of differences in viewpoint contained in the partial images are reduced, even in the case in which the camera is rotated about a point other than the principal point of the lens, and furthermore, an effect is achieved whereby, when determining the pixel values in the composite image by means of arithmetic processing such as linear interpolation or the like, blank pixels, which are a product of rounding errors in the coordinate values indicating the positions of the pixels, are not produced in the composite image.

In accordance with the invention as disclosed in claim 25, by reading a program recorded in the recording medium into a computer system and executing this, it is possible to obtain a satisfactory wide-viewfield composite image in which the effects of differences in viewpoint contained in the partial images are reduced, even in the case in which the camera is rotated about a point other than the principal point of the lens, and furthermore, an effect is achieved whereby, when determining the pixel values in the composite image by means of arithmetic processing such as linear interpolation or the like, blank pixels, which are a product of rounding errors in the coordinate values indicating the positions of the pixels, are not produced in the composite image.

Furthermore, it is possible to reduce the errors of the angle detection mechanism of the camera which constitutes the camera movement mechanism, and to produce highly accurate composite images.

Additionally, by appropriately setting the existing range of orientation of the camera during the acquisition of the partial images, it is possible to omit the angle detection mechanism of the camera, which comprises the camera movement mechanism in the structure of the image input apparatus.

In accordance with the invention as disclosed in claim 26, by reading a program recorded in the recording medium into a computer system and executing this, it is possible to obtain a satisfactory wide-viewfield composite image in which the effects of differences in viewpoint contained in the partial images are reduced, and furthermore, an effect is achieved whereby, when determining the pixel values in the composite image by means of arithmetic processing such as linear interpolation or the like, blank pixels, which are a product of rounding errors in the coordinate values indicating the positions of the pixels, are not produced in the composite image.

In accordance with the invention as disclosed in claim 27, by reading a program recorded in the recording medium into a computer system and executing this, it is possible to obtain a satisfactory wide-viewfield composite image in which the effects of differences in viewpoint contained in the partial images are reduced, and furthermore, an effect is achieved whereby, when determining the pixel values in the composite image by means of arithmetic processing such as linear interpolation or the like, blank pixels, which are a product of rounding errors in the coordinate values indicating the positions of the pixels, are not produced in the composite image.

In accordance with the invention as disclosed in claim 28, by reading a program recorded in the recording medium into a computer system and executing this, it is possible to obtain a satisfactory wide-viewfield composite image in which the effects of differences in viewpoint contained in the partial images are reduced, and furthermore, an effect is achieved whereby, when determining the pixel values in the composite image by means of arithmetic processing such as linear interpolation or the like, blank pixels, which are a product of rounding errors in the coordinate values indicating the positions of the pixels, are not produced in the composite image.

Furthermore, it is possible to reduce the errors of the angle detection mechanism of the mirror which constitutes the mirror movement mechanism, and to produce highly accurate composite images.

Additionally, by appropriately setting the existing range of orientation of the mirror during the acquisition of the partial images, it is possible to omit the angle detection mechanism of the mirror, which comprises the mirror movement mechanism in the structure of the image input apparatus.

In accordance with the invention as disclosed in claims 29 and 30, it is possible to simultaneously photograph images in two directions and to conduct compositing and updating, and for that reason, it becomes possible to input wide-viewfield images at high speed when compositing a plurality of partial images acquired by rotating a mirror in front of a camera.

In accordance with the invention as disclosed in claims 31 and 32, first and second cameras which are disposed so that the optical axes of the camera lens thereof are in agreement and they are in mutual opposition and which photograph a field to be photographed, a double-sided mirror, which is disposed between the first and second cameras and which alters the optical path of light reflected from the field to be photographed in the direction of the camera lens of the first and second camera, a mirror rotation mechanism for rotating the double-sided mirror about the optical axes of the first and second cameras, and a processing mechanism for compositing a plurality of images inputted from the first and second cameras in accordance with the rotation of the mirror and producing a wide view angle image, are provided, so that it is possible to input wide-viewfield images at high speed when compositing a plurality of partial images acquired by rotating a mirror before cameras, and it is possible to produce wide-viewfield images having higher resolution than that of wide-viewfield images obtained by the image input apparatus in accordance with the invention disclosed in claims 29 and 30.

Formula 1

$$p = \begin{pmatrix} x \\ y \\ z \end{pmatrix} = \begin{pmatrix} \cos\theta\cos\rho & \cos\theta\sin\rho\sin\phi - \sin\theta\cos\phi & \cos\theta\sin\rho\cos\phi + \sin\theta\sin\phi \\ \sin\theta\cos\rho & \sin\theta\sin\rho\sin\phi + \cos\theta\cos\phi & \sin\theta\sin\rho\cos\phi - \cos\theta\sin\phi \\ -\sin\rho & \cos\rho\sin\phi & \cos\rho\cos\phi \end{pmatrix} \begin{pmatrix} x_j \\ y_j \\ f+L \end{pmatrix} \quad (1)$$

Formula 2

$$p = \begin{pmatrix} x \\ y \\ z \end{pmatrix} = \begin{pmatrix} \cos\theta_i & -\sin\theta_i\cos\phi & \sin\theta_i\sin\phi \\ \sin\theta_i & \cos\theta_i\cos\phi & -\cos\theta_i\sin\phi \\ 0 & \sin\phi & \cos\phi \end{pmatrix} \begin{pmatrix} x_j \\ y_j \\ f+L \end{pmatrix} \quad (2)$$

Formula 3

$$o = L'(\cos\theta\sin\rho\cos\phi + \sin\theta\sin\phi \quad \sin\theta\sin\rho\cos\phi - \cos\theta\sin\phi \quad \cos\rho\cos\phi). \quad (3)$$

Formula 4

$$o = L'(\sin\theta_i\sin\phi \quad -\cos\theta_i\sin\phi \quad \cos\phi) \quad \ldots (4)$$

Formula 5

$$s(p-o)+o \quad \ldots (5)$$

Formula 6

$$\begin{pmatrix} X \\ Y \\ Z \end{pmatrix} = \frac{D}{\sqrt{(p-o)_x^2 + (p-o)_y^2}} (p-o) \quad (6)$$

Formula 7

$$\left. \begin{array}{l} X_j = -D\tan^{-1}\left(\frac{Y}{X}\right) \\ Y_j = Z \end{array} \right\} \quad (7)$$

Formula 8

$$\left. \begin{array}{l} X = -D\sin\left(\frac{X_k}{D}\right) \\ Y = D\cos\left(\frac{X_k}{D}\right) \\ Z = Y_k \end{array} \right\} \quad (8)$$

Formula 9
$$p = s \begin{pmatrix} X \\ Y \\ Z \end{pmatrix} + o \quad (9)$$

Formula 10
$$o \cdot (p-(f+L)^t(\cos\theta \sin\rho \cos\phi + \sin\theta \sin\phi \quad \sin\theta \sin\rho \cos\phi - \cos\theta \sin\phi \cos\rho \cos\phi)) = 0 \quad (10)$$

Formula 11
$$o \cdot (p-(f+L)^t(\sin\theta_i \sin\phi - \cos\theta_i \sin\phi \cos\phi)) = 0 \quad (11)$$

Formula 12
$$s = \frac{(f+L)o^{\cdot t}(\cos\theta\sin\rho\cos\phi + \sin\theta\sin\phi \quad \sin\theta\sin\rho\cos\phi - \cos\theta\sin\phi \quad \cos\rho\cos\phi) - o \cdot o}{o^{\cdot t}(X \ Y \ Z)} \quad (12)$$

Formula 13
$$s = \frac{(f+L)o^{\cdot t}(\sin\theta_i\sin\phi \quad -\cos\theta_i\sin\phi \quad \cos\phi) - o \cdot o}{o^{\cdot t}(X \ Y \ Z)} \quad (13)$$

Formula 14
$$p = \begin{pmatrix} x_k \\ y_k \\ f+L \end{pmatrix} = \begin{pmatrix} \cos(-\theta)\cos(-\rho) & \cos(-\theta)\sin(-\rho)\sin(-\phi) - \sin(-\theta)\cos(-\phi) & \cos(-\theta)\sin(-\rho)\cos(-\phi) + \sin(-\theta)\sin(-\phi) \\ \sin(-\theta)\cos(-\rho) & \sin(-\theta)\sin(-\rho)\sin(-\phi) + \cos(-\theta)\cos(-\phi) & \sin(-\theta)\sin(-\rho)\cos(-\phi) - \cos(-\theta)\sin(-\phi) \\ -\sin(-\rho) & \cos(-\rho)\sin(-\phi) & \cos\rho\cos(-\phi) \end{pmatrix} \begin{pmatrix} x \\ y \\ z \end{pmatrix} \quad (14)$$

Formula 15
$$\begin{pmatrix} x_k \\ y_k \\ f+L \end{pmatrix} = \begin{pmatrix} \cos\theta_i & \sin\theta_i\cos\phi & \sin\theta_i\sin\phi \\ -\sin\theta_i & \cos\theta_i\cos\phi & \cos\theta_i\sin\phi \\ 0 & -\sin\phi & \cos\phi \end{pmatrix} \begin{pmatrix} x \\ y \\ z \end{pmatrix} \quad (15)$$

Formula 16
$$n = {}^t(n_x n_y n_x) = {}^t(-\cos\theta \sin\rho \cos\phi - \sin\theta \sin\phi - \sin\theta \sin\rho \cos\phi + \cos\theta \sin\phi - \cos\rho \cos\phi) \quad (16)$$

Formula 17
$$n = {}^t(n_x n_y n_z) = {}^t(-\sin\theta_i \sin\phi \cos\theta_i \sin\phi - \cos\phi) \quad (17)$$

Formula 18
$$p = {}^t(x_j, y_j, f) \quad (18)$$

Formula 19
$$sp \quad (19)$$

Formula 20
$$n \cdot (r-c) = 0 \quad (20)$$

Formula 21
$$r = \frac{n \cdot c}{n \cdot p} p \quad (21)$$

Formula 22
$$R1 = \begin{pmatrix} 1 - 2n_x^2 & -2n_x n_y & -2n_x n_z \\ -2n_x n_y & 1 - 2n_y^2 & -2n_x n_z \\ -2n_x n_z & -2n_y n_z & 1 - 2n_z^2 \end{pmatrix} 1 \quad (22)$$

Formula 23
$$q = sRp + r = sRp + \frac{n \cdot c}{n \cdot p} p \quad (23)$$

Formula 24
$$q - c = sRp + r - c = sRp + \frac{n \cdot c}{n \cdot p} p - c \quad (24)$$

Formula 25
$$t(q-c) + c = t(sRp + r - c) + c = t\left(sRp + \frac{n \cdot c}{n \cdot p} p - c\right) + c \quad (25)$$

Formula 26
$$\frac{-\{c_x(Rp)_x + c_y(Rp)_y\} + \sqrt{\{c_x(Rp)_x + c_y(Rp)_y\}^2 - \{(Rp)_x^2 + (Rp)_y^2\}(c_x^2 + c_y^2 - D^2)}}{\{(Rp)_x^2 + (Rp)_y^2\}} Rp + c \quad (26)$$

Formula 27

$$\left.\begin{aligned} X &= -D\sin\left(\frac{X_k}{D}\right) \\ Y &= D\cos\left(\frac{X_k}{D}\right) \\ Z &= Y_k \end{aligned}\right\} \quad (27)$$

Formula 28

$$c - \begin{pmatrix} X \\ Y \\ Z \end{pmatrix} \quad (28)$$

Formula 29

$$R\left\{c - \begin{pmatrix} X \\ Y \\ Z \end{pmatrix}\right\} \quad (29)$$

Formula 30

$$sR\left\{c - \begin{pmatrix} X \\ Y \\ Z \end{pmatrix}\right\} \quad (30)$$

Formula 31

$$\left.\begin{aligned} x_k = x &= \frac{f}{\left\{R\left(c - \begin{pmatrix} X \\ Y \\ Z \end{pmatrix}\right)\right\}_z} \left\{R\left(c - \begin{pmatrix} X \\ Y \\ Z \end{pmatrix}\right)\right\}_x \\ y_k = y &= \frac{f}{\left\{R\left(c - \begin{pmatrix} X \\ Y \\ Z \end{pmatrix}\right)\right\}_z} \left\{R\left(c - \begin{pmatrix} X \\ Y \\ Z \end{pmatrix}\right)\right\}_y \\ z &= f \end{aligned}\right\} \quad (31)$$

What is claimed is:

1. An image input method for inputting a wide-viewfield composite image by photographing parts of a field to be photographed while changing the photographing direction by rotating a camera which is supported in a rotatable manner, projecting the plurality of partial images of the field to be photographed acquired in this manner onto a projection surface, and based on the results of this projection, conducting compositing on a composite image plane, wherein, during the compositing of said plurality of partial images, the center of rotation of said camera is used as the center of the projection, and the intersection point between said projection surface established in space and a straight line, which is parallel to a straight line connecting the viewpoint of said camera and a pixel in a partial image in an image plane formed by said plurality of partial images, and which passes through the rotational center of said camera, is employed as the projection point of said pixel in said partial image.

2. An image input method for inputting a wide-viewfield composite image by photographing parts of a field to be photographed while altering the range of photography in the field to be photographed of a camera by rotating a mirror supported in a rotatable manner before said camera, projecting a plurality of partial images of the field to be photographed which were acquired onto a projection surface, and based on the results of this projection, conducting compositing on a composite image surface, wherein the rotational center of said mirror is made the center of projection during the compositing of said plurality of partial images, and the point of intersection between the projection surface which is established in space and a straight line, which is parallel to a reflection straight line indicating the reflected light ray which results when a light ray from the viewpoint of said camera which passes through a pixel of a partial image in an image plane formed by said partial images is reflected by said mirror, and which passes through the rotational center of said mirror, is employed as the projection point of said partial image.

3. An image input method for inputting wide-viewfield composite images by photographing parts of a field to be photographed while altering the direction of photography by rotating a camera supported in a rotatable manner, and compositing a plurality of partial images of the field to be photographed which are acquired, wherein a pixel on a composite image surface corresponding to a point on a projection surface is determined from an intersection point between an image plane formed by said plurality of partial images acquired and a straight line, which is parallel to a straight line connecting said point on said image plane established in space at the time of the compositing of said plurality of partial images and the rotational center of said camera, and which passes through the viewpoint of said camera.

4. An image input method for inputting a wide-viewfield composite image by photographing parts of a field to be photographed while altering the photographic range in the field to be photographed of a camera by rotating a mirror which is supported in a rotatable manner before said camera, and compositing a plurality of partial images of the field to be photographed which are obtained, wherein a pixel on a composite image surface corresponding to a point in a projection surface is determined from an intersection point between an image plane formed by said partial images and a straight line, which is parallel to a straight line indicating a reflected light beam resulting from a reflection by said mirror of a straight line connecting a point on said projection surface which is established in space at the time of the compositing of said plurality of partial images and the rotational center of said mirror, and which passes through the viewpoint of said camera.

5. An image input method for inputting wide-viewfield composite images by photographing parts of a field to be photographed while altering the photographic direction by rotating a camera which is supported in a rotatable manner, projecting a plurality of partial images of said field to be photographed which are obtained onto a projection surface, and based on the results of this projection, conducting compositing on a composite image surface, wherein is provided an image compositing mechanism, which employs the rotational center of said camera as the center of projection during the compositing of said plurality of partial images, and which employs, as the projection point of a pixel of a partial image, the intersection point between said projection surface which is established in space and a straight line, which is parallel to a straight line connecting the viewpoint of said camera and said pixel in said partial image in an image plane formed by said plurality of partial images, and which passes through the rotational center of said camera.

6. An image input apparatus for inputting wide-viewfield composite images by photographing parts of a field to be photographed while altering the photographic direction by rotating a camera mounted in a rotatable manner, projecting a plurality of partial images of the field to be photographed obtained into a projection surface, and based on the results of this projection, conducting compositing on a composite image surface, wherein are provided:

a camera movement mechanism for changing the photographic direction of said camera;

a posture control mechanism for directing said camera movement mechanism so as to change the photographic direction of said camera and for transmitting camera posture data to all parts;

a first storage mechanism for storing partial images and composite images produced by compositing said partial images;

a second storage mechanism for storing attribute data related to partial images and composite images and camera posture data from partial image acquisition;

a partial image acquisition mechanism for incorporating images photographed by said camera and acquiring partial images from these incorporated images, and storing said partial images in said first storage mechanism, and for storing posture data from the acquisition of said partial images of said camera received from said posture control mechanism, and attribute data relating to said partial images and composite images, in said second storage mechanism; and an image compositing mechanism for setting the rotational center of said camera as a center of projection; determining a projection point so that an intersection point between a projection surface established in space and a straight line, which is parallel with a straight line connecting the viewpoint of said camera and a pixel in a partial image in an image plane formed by said plurality of partial images, and which passes through the rotational center of said camera, is employed as said projection point of said pixel in said partial image, compositing said partial images with reference to the contents of said first and second storage mechanisms, and storing a composite image in said first storage mechanism.

7. An image input apparatus for inputting wide-viewfield composite images by photographing parts of a field to be photographed while altering the photographic direction by rotating a camera mounted in a rotatable manner, projecting a plurality of partial images of the field to be photographed obtained into a projection surface, and based on the results of this projection, conducting compositing on a composite image surface, wherein are provided:

a camera movement mechanism for changing the photographic direction of said camera;

a posture control mechanism for directing said camera movement mechanism so as to change the photographic direction of said camera and for transmitting camera posture data to all parts;

a first storage mechanism for storing partial images and composite images produced by compositing said partial images;

a second storage mechanism for storing attribute data related to partial images and composite images and camera posture data from partial image acquisition;

a partial image acquisition mechanism for incorporating images photographed by said camera and acquiring partial images from these incorporated images, and storing said partial images in said first storage mechanism, and for storing posture data from the acquisition of said partial images of said camera received from said posture control mechanism, and attribute data relating to said partial images and composite images, in said second storage mechanism;

a positioning mechanism for determining positional relationships between partial images stored in said first storage mechanism, determining positional correction amounts of the composited positions of the partial images stored in said second storage mechanism based on the positional relationships obtained, and storing these in said second storage mechanism; and an image compositing mechanism for determining compositing positions of the partial images using said camera posture data from the time at which the partial images were obtained, and the positional correction amounts of the compositing positions obtained by the positioning mechanism, and in accordance with the compositing positions obtained, setting the rotational center of said camera as a center of projection, determining a projection point so that an intersection point between a projection surface established in space and a straight line, which is parallel with a straight line connecting the viewpoint of said camera and a pixel in a partial image in an image plane formed by said plurality of partial images, and which passes through the rotational center of said camera, is employed as said projection point of said pixel in said partial image, compositing said partial images with reference to the contents of said first and second storage mechanisms, and storing a composite image in said first storage mechanism.

8. An image input apparatus for inputting a wide-viewfield composite image by photographing parts of a field to be photographed while changing the range of photography in the field to be photographed of a camera by rotating a mirror which is supported in a rotatable manner before said camera, projecting a plurality of partial images of the field to be photographed which are obtained onto a projection surface, and based on the results of this projection, conducting compositing on a composite image surface, wherein an image compositing mechanism is provided which uses the rotational center of said mirror as the center of projection during the compositing of said plurality of partial images, and which employs the intersection point between said projection surface which is established in space and a straight line, which is parallel to a reflection straight line indicating a reflected beam of light resulting from the reflection by said mirror of a light beam from the viewpoint of said camera which passes through a pixel of a partial image in an image plane formed by the partial images, and which passes through the rotational center of said mirror, as the projection point of said partial image.

9. An image input apparatus for inputting a wide-viewfield composite image by photographing parts of a field to be photographed while changing the range of photography in the field to be photographed of a camera by rotating a mirror which is supported in a rotatable manner before said camera, projecting a plurality of partial images of the field to be photographed which are obtained onto a projection surface, and based on the results of this projection, conducting compositing on a composite image surface, wherein are provided:

a mirror movement mechanism for altering the direction of said mirror so as to change the photographic direction of said camera;

a mirror control mechanism for directing said mirror movement mechanism so as to change the orientation of said mirror and for transmitting posture data of said mirror to all parts;

a first storage mechanism for storing partial images and composite images produced by compositing said partial images;

a second storage mechanism for storing attribute data related to partial images and composite images and said mirror posture data from partial image acquisition;

a partial image acquisition mechanism for incorporating images photographed by said camera and acquiring partial images from these incorporated images, and storing said partial images in said first storage mechanism, and for storing posture data from the acquisition of said partial images of said mirror received from said mirror control mechanism, and attribute data relating to said partial images and composite images, in said second storage mechanism; and an image compositing mechanism which uses the rotational center of said mirror as the center of projection during the compositing of said plurality of partial images, and which determines a projection point such that the intersection point between said projection surface which is established in space and a straight line, which is parallel to a reflection straight line indicating a reflected beam of light resulting from the reflection by said mirror of a light beam from the viewpoint of said camera which passes through a pixel of a partial image in an image plane formed by the partial images, and which passes through the rotational center of said mirror, is employed as the projection point of said pixel of said partial image, and which composites said partial images with reference to the contents of said first and second storage mechanisms, and stores a composite image in said first storage mechanism.

10. An image input apparatus for inputting a wide-viewfield composite image by photographing parts of a field to be photographed while changing the range of photography in the field to be photographed of a camera by rotating a mirror which is supported in a rotatable manner before said camera, projecting a plurality of partial images of the field to be photographed which are obtained onto a projection surface, and based on the results of this projection, conducting compositing on a composite image surface, wherein are provided:

a mirror movement mechanism for altering the direction of said mirror so as to change the photographic direction of said camera;

a mirror control mechanism for directing said mirror movement mechanism so as to change the orientation of said mirror and for transmitting posture data of said mirror to all parts;

a first storage mechanism for storing partial images and composite images produced by compositing said partial images;

a second storage mechanism for storing attribute data related to partial images and composite images and said mirror posture data from partial image acquisition;

a partial image acquisition mechanism for incorporating images photographed by said camera and acquiring partial images from these incorporated images, and storing said partial images in said first storage mechanism, and for storing posture data from the acquisition of said partial images of said mirror received from said mirror control mechanism, and attribute data relating to said partial images and composite images, in said second storage mechanism;

a positioning mechanism for determining positional relationships between partial images stored in said first storage mechanism, determining positional correction amounts of the composited positions of the partial images stored in said second storage mechanism based on the positional relationships obtained, and storing these in said second storage mechanism; and an image compositing mechanism for determining compositing positions of the partial images using said camera posture data from the time at which the partial images were obtained, and the positional correction amounts of the compositing positions obtained by the positioning mechanism, and in accordance with the compositing positions obtained, setting the rotational center of said mirror as the center of projection during the compositing of said plurality of partial images, determining a projection point such that the intersection point between said projection surface which is established in space and a straight line, which is parallel to a reflection straight line indicating a reflected beam of light resulting from the reflection by said mirror of a light beam from the viewpoint of said camera which passes through a pixel of a partial image in an image plane formed by the partial images, and which passes through the rotational center of said mirror, is employed as the projection point of said pixel of said partial image, compositing said partial images with reference to the contents of said first and second storage mechanisms, and storing a composite image in said first storage mechanism.

11. An image input apparatus for inputting wide-viewfield composite images by photographing parts of a field to be photographed while altering the direction of photography by rotating a camera supported in a rotatable manner, and compositing the plurality of partial images of the field to be photographed which are acquired, wherein is provided an image compositing mechanism for determining a pixel on a composite image surface corresponding to a point on a projection surface from an intersection point between an image plane formed by said plurality of partial images acquired and a straight line, which is parallel to a straight line connecting said point on said image plane established in space at the time of the compositing of said plurality of partial images and the rotational center of said camera, and which passes through the viewpoint of said camera.

12. An image input apparatus for inputting wide-viewfield composite images by photographing parts of a field to be photographed while altering the direction of photography by rotating a camera supported in a rotatable manner, and compositing the plurality of partial images of the field to be photographed which are acquired, wherein are provided:

a camera movement mechanism for changing the photographic direction of said camera;

a posture control mechanism for directing said camera movement mechanism so as to change the photographic direction of said camera and for transmitting camera posture data to all parts;

a first storage mechanism for storing partial images and composite images produced by compositing said partial images;

a second storage mechanism for storing attribute data related to partial images and composite images and camera posture data from partial image acquisition;

a partial image acquisition mechanism for incorporating images photographed by said camera and acquiring partial images from these incorporated images, and storing said partial images in said first storage mechanism, and for storing posture data from the acquisition of said partial images of said camera received from said posture control mechanism, and attribute data relating to said partial images and composite images, in said second storage mechanism; and an image compositing mechanism for determining a pixel on a composite image surface corresponding to a point on said projection surface from the intersection point between an image plane formed by said plurality of partial images obtained and a straight line, which is parallel to a straight line connecting a point in said projection surface established in space at the time of the compositing of said plurality of partial images with the rotational center of said camera, and which passes through the viewpoint of said camera, compositing said partial images with reference to the contents of said first and second storage mechanisms, and storing the composite image in said first storage mechanism.

13. An image input apparatus for inputting wide-viewfield composite images by photographing parts of a field to be photographed while altering the direction of photography by rotating a camera supported in a rotatable manner, and compositing the plurality of partial images of the field to be photographed which are acquired, wherein are provided:

a camera movement mechanism for changing the photographic direction of said camera;

a posture control mechanism for directing said camera movement mechanism so as to change the photographic direction of said camera and for transmitting camera posture data to all parts;

a first storage mechanism for storing partial images and composite images produced by compositing said partial images;

a second storage mechanism for storing attribute data related to partial images and composite images and camera posture data from partial image acquisition;

a partial image acquisition mechanism for incorporating images photographed by said camera and acquiring partial images from these incorporated images, and storing said partial images in said first storage mechanism, and for storing posture data from the acquisition of said partial images of said camera received from said posture control mechanism, and attribute data relating to said partial images and composite images, in said second storage mechanism;

a positioning mechanism for determining positional relationships between partial images stored in said first storage mechanism, determining positional correction amounts of the composited positions of the partial images stored in said second storage mechanism based on the positional relationships obtained, and storing these in said second storage mechanism; and an image compositing mechanism for determining compositing positions of the partial images using said camera posture data from the time at which the partial images were obtained, and the positional correction amounts of the compositing positions obtained by the positioning mechanism, and in accordance with the compositing positions obtained, determining a pixel on a composite image surface corresponding to a point on said projection surface from the intersection point between an image plane formed by said plurality of partial images obtained and a straight line, which is parallel to a straight line connecting a point in said projection surface established in space with the rotational center of said camera, and which passes through the viewpoint of said camera, compositing said partial images with reference to the contents of said first and second storage mechanisms, and storing the composite image in said first storage mechanism.

14. An image input apparatus for inputting a wide-viewfield composite image by photographing parts of a field to be photographed while altering the photographic range in the field to be photographed of a camera by rotating a mirror which is supported in a rotatable manner before said camera, and compositing a plurality of partial images of the field to be photographed which are obtained, wherein is provided an image compositing mechanism for determining a pixel on a composite image surface corresponding to a point in a projection surface from an intersection point between an image plane formed by said partial images and a straight line, which is parallel to a straight line indicating a reflected light beam resulting from a reflection by said mirror of a straight line connecting a point on said projection surface which is established in space at the time of the compositing of said plurality of partial images and the rotational center of said mirror, and which passes through the viewpoint of said camera.

15. An image input apparatus for inputting a wide-viewfield composite image by photographing parts of a field to be photographed while altering the photographic range in the field to be photographed of a camera by rotating a mirror which is supported in a rotatable manner before said camera, and compositing a plurality of partial images of the field to be photographed which are obtained, wherein are provided:

a mirror movement mechanism for altering the direction of said mirror so as to change the photographic direction of said camera;

a mirror control mechanism for directing said mirror movement mechanism so as to change the orientation of said mirror and for transmitting posture data of said mirror to all parts;

a first storage mechanism for storing partial images and composite images produced by compositing said partial images;

a second storage mechanism for storing attribute data related to partial images and composite images and said mirror posture data from partial image acquisition;

a partial image acquisition mechanism for incorporating images photographed by said camera and acquiring partial images from these incorporated images, and storing said partial images in said first storage mechanism, and for storing posture data from the acquisition of said partial images of said mirror received from said mirror control mechanism, and attribute data relating to said partial images and composite images, in said second storage mechanism; and an image compositing mechanism for determining a pixel on a composite image surface corresponding to a point in a projection surface from an intersection point between an image plane formed by said partial images and a straight line, which is parallel to a straight line indicating a reflected light beam resulting from a reflection by said mirror of a straight line connecting a point on said projection surface which is established in space at the time of the compositing of said plurality of partial images and the rotational center of said mirror, and which passes through the viewpoint of said camera, compositing said partial images with reference to the contents of said first and second storage mechanisms, and storing the composite image in said first storage mechanism.

16. An image input apparatus for inputting a wide-viewfield composite image by photographing parts of a field to be photographed while altering the photographic range in the field to be photographed of a camera by rotating a mirror which is supported in a rotatable manner before said camera, and compositing a plurality of partial images of the field to be photographed which are obtained, wherein are provided:

a mirror movement mechanism for altering the direction of said mirror so as to change the photographic direction of said camera;

a mirror control mechanism for directing said mirror movement mechanism so as to change the orientation of said mirror and for transmitting posture data of said mirror to all parts;

a first storage mechanism for storing partial images and composite images produced by compositing said partial images;

a second storage mechanism for storing attribute data related to partial images and composite images and said mirror posture data from partial image acquisition;

a partial image acquisition mechanism for incorporating images photographed by said camera and acquiring partial images from these incorporated images, and storing said partial images in said first storage mechanism, and for storing posture data from the acquisition of said partial images of said mirror received from said mirror control mechanism, and attribute data relating to said partial images and composite images, in said second storage mechanism;

a positioning mechanism for determining positional relationships between partial images stored in said first storage mechanism, determining positional correction amounts of the composited positions of the partial images stored in said second storage mechanism based on the positional relationships obtained, and storing these in said second storage mechanism; and an image compositing mechanism for determining compositing positions of the partial images using the posture data of the camera at the time of acquisition of said partial images stored in said second storage mechanism and said positional correction amounts of the compositing positions obtained from said positioning mechanism, and, in accordance with the compositing positions obtained, determining a pixel on a composite image surface corresponding to a point in said projection surface from the intersection point between an image plane formed by said partial images and a straight line, which is parallel to a straight line showing a reflected light beam resulting from the reflection by said mirror of a straight line connecting a point in said projection surface established in space and the rotational center of said mirror, and which passes through the viewpoint of said camera, compositing said partial images with reference to the contents of said first and second storage mechanisms, and storing the composite image in said first storage mechanism.

17. A computer-readable recording medium storing a program for executing the functions of an image input apparatus for inputting wide-viewfield composite images by photographing parts of a field to be photographed while altering the photographic direction by rotating a camera which is supported in a rotatable manner, projecting a plurality of partial images of said field to be photographed which are obtained onto a projection surface, and based on the results of this projection, conducting compositing on a composite image surface, wherein is provided an image compositing mechanism, which employs the rotational center of said camera as the center of projection during the compositing of said plurality of partial images, and which employs, as the projection point of a pixel of a partial image, the intersection point between said projection surface which is established in space and a straight line, which is parallel to a straight line connecting the viewpoint of said camera and said pixel in said partial image in an image plane formed by said plurality of partial images, and which passes through the rotational center of said camera.

18. A computer-readable recording medium storing a program for executing the functions of an image input apparatus for inputting wide-viewfield composite images by photographing parts of a field to be photographed while altering the photographic direction by rotating a camera which is supported in a rotatable manner, projecting a plurality of partial images of said field to be photographed which are obtained onto a projection surface, and based on the results of this projection, conducting compositing on a composite image surface, wherein are provided: a camera movement mechanism for changing the photographic direction of said camera; a posture control mechanism for directing said camera movement mechanism so as to change the photographic direction of said camera and for transmitting camera posture data to all parts; a first storage mechanism for storing partial images and composite images produced by compositing said partial images; a second storage mechanism for storing attribute data related to partial images and composite images and camera posture data from partial image acquisition; a partial image acquisition mechanism for incorporating images photographed by said camera and acquiring partial images from these incorporated images, and storing said partial images in said first storage mechanism, and for storing posture data from the acquisition of said partial images of said camera received from said posture control mechanism, and attribute data relating to said partial images and composite images, in said second storage mechanism; and an image compositing mechanism for setting the rotational center of said camera as a center of projection, determining a projection point so that an intersection point between a projection surface established in space and a straight line, which is parallel with a straight line connecting the viewpoint of said camera and a pixel in a partial image in an image plane formed by said plurality of partial images, and which passes through the rotational center of said camera, is employed as said projection point of said pixel in said partial image, compositing said partial images with reference to the contents of said first and second storage mechanisms, and storing a composite image in said first storage mechanism.

19. A computer-readable recording medium storing a program for executing the functions of an image input apparatus for inputting wide-viewfield composite images by photographing parts of a field to be photographed while altering the photographic direction by rotating a camera which is supported in a rotatable manner, projecting a plurality of partial images of said field to be photographed which are obtained onto a projection surface, and based on the results of this projection, conducting compositing on a composite image surface, wherein are provided: a camera movement mechanism for changing the photographic direction of said camera; a posture control mechanism for directing said camera movement mechanism so as to change the photographic direction of said camera and for transmitting camera posture data to all parts; a first storage mechanism for storing partial images and composite images produced by compositing said partial images; a second storage mechanism for storing attribute data related to partial images and composite images and camera posture data from partial image acquisition; a partial image acquisition mechanism for incorporating images photographed by said camera and acquiring partial images from these incorporated images, and storing said partial images in said first storage mechanism, and for storing posture data from the acquisition of said partial images of said camera received from said posture control mechanism, and attribute data relating to said partial images and composite images, in said second storage mechanism; a positioning mechanism for determining positional relationships between partial images stored in said first storage mechanism, determining positional correction amounts of the composited positions of the partial images stored in said second storage mechanism based on the positional relationships obtained, and storing these in said second storage mechanism; and an image compositing mechanism for determining partial image compositing positions using said camera posture data obtained at the time of acquisition of the partial images stored in said second storage mechanism and said positional correction amounts determined by said positioning mechanism, and in accordance with the compositing positions determined, setting the center of projection to the center of rotation of the camera, and determining the projection point such that the projection point of a pixel in a partial image is set to the intersection point between said projection surface established in space and a straight line, which is parallel to a straight line connecting the viewpoint of said camera and said pixel in said partial image in an image plane formed by said plurality of partial images, and which passes through the rotational center of said camera, and composites said partial images with reference to the contents of said first and second storage mechanisms, and stores a resulting composite image in said first storage mechanism.

20. A computer-readable recording medium which stores a program for executing the functions of an image input apparatus for inputting a wide-viewfield composite image by photographing parts of a field to be photographed while altering the photographic range of a camera in the field to be photographed by rotating a mirror supported in a rotatable manner before said camera, projecting a plurality of partial images of said field to be photographed obtained onto a projection surface, and based on the results of this projection, conducting compositing on a composite image plane, wherein is provided an image compositing mechanism for setting the rotational center of said mirror during the compositing of said plurality of partial images to the center of projection, and setting the intersection point between said projection surface which is established in space and a straight line, which is parallel to a reflection straight line indicating the reflected light beam resulting when a light beam from the viewpoint of said camera and which passes through a pixel of a partial image in an image plane formed by partial images is reflected by said mirror, and which passes through the rotational center of said mirror, as the projection point of said partial image.

21. A computer-readable recording medium which stores a program for executing the functions of an image input apparatus for inputting a wide-viewfield composite image by photographing parts of a field to be photographed while altering the photographic range of a camera in the field to be photographed by rotating a mirror supported in a rotatable manner before said camera, projecting a plurality of partial images of said field to be photographed obtained onto a projection surface, and based on the results of this projection, conducting compositing on a composite image plane, wherein are provided: a mirror movement mechanism for altering the direction of said mirror so as to change the photographic direction of said camera; a mirror control mechanism for directing said mirror movement mechanism so as to change the orientation of said mirror and for transmitting posture data of said mirror to all parts; a first storage mechanism for storing partial images and composite images produced by compositing said partial images; a second storage mechanism for storing attribute data related to partial images and composite images and said mirror posture data from partial image acquisition; a partial image acquisition mechanism for incorporating images photographed by said camera and acquiring partial images from these incorporated images, and storing said partial images in said first storage mechanism, and for storing posture data from the acquisition of said partial images of said mirror received from said mirror control mechanism, and attribute data relating to said partial images and composite images, in said second storage mechanism; and an image compositing mechanism which uses the rotational center of said mirror as the center of projection during the compositing of said plurality of partial images, and which determines a projection point such that the intersection point between said projection surface which is established in space and a straight line, which is parallel to a reflection straight line indicating a reflected beam of light resulting from the reflection by said mirror of a light beam from the viewpoint of said camera which passes through a pixel of a partial image in an image plane formed by the partial images, and which passes through the rotational center of said mirror, is employed as the projection point of said pixel of said partial image, and which composites said partial images with reference to the contents of said first and second storage mechanisms, and stores a composite image in said first storage mechanism.

22. A computer-readable recording medium which stores a program for executing the functions of an image input apparatus for inputting a wide-viewfield composite image by photographing parts of a field to be photographed while altering the photographic range of a camera in the field to be photographed by rotating a mirror supported in a rotatable manner before said camera, projecting a plurality of partial images of said field to be photographed obtained onto a projection surface, and based on the results of this projection, conducting compositing on a composite image plane, wherein are provided: a mirror movement mechanism for altering the direction of said mirror so as to change the photographic direction of said camera; a mirror control mechanism for directing said mirror movement mechanism so as to change the orientation of said mirror and for transmitting posture data of said mirror to all parts; a first storage mechanism for storing partial images and composite images produced by compositing said partial images; a second storage mechanism for storing attribute data related to partial images and composite images and said mirror posture data from partial image acquisition; a partial image acquisition mechanism for incorporating images photographed by said camera and acquiring partial images from these incorporated images, and storing said partial images in said first storage mechanism, and for storing posture data from the acquisition of said partial images of said mirror received from said mirror control mechanism, and attribute data relating to said partial images and composite images, in said second storage mechanism; a positioning mechanism for determining positional relationships between partial images stored in said first storage mechanism, determining positional correction amounts of the composited positions of the partial images stored in said second storage mechanism based on the positional relationships obtained, and storing these in said second storage mechanism; and an image compositing mechanism for determining compositing positions of the partial images using the posture data of the camera at the time of acquisition of said partial images stored in said second storage mechanism and said positional correction amounts of the compositing positions obtained from said positioning mechanism, and, in accordance with the compositing positions obtained, setting the rotational center of said mirror as the center of projection during the compositing of said plurality of partial images, determining a projection point such that the intersection point between said projection surface which is established in space and a straight line, which is parallel to a reflection straight line indicating a reflected beam of light resulting from the reflection by said mirror of a light beam from the viewpoint of said camera which passes through a pixel of a partial image in an image plane formed by the partial images, and which passes through the rotational center of said mirror, is employed as the projection point of said pixel of said partial image, compositing said partial images with reference to the contents of said first and second storage mechanisms, and storing a composite image in said first storage mechanism.

23. A computer-readable recording medium for storing a program for executing the functions of an image input apparatus for inputting a wide-viewfield composite image by photographing parts of a field to be photographed while altering the photographic direction by rotating a camera supported in a rotatable manner, and compositing a plurality of partial images of the field to be photographed which are obtained, wherein is provided an image compositing mechanism which determines a pixel on a composite image surface corresponding to a point in a projection surface from the intersection point between an image plane formed by said plurality of partial images and a straight line, which is parallel to a straight line connecting said point in said projection surface established in space during the compositing of said plurality of partial images and the rotational center of said camera, and which passes through the viewpoint of said camera.

24. A computer-readable recording medium for storing a program for executing the functions of an image input apparatus for inputting a wide-viewfield composite image by photographing parts of a field to be photographed while altering the photographic direction by rotating a camera supported in a rotatable manner, and compositing a plurality of partial images of the field to be photographed which are obtained, wherein are provided: a camera movement mechanism for changing the photographic direction of said camera; a posture control mechanism for directing said camera movement mechanism so as to change the photographic direction of said camera and for transmitting camera posture data to all parts; a first storage mechanism for storing partial images and composite images produced by compositing said partial images; a second storage mechanism for storing attribute data related to partial images and composite images and camera posture data from partial image acquisition; a partial image acquisition mechanism for incorporating images photographed by said camera and acquiring partial images from these incorporated images, and storing said partial images in said first storage mechanism, and for storing posture data from the acquisition of said partial images of said camera received from said posture control mechanism, and attribute data relating to said partial images and composite images, in said second storage mechanism; and an image compositing mechanism for determining a pixel on a composite image surface corresponding to a point on said projection surface from the intersection point between an image plane formed by said plurality of partial images obtained and a straight line, which is parallel to a straight line connecting a point in said projection surface established in space at the time of the compositing of said plurality of partial images with the rotational center of said camera, and which passes through the viewpoint of said camera, compositing said partial images with reference to the contents of said first and second storage mechanisms, and storing the composite image in said first storage mechanism.

25. A computer-readable recording medium for storing a program for executing the functions of an image input apparatus for inputting a wide-viewfield composite image by photographing parts of a field to be photographed while altering the photographic direction by rotating a camera supported in a rotatable manner, and compositing a plurality of partial images of the field to be photographed which are obtained, wherein are provided: a camera movement mechanism for changing the photographic direction of said camera; a posture control mechanism for directing said camera movement mechanism so as to change the photographic direction of said camera and for transmitting camera posture data to all parts; a first storage mechanism for storing partial images and composite images produced by compositing said partial images; a second storage mechanism for storing attribute data related to partial images and composite images and camera posture data from partial image acquisition; a partial image acquisition mechanism for incorporating images photographed by said camera and acquiring partial images from these incorporated images, and storing said partial images in said first storage mechanism, and for storing posture data from the acquisition of said partial images of said camera received from said posture control mechanism, and attribute data relating to said partial images and composite images, in said second storage mechanism; a positioning mechanism for determining positional relationships between partial images stored in said first storage mechanism, determining positional correction amounts of the composited positions of the partial images stored in said second storage mechanism based on the positional relationships obtained, and storing these in said second storage mechanism; and an image compositing mechanism for determining compositing positions of the partial images using the posture data of the camera at the time of acquisition of said partial images stored in said second storage mechanism and said positional correction amounts of the compositing positions obtained from said positioning mechanism, and, in accordance with the compositing positions obtained, determining a pixel on a composite image surface corresponding to a point on said projection surface from the intersection point between an image plane formed by said plurality of partial images obtained and a straight line, which is parallel to a straight line connecting a point in said projection surface established in space with the rotational center of said camera, and which passes through the viewpoint of said camera, compositing said partial images with reference to the contents of said first and second storage mechanisms, and storing the composite image in said first storage mechanism.

26. A computer-readable recording medium which stores a program for realizing the functions of an image input apparatus for inputting a wide-viewfield composite image by photographing parts of a field to be photographed while altering the photographic range of a camera in the field to be photographed by rotating a mirror supported in a rotatable manner before said camera, and compositing a plurality of partial images of the field to be photographed which are obtained, wherein is provided an image compositing mechanism for determining a pixel on a composite image surface corresponding to a point in a projection surface from the intersection point between an image plane formed by said partial images and a straight line, which is parallel to a straight line indicating the reflected light beam resulting from the reflection of a straight line connecting said point in said projection surface which is established in space during the compositing of said plurality of partial images and the rotational center of said mirror, and passes through the viewpoint of said camera.

27. A computer-readable recording medium which stores a program for realizing the functions of an image input apparatus for inputting a wide-viewfield composite image by photographing parts of a field to be photographed while altering the photographic range of a camera in the field to be photographed by rotating a mirror supported in a rotatable manner before said camera, and compositing a plurality of partial images of the field to be photographed which are obtained, wherein are provided: a mirror movement mechanism for altering the direction of said mirror so as to change the photographic direction of said camera; a mirror control mechanism for directing said mirror movement mechanism so as to change the orientation of said mirror and for transmitting posture data of said mirror to all parts; a first storage mechanism for storing partial images and composite images produced by compositing said partial images; a second storage mechanism for storing attribute data related to partial images and composite images and said mirror posture data from partial image acquisition; a partial image acquisition mechanism for incorporating images photographed by said camera and acquiring partial images from these incorporated images, and storing said partial images in said first storage mechanism, and for storing posture data from the acquisition of said partial images of said mirror received from said mirror control mechanism, and attribute data relating to said partial images and composite images, in said second storage mechanism; and an image compositing mechanism for determining a pixel on a composite image surface corresponding to a point in a projection surface from an intersection point between an image plane formed by said partial images and a straight line, which is parallel to a straight line indicating a reflected light beam resulting from a reflection by said mirror of a straight line connecting a point on said projection surface which is established in space at the time of the compositing of said plurality of partial images and the rotational center of said mirror, and which passes through the viewpoint of said camera, compositing said partial images with reference to the contents of said first and second storage mechanisms, and storing the composite image in said first storage mechanism.

28. A computer-readable recording medium which stores a program for realizing the functions of an image input apparatus for inputting a wide-viewfield composite image by photographing parts of a field to be photographed while altering the photographic range of a camera in the field to be photographed by rotating a mirror supported in a rotatable manner before said camera, and compositing a plurality of partial images of the field to be photographed which are obtained, wherein are provided: a mirror movement mechanism for altering the direction of said mirror so as to change the photographic direction of said camera; a mirror control mechanism for directing said mirror movement mechanism so as to change the orientation of said mirror and for transmitting posture data of said mirror to all parts; a first storage mechanism for storing partial images and composite images produced by compositing said partial images; a second storage mechanism for storing attribute data related to partial images and composite images and said mirror posture data from partial image acquisition; a partial image acquisition mechanism for incorporating images photographed by said camera and acquiring partial images from these incorporated images, and storing said partial images in said first storage mechanism, and for storing posture data from the acquisition of said partial images of said mirror received from said mirror control mechanism, and attribute data relating to said partial images and composite images, in said second storage mechanism; a positioning mechanism for determining positional relationships between partial images stored in said first storage mechanism, determining positional correction amounts of the composited positions of the partial images stored in said second storage mechanism based on the positional relationships obtained, and storing these in said second storage mechanism; and an image compositing mechanism for determining compositing positions of the partial images using the posture data of the camera at the time of acquisition of said partial images stored in said second storage mechanism and said positional correction amounts of the compositing positions obtained from said positioning mechanism, and, in accordance with the compositing positions obtained, determining a pixel on a composite image surface corresponding to a point in a projection surface from an intersection point between an image plane formed by said partial images and a straight line, which is parallel to a straight line indicating a reflected light beam resulting from a reflection by said mirror of a straight line connecting a point on said projection surface which is established in space at the time of the compositing of said plurality of partial images and the rotational center of said mirror, and which passes through the viewpoint of said camera, compositing said partial images with reference to the contents of said first and second storage mechanisms, and storing the composite image in said first storage mechanism.

29. An image input apparatus which is provided with a camera which photographs a field to be photographed, a mirror which is disposed in front of said camera in order to alter the optical path of the reflected light from the field to be photographed in the direction of the camera lens of said camera, a mirror rotation mechanism for rotating said mirror about the optical axis of said camera, and a processing mechanism for compositing a plurality of images inputted from said camera in accordance with the rotation of said mirror and producing a wide view angle image, wherein said mirror is a triangular columnar mirror in which two of the side surfaces are reflective surfaces, said camera takes photographs using reflected light from the objects to be photographed, the optical path of which is changed by said two reflective surfaces of said mirror, and said processing mechanism separates a plurality of images photographed by said camera in accordance with the reflective surfaces of said mirror and conducts independent image composition.

30. An image input apparatus in accordance with claim 29, wherein said processing mechanism is provided with:

an image acquisition mechanism which acquires images photographed by said camera and digitizes these, an image separation mechanism which separates the images acquired and digitized by said image acquisition mechanism and separates these according to said two reflective surfaces of said mirror, a first image compositing mechanism which composites the images separated by said image separation mechanism in accordance with a first reflective surface among said two reflective surfaces of said mirror, a second image compositing mechanism, which composites images separated by said image separation mechanism in accordance with a second reflective surface among said two reflective surfaces of said mirror, and an image updating mechanism, which conducts updating by overwriting images composited by said first and second image compositing mechanisms onto a wide-viewfield image.

31. An image input apparatus which is provided with:

first and second cameras which are disposed so that the optical axes of the camera lens thereof are in agreement and they are in mutual opposition and which photograph a field to be photographed, a double-sided mirror, which is disposed between said first and second cameras and which alters the optical path of light reflected from the field to be photographed in the direction of the camera lens of the first and second camera, a mirror rotation mechanism for rotating said double-sided mirror about the optical axes of said first and second cameras, and a processing mechanism for compositing a plurality of images inputted from said first and second cameras in accordance with the rotation of said mirror and producing a wide view angle image.

32. An image input apparatus in accordance with claim 31, wherein said processing mechanism comprises:

a first image acquisition mechanism for acquiring images photographed by said first camera which photographs reflected light from a first reflective surface of said double-sided mirror, and digitizes these images, a second image acquisition mechanism for acquiring images photographed by said second camera which photographs light reflected from a second reflective surface of said double-sided mirror and digitizes these images, a first image compositing mechanism for compositing images digitized by said first image acquisition mechanism, a second image compositing mechanism for compositing images digitized by said second image acquisition mechanism, and an image updating mechanism for conducting updating by overwriting images composited by said first and second image compositing mechanisms onto a wide-viewfield image.

* * * * *